(12) United States Patent
Kavuri et al.

(10) Patent No.: US 7,627,617 B2
(45) Date of Patent: Dec. 1, 2009

(54) CLUSTERED HIERARCHICAL FILE SERVICES

(75) Inventors: Ravi K. Kavuri, Inver Grove Heights, MN (US); Jon M. Holdman, Wheat Ridge, CO (US); James P. Hughes, Herndon, VA (US); Dale R. Eichel, Broomfield, CO (US); Randall K. Hewitt, Fort Collins, CO (US)

(73) Assignee: Storage Technology Corporation, Louisville, CO (US)

( * ) Notice: Subject to any disclaimer, the term of this patent is extended or adjusted under 35 U.S.C. 154(b) by 229 days.

(21) Appl. No.: 11/055,523

(22) Filed: Feb. 10, 2005

(65) Prior Publication Data

US 2005/0195660 A1    Sep. 8, 2005

Related U.S. Application Data

(60) Provisional application No. 60/543,759, filed on Feb. 11, 2004.

(51) Int. Cl.
*G06F 12/00* (2006.01)
*G06F 17/30* (2006.01)

(52) U.S. Cl. ............... 707/204; 707/1; 707/100; 707/103 R; 707/201; 709/217; 711/113

(58) Field of Classification Search ............. 707/103, 707/1, 100, 201, 204; 709/217; 711/113
See application file for complete search history.

(56) References Cited

U.S. PATENT DOCUMENTS 5,129,088 A    7/1992  Auslander et al.
5,566,331 A    10/1996 Irwin, Jr. et al.
5,758,360 A    5/1998  Zbikowski et al.
5,907,837 A *  5/1999  Ferrel et al. .................... 707/3

(Continued)

OTHER PUBLICATIONS

Rajasekar A. et al, "Collection-Based Persistent Archive", Mass Storage System, 1999, 16th IEEE Symposium on, 1999, pp. 176-184. Download: http://ieeexplore.ieee.org/stamp/stamp.jsp?arnumber=830029&isnumber=17998.*

Low, David. A., "An object orinted model for distributed backup and archive", Compcon '95.'Technologies for the Information Superhighway', Digest of Papers, Mar. 5-9, 1995 pp. 428-433. Download: http://ieeexplore.ieee.org/stamp/stamp.jsp?arnumber=512419 &isnumber=11295.*

(Continued)

*Primary Examiner*—John E Breene
*Assistant Examiner*—Hares Jami
(74) *Attorney, Agent, or Firm*—Brooks Kushman P.C.

(57) ABSTRACT

A system for object-based archival data storage includes an object-based storage subsystem having respective data storage devices, at least one file presentation interface that interfaces to client platforms, an administration interface having graphical user interface (GUI) and a command line interface (CLI), a meta data subsystem for storing meta data about files, and includes a virtual file subsystem having a virtual file server (VFS), a policy subsystem, and a scalable interconnect to couple the object-based storage subsystem, the at least one file presentation interface, the administration interface, the meta data subsystem, and the policy subsystem, wherein the policy subsystem provides system rules predetermined by a user for at least one of hash based integrity checking, read-only/write-ability/erase-ability control, and duplicate data treatment corresponding to files and file objects.

15 Claims, 31 Drawing Sheets

U.S. PATENT DOCUMENTS

| | | | |
|---|---|---|---|
| 5,946,685 A | 8/1999 | Cramer et al. | |
| 6,356,915 B1 | 3/2002 | Chtchetkine et al. | |
| 7,131,000 B2* | 10/2006 | Bradee | 713/164 |
| 2001/0047400 A1* | 11/2001 | Coates et al. | 709/219 |
| 2002/0133504 A1* | 9/2002 | Vlahos et al. | 707/104.1 |
| 2003/0108206 A1* | 6/2003 | Diehl et al. | 380/277 |
| 2003/0115218 A1 | 6/2003 | Bobbitt et al. | |
| 2003/0145086 A1* | 7/2003 | O'Reilly | 709/226 |
| 2004/0024578 A1* | 2/2004 | Szymanski et al. | 703/17 |
| 2004/0034661 A1* | 2/2004 | Barron et al. | 707/104.1 |
| 2004/0139103 A1* | 7/2004 | Boyce et al. | 707/102 |
| 2004/0205355 A1* | 10/2004 | Boozer et al. | 713/200 |
| 2004/0236788 A1* | 11/2004 | Sato et al. | 707/104.1 |
| 2005/0097352 A1* | 5/2005 | Patrick et al. | 713/200 |

OTHER PUBLICATIONS

Chao Jin, Weimin Zheng, Feng Zhou, Yinghui Wu: "A Distributed persistent object store for scalable service". 2002 URL:http://www.cs.berkeley.edu/{zf/papers/tods-osreview.pdf.

Mesnier M et al: "Object-Based Storage", IEEE Comunications Magazine, IEEE Service Center. Piscataway, N.J.US, vol. 41, No. 8. Aug. 2003.

* cited by examiner

CLUSTERED HIERARCHICAL FILE SERVICES

CROSS-REFERENCE TO RELATED APPLICATIONS

This application claims the benefit of U.S. provisional application Ser. No. 60/543,759 filed Feb. 11, 2004.

BACKGROUND OF THE INVENTION

1. Field of the Invention

The present invention relates to a system and a method for a virtual cluster file server in a data storage system.

2. Background Art

Traditional (i.e., conventional) data file storage systems have four main focus areas, free space management, access control, name and directories (i.e., name space management) and local access to files. As data grows exponentially over time, storage management becomes an issue for all Information Technology (IT) managers. When a storage area network (SAN) is deployed, managing storage resources efficiently becomes even more complicated.

The conventional file systems are typically implemented to provide network-oriented environments as scalable and network-aware file systems that can satisfy both data storage requirements of individual systems and the data sharing requirements of workgroups and clusters of cooperative systems. However, deficiencies in conventional systems deployment include potentially costly requirements within a deployment for the clients to change existing systems and to develop new drivers for existing systems, and a lack standardization of the Universal User Identity (UUID) that identifies each node.

Further, data objects in a conventional object-based storage system are mirrored across multiple storage devices and should be backed up for reliability and availability improvement. However, the object identifier for the mirrored object can be difficult to determine and to back up using conventional approaches.

Yet further, conventional approaches can fail to provide consistent and cost effective approaches to error handling, back up, job handling, meta data management, and the like. In addition, there has been a tremendous increase in the storage requirements for mid to large sized companies. Not only are these requirements driven by increases in the volume of data stored, but also by new information lifecycle management (ILM) initiatives and compliance regulations that specify what must be stored, for how long must it be stored and accessible, as well as auditability requirements. Although ILM and compliance are not markets in and of themselves, the requirements drive the need for ILM and compliance related products.

Thus there exists an opportunity and need for an improved system and method for a data storage systems that does not require installation of any additional subsystem on any client, and that is scalable, reliable and expandable, and that addresses deficiencies in conventional approaches.

SUMMARY OF THE INVENTION

The present invention generally provides a system and a method for new, improved and innovative techniques for a data storage system that addresses deficiencies in conventional approaches. The improved system and method of the present invention generally provides a virtual cluster file system in which the deployment of the cluster file system is transparent to the existing clients, data object mirroring across multiple storage devices, data object back up, and policy driven scheduling and data management.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
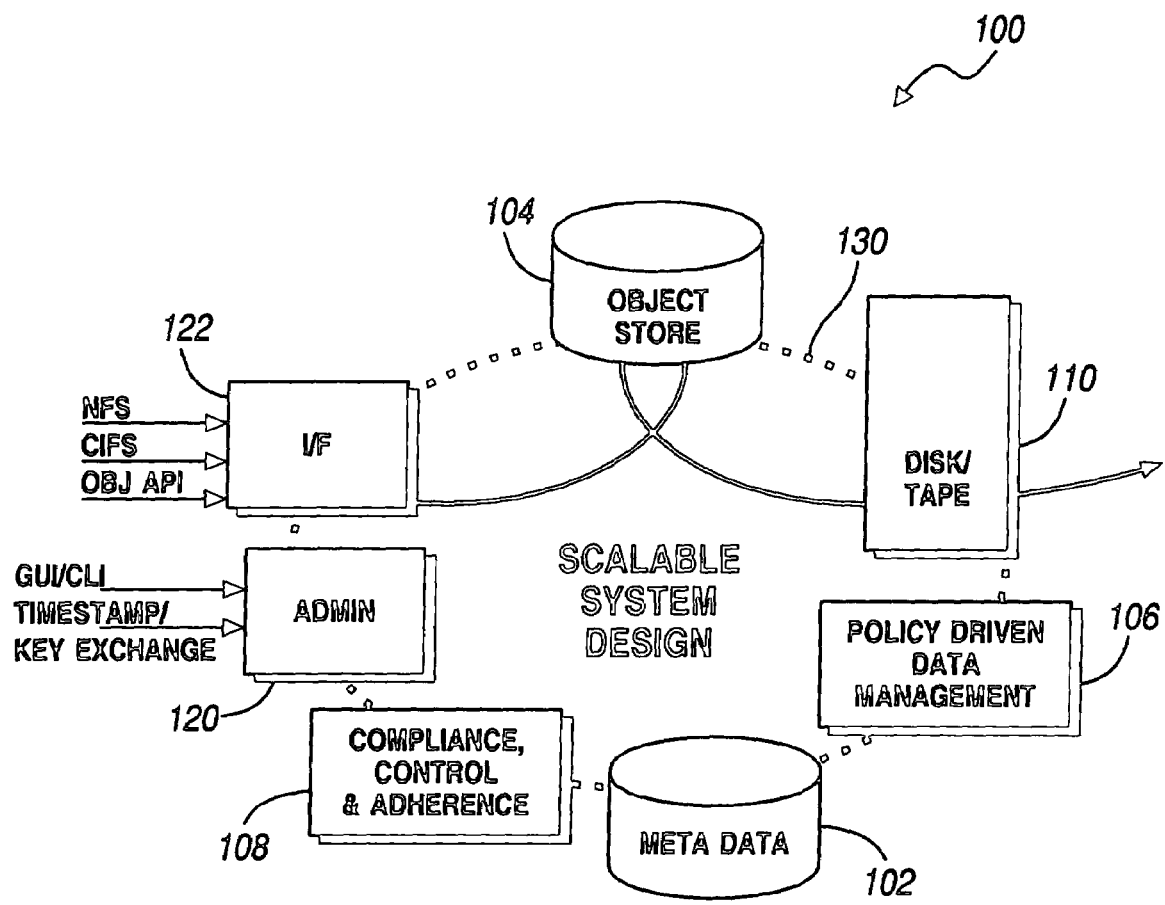
FIG. 1 is a diagram of an data archive system of the present invention.

With reference to the Figures, the preferred embodiments of the present invention will now be described in detail. Generally, the present invention provides an improved system and method for new and innovative techniques for the implementation of data storage systems.

The following abbreviations, acronyms and definitions are generally used in the Background and Summary above and in the Description below.

ACSLS: Automatic Cartridge System Library Software

API: Application Program(ming) Interface

ATA: Advanced Technology Attachment, a disk drive implementation that integrates the controller on the disk drive itself. There are several versions of ATA, all developed by the Small Form Factor (SFF) Committee:

ATA: Known also as IDE, supports one or two hard drives, a 16-bit interface and PIO modes 0, 1 and 2.

ATA-2: Supports faster PIO modes (3 and 4) and multiword DMA modes (1 and 2). Also supports logical block addressing (LBA) and block transfers. ATA-2 is marketed as Fast ATA and Enhanced IDE (EIDE).

ATA-3: Minor revision to ATA-2.

Ultra-ATA: Also called Ultra-DMA, ATA-33, and DMA-33, supports multiword DMA mode 3 running at 33 MBps.

ATA/66: A version of ATA proposed by Quantum Corporation, and supported by Intel, that doubles ATA's throughput to 66 MBps.

ATA/100: An updated version of ATA/66 that increases data transfer rates to 100 MBps.

ATA also is called Parallel ATA. Contrast with Serial ATA.

CBOD: Clustered Bunch Of Disks

CIFS: Common Internet File Services (Microsoft), Common Internet File System (Sun)

CLI: Command Line Interface

CM: Configuration Management

CP: Common Platform, where a platform is the underlying hardware or software for a system. For example, the platform might be an Intel 80486 processor running DOS Version 6.0. The platform could also be UNIX machines on an Ethernet network. The platform defines a standard around which a system can be developed. Once the platform has been defined, software developers can produce appropriate software and managers can purchase appropriate hardware and applications. The term is often used as a synonym of operating system. The term cross-platform refers to applications, formats, or devices that work on different platforms. For example, a cross-platform programming environment enables a programmer to develop programs for many platforms at once.

CP CM: Common Platform Configuration Management

Data object: A file that comprises data and procedures (i.e., routines, subroutines, ordered set of tasks for performing some action, etc.) to manipulate the data.

Data striping: Segmentation of logically sequential data, such as a single file, so that segments can be written to multiple physical devices (usually disk drives) in a round-robin fashion. This technique is useful if the processor is capable of reading or writing data faster than a single disk can supply or accept the data. While data is being transferred from the first disk, the second disk can locate the next segment. Data striping is different from, and may be used in conjunction with, mirroring (see below).

DB: Database

DBIF: Database Interface

DMF: Data Management File

Ethernet: A local-area network (LAN) architecture developed by Xerox Corporation in cooperation with DEC and Intel in 1976. Ethernet uses a bus or star topology and supports data transfer rates of 10 Mbps. The Ethernet specification served as the basis for the IEEE 802.3 standard, which specifies the physical and lower software layers. Ethernet uses the CSMA/CD access method to handle simultaneous demands. It is one of the most widely implemented LAN standards.

A newer version of Ethernet, called 100Base-T (or Fast Ethernet), supports data transfer rates of 100 Mbps. And the newest version, Gigabit Ethernet supports data rates of 1 gigabit (1,000 megabits) per second.

FC: Fibre Channel, A serial data transfer architecture developed by a consortium of computer and mass storage device manufacturers and now being standardized by ANSI. The most prominent Fibre Channel standard is Fibre Channel Arbitrated Loop (FC-AL). FC-AL was designed for new mass storage devices and other peripheral devices that implement very high bandwidth. Using optical fiber to connect devices, FC-AL supports full-duplex data transfer rates of 100 MBps. FC-AL is compatible with, and is expected to eventually replace, SCSI for high-performance storage systems.

FS: File server(s)

FTP: File Transfer Protocol

GigE: Gigabyte Ethernet (see above)

GNU: Self-referentially, short for GNUs not UNIX, a UNIX-compatible software system developed by the Free Software Foundation (FSF)

GUI: graphical user interface, a program interface that takes advantage of the computer's graphics capabilities to make the program easier to use. Well-designed graphical user interfaces can free the user from learning complex command languages. On the other hand, many users find that they work more effectively with a command-driven interface, especially if they already know the command language. The first graphical user interface was designed by Xerox Corporation's Palo Alto Research Center in the 1970s, but it was not until the 1980s and the emergence of the Apple Macintosh that graphical user interfaces became popular. One reason for their slow acceptance was the fact that they use considerable CPU power and a high-quality monitor, which until recently were prohibitively expensive. In addition to their visual components, graphical user interfaces also make it easier to move data from one application to another. A true GUI includes standard formats for representing text and graphics. Because the formats are well-defined, different programs that run under a common GUI can share data. This makes it possible, for example, to copy a graph created by a spreadsheet program into a document created by a word processor. Many DOS programs include some features of GUIs, such as menus, but are not graphics based. Such interfaces are sometimes called graphical character-based user interfaces to distinguish them from true GUIs. Graphical user interfaces, such as Microsoft Windows and the one used by the Apple Macintosh, feature the following basic components:

pointer: A symbol that appears on the display screen and that you move to select objects and commands. Usually, the pointer appears as a small angled arrow. Text-processing applications, however, use an I-beam pointer that is shaped like a capital I.

pointing device: A device, such as a mouse or trackball, that enables you to select objects on the display screen.

icons: Small pictures that represent commands, files, or windows. By moving the pointer to the icon and pressing a mouse button, you can execute a command or convert the icon into a window. You can also move the icons around the display screen as if they were real objects on your desk.

desktop: The area on the display screen where icons are grouped is often referred to as the desktop because the icons are intended to represent real objects on a real desktop.

windows: You can divide the screen into different areas. In each window, you can run a different program or display a different file. You can move windows around the display screen, and change their shape and size at will.

menus: Most graphical user interfaces let you execute commands by selecting a choice from a menu.

GUUID: Global/Universal User Identity

HA: High Availability

Hash: A function (or process) that converts an input (e.g., a input stream of data) from a large domain into an output in a smaller set (i.e., a hash value, e.g., an output stream). Various hash processes differ in the domain of the respective input streams and the set of the respective output streams and in how patterns and similarities of input streams generate the respective output streams. One example of a hash generation algorithm is Secure Hashing Algorithm-1 (SHA-1). Another example of a hash generation algorithm is Message Digest 5 (MD5). The hash may be generated using any appropriate algorithm to meet the design criteria of a particular application.

HBA: Host Based Authentication; Host Bus Adapter

HIPAA: Health Insurance Portability and Accountability Act of 1996

HSM: Hierarchical Storage Management, A self managing storage system of multiple hierarchies HTTP: HyperText Transfer Protocol. HTTP is the underlying protocol used by the World Wide Web. HTTP defines how messages are formatted and transmitted, and what actions Web servers and browsers should take in response to various commands. For example, when you enter a URL in your browser, this actually sends an HTTP command to the Web server directing it to fetch and transmit the requested Web page.

HTTPS: Hyper Text Transfer Protocol Secure sockets (see SSL)

IDE: Intelligent Drive Electronics or Integrated Drive Electronics. An IDE interface is an interface for mass storage devices, in which the controller is integrated into the disk or CD-ROM drive.

ILM: Information Lifecycle Management

IP: Internet Protocol. IP specifies the format of packets, also called datagrams, and the addressing scheme. Most networks combine IP with a higher-level protocol called Transmission Control Protocol (TCP), collectively, TCP/IP, which establishes a virtual connection between a destination and a source.

JBOD: Just a Bunch Of Disks. Used to refer to hard disks that are not configured according to RAID—a subsystem of disk drives that improves performance and fault tolerance.

LTO: Linear Tape, Open

LUSTRE (or Lustre): An association of the words Linux and Clusters. Lustre is a storage and file system architecture and implementation suitable for very large clusters. Lustre is Open Source software developed and maintained by Cluster File Systems, Inc., Cluster File Systems, Inc., 110 Capen St., Medford, Mass. 02155, USA, under the GNU General Public License.

MDS: Meta-data (or meta data or metadata) server

Meta data (or metadata or meta-data): Data about data. Meta data is definitional data that provides information about or documentation of other data managed within an application or environment. For example, meta data would document data about data elements or attributes, (name, size, data type, etc) and data about records or data structures (length, fields, columns, etc) and data about data (where it is located, how it is associated, ownership, etc.). Meta data may include descriptive information about the context, quality and condition, or characteristics of the data.

Mirroring: Writing duplicate data to more than one device (usually two hard disks), in order to protect against loss of data in the event of device failure. This technique may be implemented in either hardware (sharing a disk controller and cables) or in software. When this technique is used with magnetic tape storage systems, it is usually called "twinning".

NAS: Network Attached Storage

Network: A group of two or more computer systems linked together. Computers on a network are sometimes called nodes. Computers and devices that allocate resources for a network are called servers. There are many types of computer networks, including:

a) local-area networks (LANs): The computers are geographically close together (that is, in the same building).

b) wide-area networks (WANs): The computers are farther apart and are connected by telephone lines or radio waves.

c) campus-area networks (CANs): The computers are within a limited geographic area, such as a campus or military base.

d) metropolitan-area networks MANs): A data network designed for a town or city. home-area networks (HANs): A network contained within a user's home that connects a person's digital devices.

In addition to these types of computer networks, the following characteristics are also used to categorize different types of networks:

i) topology: The geometric arrangement of a computer system. Common topologies include a bus, star, and ring.

ii) protocol: The protocol defines a common set of rules and signals that computers on the network use to communicate. One of the most popular protocols for LANs is called Ethernet. Another popular LAN protocol for PCs is the IBM token-ring network.

iii) architecture: Networks can be broadly classified as using either a peer-to-peer or client/server architecture.

NFS: Network File Server (or System)

OSIO: Object Store Input Output

OST: Object Storage Target(s)

RAID: Redundant Array of Independent (or Inexpensive) Disks, a category of disk drives that employ two or more drives in combination for fault tolerance and performance. RAID disk drives are used frequently on servers but are not generally necessary for personal computers.

RAS: Reliability, Availability and Serviceability

RTV: Real Tape Volume

SSH: Secure Shell is a program to log into another computer over a network, to execute commands in a remote machine, and to move files from one machine to another. It provides strong authentication and secure communications over insecure channels. It is a replacement for rlogin, rsh, rcp, and rdist. SSH protects a network from attacks such as IP spoofing, IP source routing, and DNS spoofing. An attacker who has managed to take over a network can only force SSH to disconnect. He or she cannot play back the traffic or hijack the connection when encryption is enabled. When using the SSH slogin (instead of rlogin) the entire login session, including transmission of password, is encrypted; therefore it is almost impossible for an outsider to collect passwords. SSH is available for Windows, Unix, Macintosh, and OS/2, and it also works with RSA authentication.

S-WORM: Secure (or Specialized) Write Once, Read Many. In one example, a non-erasable, non-rewritable, tape media based write once, read many data storage where, when information is written to the tape media, additional information can be added, appended, or read, however, the information can not be changed, modified or deleted.

SAMBA (or Samba): A suite of programs running under UNIX-like operating systems that provide seamless integration between UNIX and Windows machines. Samba acts as file and print servers for DOS, Windows, OS/2 and other Server Message Block (SMB) client machines. Samba uses the SMB protocol which is the underlying protocol used in Microsoft Windows networking. For many networks Samba can provide a complete replacement for Windows NT, Warp, NFS or Netware servers. Samba most commonly would be used as a SMB server to provide Windows NT and LAN Manager style file and print services to SMB clients such as Windows 95, OS2 Warp, smbfs and others. Samba is available for a number of platforms such as AIX, BSDI, Bull, Caldera, Debian, DigitalUnix, IRIX, OSF, SCO, Slackware, SuSE, TurboLinux, HP, MVS, Novell, RedHat, Sinix, Solaris, VMS, and others. Samba is available under GNU public license.

SAN: Storage Area Network

SCSI: Small Computer System Interface, a parallel interface standard used by Apple Macintosh computers, PCs, and many UNIX systems for attaching peripheral devices to computers.

SMB: Server Message Block (protocol); System Management Bus

SMP: Storage Management Policy(ies)

SNMP: Simple Network Management Protocol

SSL: Secure Sockets Layer, a protocol developed by Netscape for transmitting private documents via the Internet. SSL works by using a private key to encrypt data that's transferred over the SSL connection. Both Netscape Navigator and Internet Explorer support SSL, and many Web sites use the protocol to obtain confidential user information, such as credit card numbers. By convention, URLs that use an SSL connection start with HTTPS: instead of HTTP:. Another protocol for transmitting data securely over the World Wide Web is Secure HTTP (S-HTTP). Whereas SSL creates a secure connection between a client and a server, over which any amount of data can be sent securely, S-HTTP is designed to transmit individual messages securely. SSL and S-HTTP, therefore, can be seen as complementary rather than competing technologies. Both protocols have been approved by the Internet Engineering Task Force (IETF) as a standard.

TCO: Total Cost of Ownership

TCP: Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent.

UML: Unified Modeling Language (Object Management Group, OMG)

UUID: Universal User Identity (or Identifier)

VACS: Virtual Access Control Server

VFS: Virtual File Server or Virtual File System. The context of the particular use indicates whether the apparatus is a server or a system.

VTD: Virtual Tape Device

VTV: Virtual Tape Volume

WORM: Write-Once, Read-Many

The system and method of the present invention generally provide access and administrative management, name space management, and free space management. The access and administrative management generally includes policy driven and administration of storage management functions such as ability to specify the access control through user and resource credentials, support for credential migration of stored information, ability to expire and expunge data that is spread across functional areas, ability to specify the protection and performance characteristics across classification both from logical and physical storage perspective, and ability to specify life cycle attributes from an object to a collection of objects independent of the locality and ownership.

The name space management generally includes a presentation layer that allows the ability to present customer usable storage presentations (NFS/CIFS, HTTP, FTP, OSD, proprietary Object API), allows the scalability of presented name space without the constraints of standard FS limitations, ability to capture meta data associated with name objects, and ability to capture envelope and reference information along with presented data for content addressing.

The free space management generally includes a physical and logical storage management layer that allows the use of heterogeneous storage devices based on access patterns (fast and slow disks and tapes), ability to migrate and protect data without intervention, consolidate and spread captured data across geographic separation, and ability to protect and efficiently use physical storage through compression and encryption.

Referring to FIG. 1, a diagram of a high level system architecture of a system 100 the present invention is shown. The system 100 is generally implemented as a scalable data storage system. The system 100 is generally implemented as a virtual library system or virtual file system (VFS). The virtual file system 100 generally comprises a meta data subsystem 102, an object subsystem 104, a policy driven data management subsystem 106, a compliance, control and adherence subsystem (e.g., scheduler subsystem) 108, a data storage (e.g., tape/disk) subsystem 110, an administration subsystem 120, and a file presentation interface structure 122 that are coupled to provide intercommunication via a scalable mesh/network 130.

Figure 2:
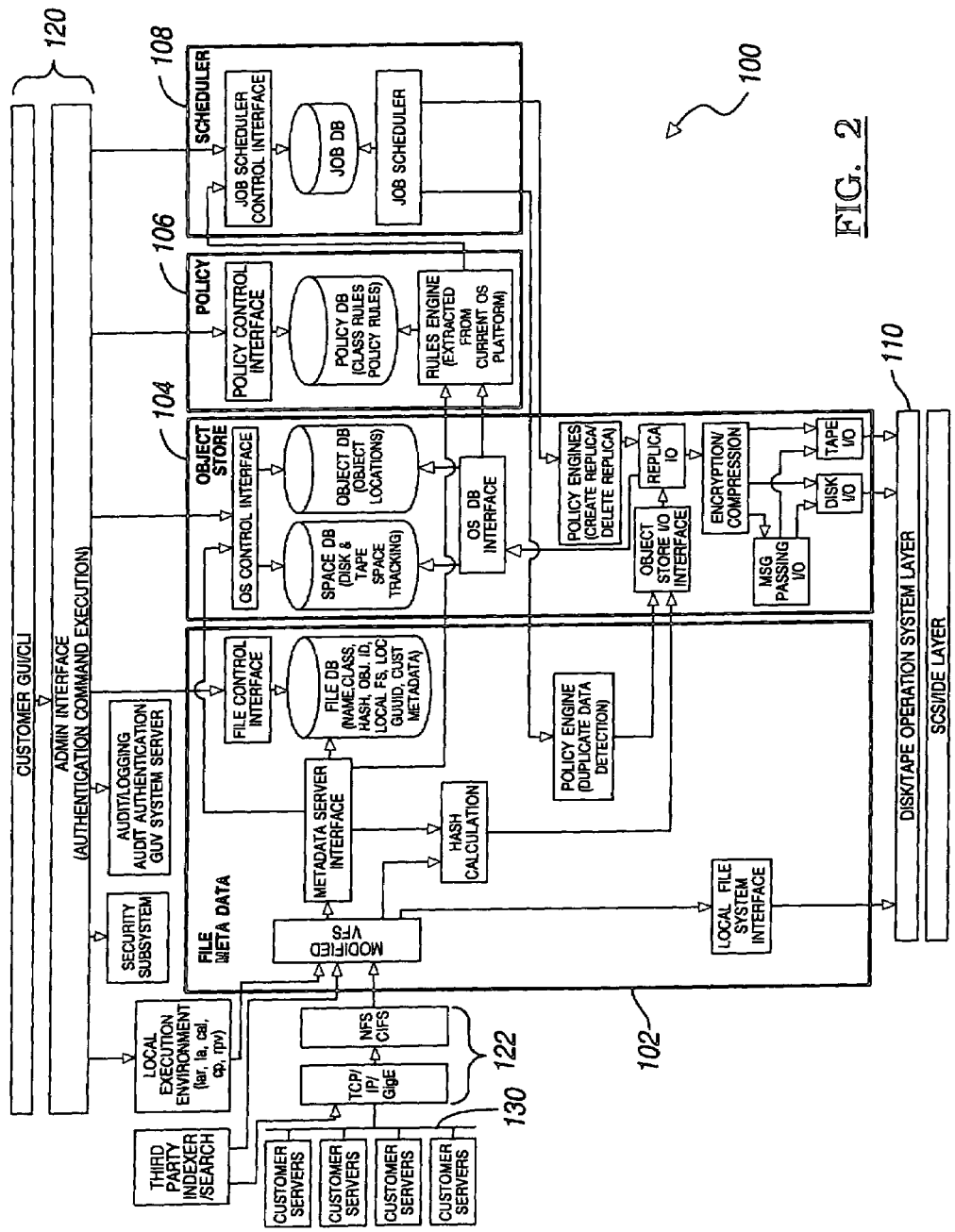
FIG. 2 is a diagram of a high level system architecture of the present invention.

Referring to FIG. 2, the file system and meta data file system 102 generally provides for the file system virtual file server (VFS) modifications to separate control and data path, directs data to object store, provides on the fly and lazy SHA1 hash computation, duplicate detection and decision making, and for the meta data keeps track of presented file and object name space, object id, local file names, computed hash, customer provided metadata, relation to other rows in the meta data database, and communicates with administration interface 120 and object store 104 to control and set the policies.

The object store 104 generally includes a control interface that works with object ids, may be agnostic to type of data, manages location of data, provides space management of disk and tape, includes a replica I/O that works as a syscall I/O interface, creates and replicates objects from FS, directs and determines based on policy for compression and encryption, links to other object store through message passing, and provides efficient placement of data on tape and tape space management, and policy engines that may be directed by the policy subsystem 106 for synchronous replication and on demand creation of copies.

The policy subsystem 106 generally comprises a policy control interface that generally interfaces with the administration I/F subsystem 120 to collect class and policy definitions, maintains and processes class and policy definitions, extracts data management rules, and maintains the hierarchy of functions to be performed, and rules engines that interface with the scheduler 108 to perform on demand and lazy scheduled activities of replica creation and migration, and receive system enforced policies based on maintained file server (F/S) meta data.

The scheduler subsystem 108 generally comprises a job scheduler control interface that may be directed based on rules extracted from policy enforcement and the maintains the status of current and planned activity, and maintains priority of jobs to be performed, and a scheduler thread where system wide schedules are maintained. The scheduler thread can communicate and direct the object store 104 to duplicate, delete and migrate existing data, perform default system schedules and periodic audit, and may be directed by the FS subsystem 102 for deletion and expungement of data.

The administration interface subsystem 120 generally includes a GUI/CLI interface that supports HTTP and HTTPS with SSL support, supports remote CLI execution, provides and supports the functions of user authentication, administration of physical and logical resources, monitoring and extracting system activity and logs, and support of software and diagnostics maintenance functions, and an administration I/F that may communicate with all other major sub systems, maintain unique sessions with user personas of the system, and perform command and semantic validation of actions being performed.

Security and audit and logging subsystems may be coupled to the administration interface subsystem 120. The security subsystem generally provides for the creation of users and roles for each user and assigns credentials, provides the ability to create resources and resource groups and assigns role based enforcement criterion, maintains pluggable security modules for validation, interfaces with key management system for symmetric key management, and provides rules for client authentication for physical resources such as disks and tapes.

The audit and logging sub system generally provides system wide logging capability, threshold management of audits and logs at local processing environments, ability to provide different notification mechanisms (e.g. e-mail, SNMP traps, etc.), ability to filter and extract desired information, and configurable parameters for the type and length of audit information to be kept by the system.

Figure 3:
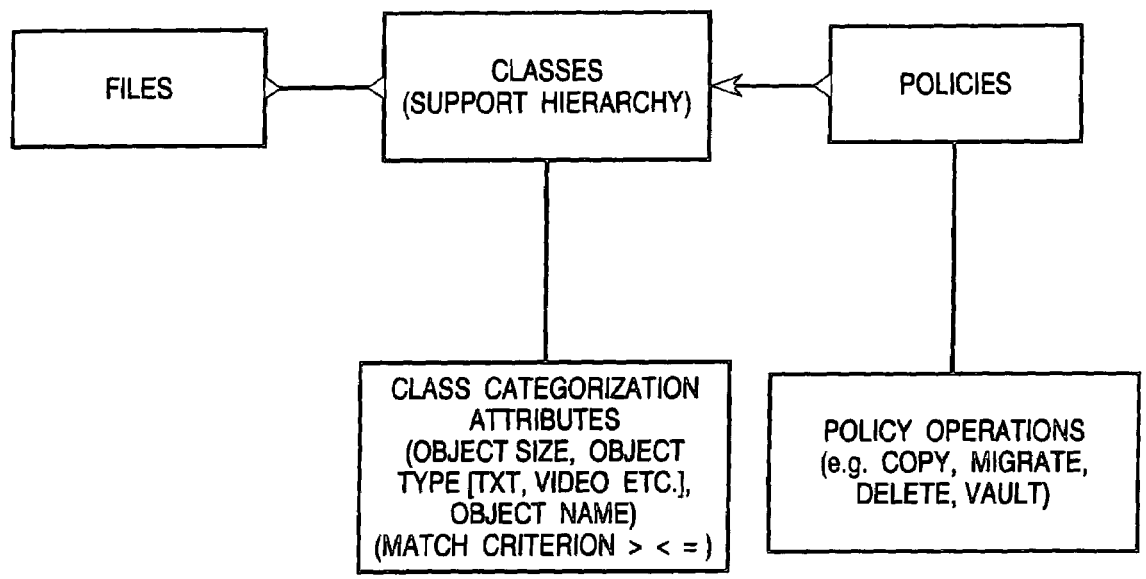
FIG. 3 is a diagram of class, policy and administrative relationships of the data storage system of the present invention.

Referring to FIG. 3, the major subsystems of the present invention generally provide the following characteristics:

1. Files have a many to many relationship to classes.

2. Classes support hierarchy.

3. Classes have a one to many relationship to policies.

4. Policy adherence is enforced by the hierarchical arrangement of classes.

5. All classes inherit parents policies.

6. Parent's policy can be overwritten by a child policy and is enforced by the system.

7. System has a default class that is a parent of all the classes within the system.

Figure 4:
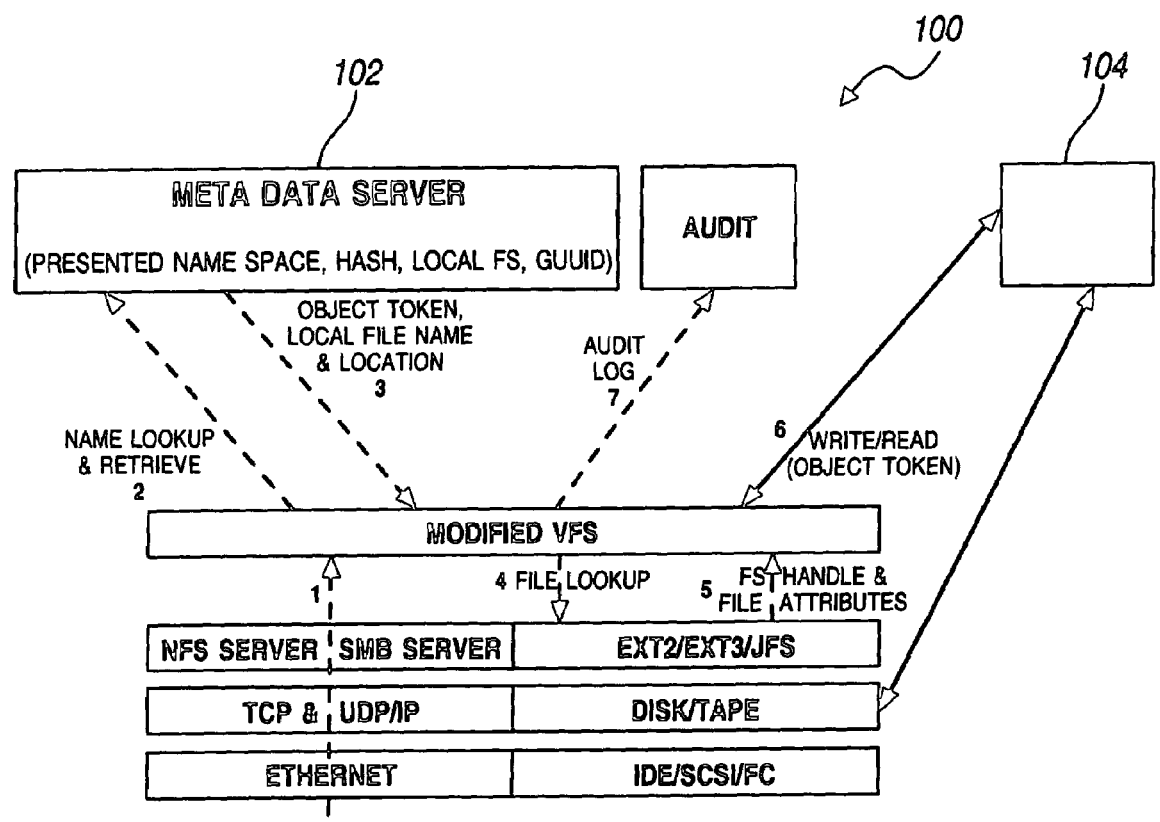
FIG. 4 is a diagram of a data flow of the data storage system of the present invention.

Referring to FIG. 4, a diagram of a data flow of the data storage system 100 of the present invention is shown.

Figure 5:
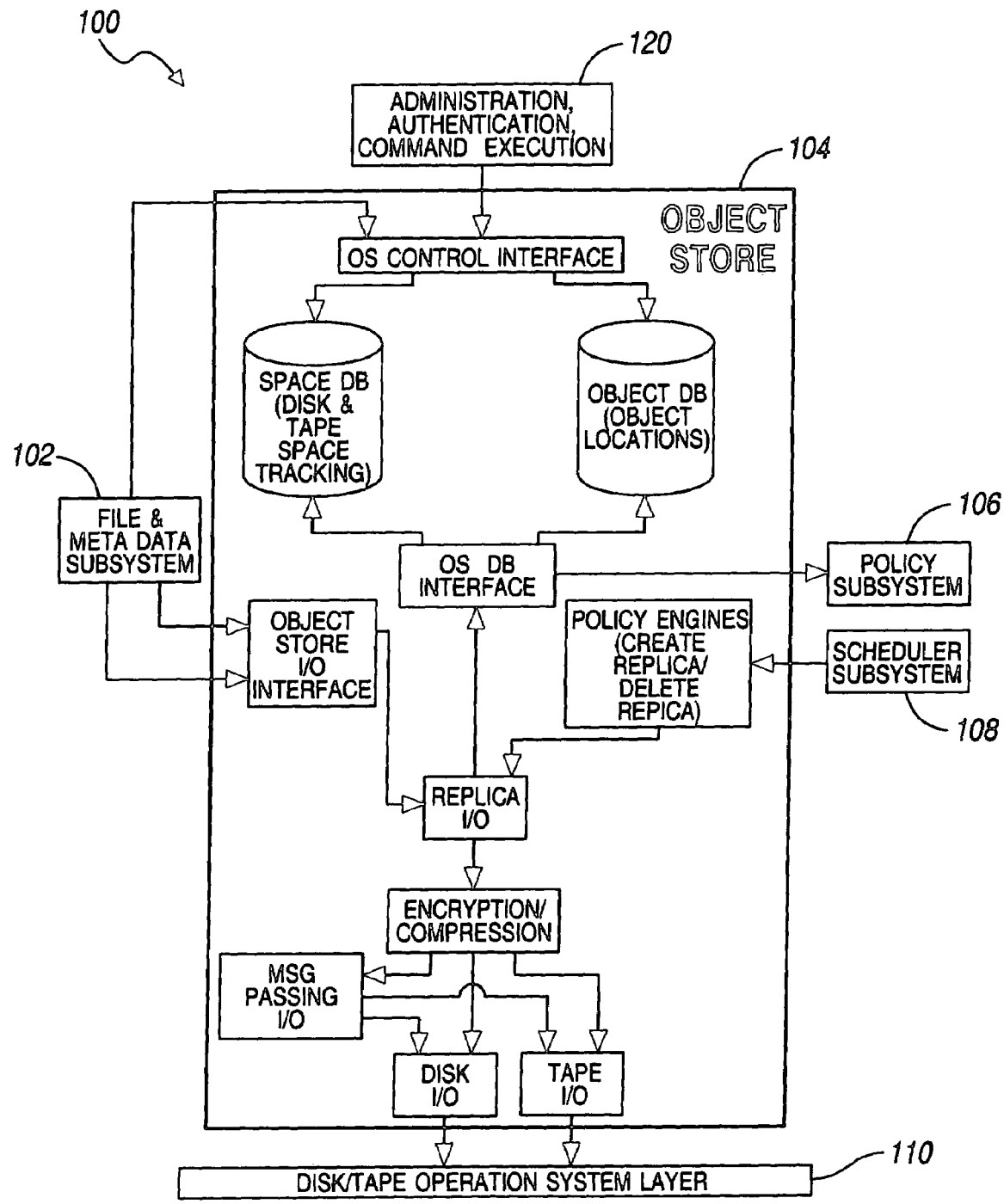
FIG. 5 is a diagram of object store data flow of the data storage system of the present invention.

Referring to FIG. 5, a diagram of object store data flow of the data storage system 100 of the present invention is shown.

Figure 6:
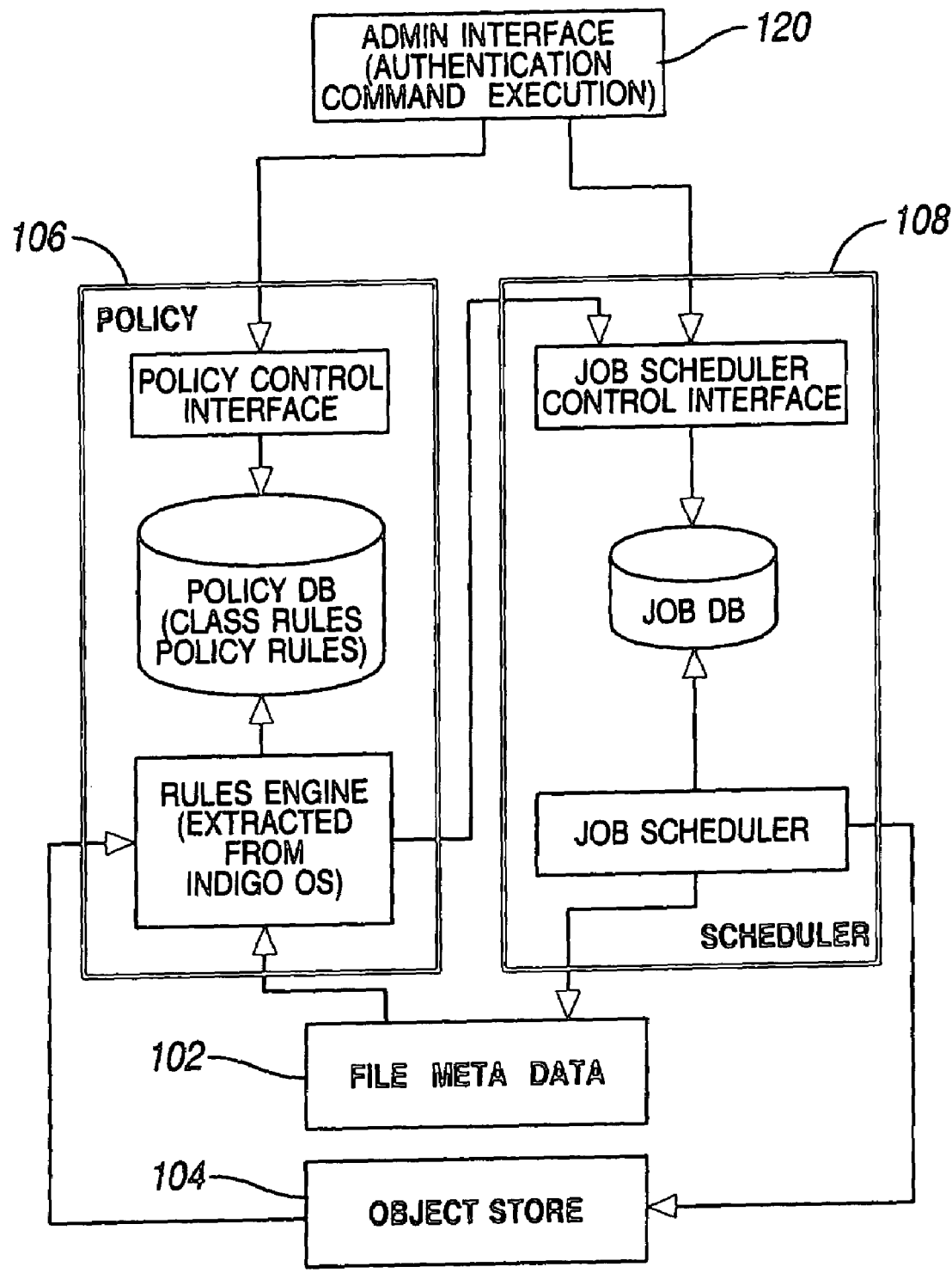
FIG. 6 is a diagram of policy and system scheduler subsystem data flow of the present invention.
Figure 7:
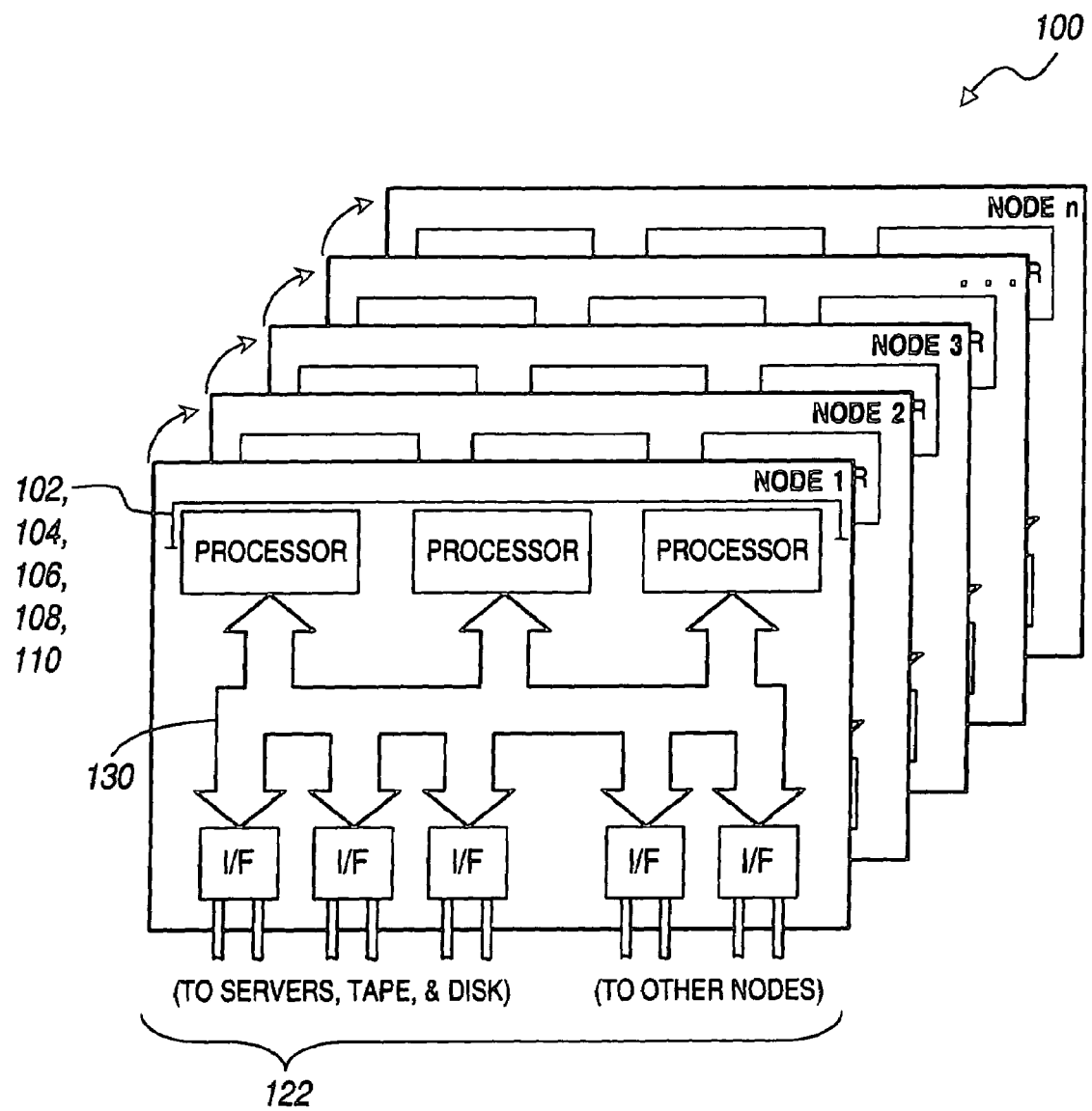
FIG. 7 is a diagram of hardware architecture of the data storage system of the present invention.

Referring to FIG. 6 is a diagram of policy subsystem 106 and system scheduler subsystem 108 data flow of the present invention;

Referring to FIG. 7, the hardware architecture of the present invention (i.e., the system 100) may have the following attributes: node-based, scalable by or within node, sourced hardware components, external manufacturability, leverage industry leaders in processor and interface technology, opportunity to add intellectual property, leverages industry cost curves and technology advancements, supports Fibre Channel, Gigabit Ethernet, and IDE/SCSI I/O interface types.

Figure 8:
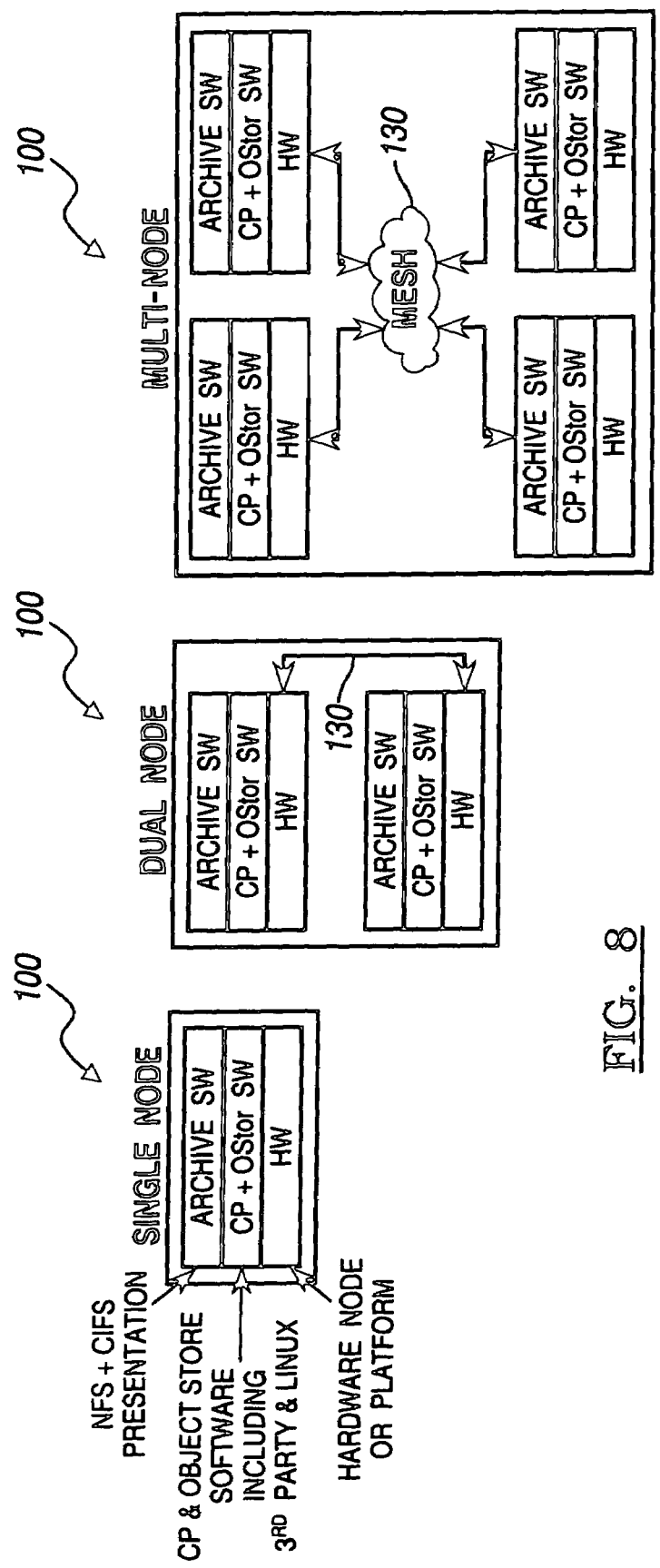
FIG. 8 is a diagram of an example of scaling of the data storage system of the present invention.

Referring to FIG. 8, the hardware architecture of the present invention (i.e., the system 100) may be scalable from a single node implementation to multiple node implementations.

The present invention may be implemented, in one example, using the hardware system components comprising a base chassis of 2 U Rack Mount Chassis (SuperMicro) with 6 SCSI I IDE Hard Drive Bays, Floppy Drive, CD ROM Drive, Redundant 400 Watt Power Supplies, 3+1 Redundant Fans, Motherboard with 6 PCI-X Slots (SuperMicro) that supports FC HBAs, IDE Raid controller and Gigabit Ethernet NICs, Dual 2.4 Ghz XEON Processors (Intel), a 80 GB IDE Hard Drive, a 4 GB DDR Memory with ECC, and an Gigabit Ethernet switch to scale 2 or more nodes.

Figure 9:
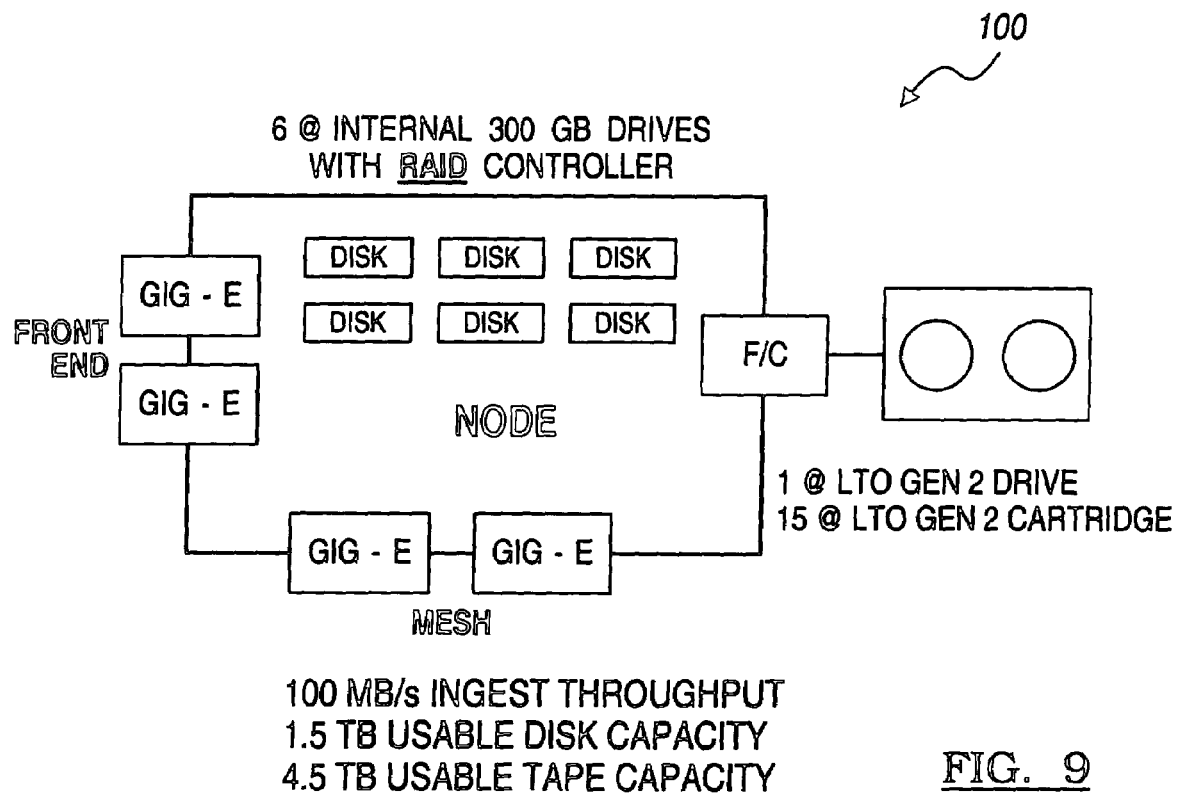
FIG. 9 is a diagram of an example of a basic node of the data storage system of the present invention.

Referring to FIG. 9, a single node example implementation of the present invention is shown.

Figure 10:
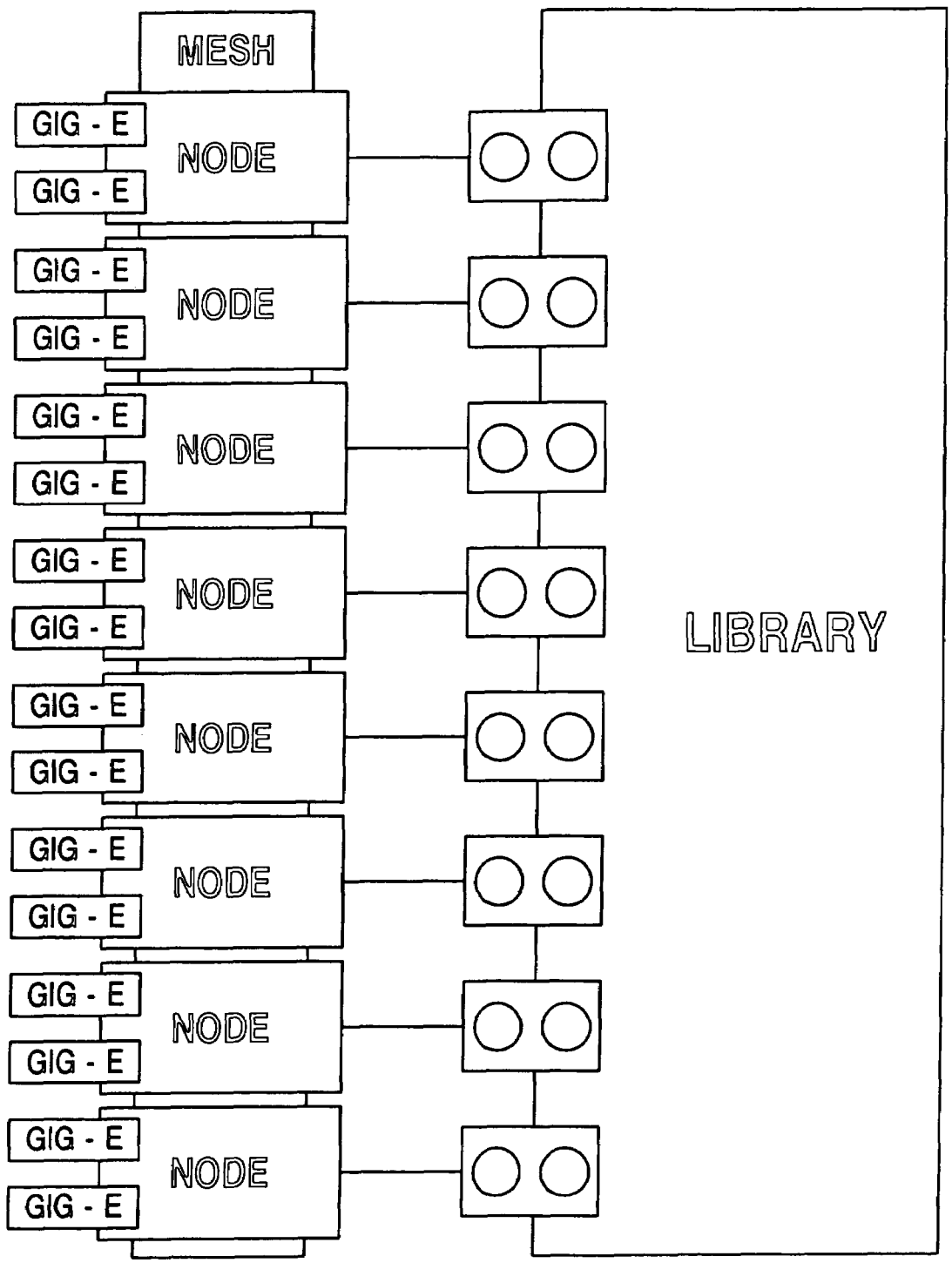
FIG. 10 is a diagram of an example of an eight node system of the data storage system of the present invention.

Referring to FIG. 10, a multiple node example implementation of the present invention is shown.

Figure 11:
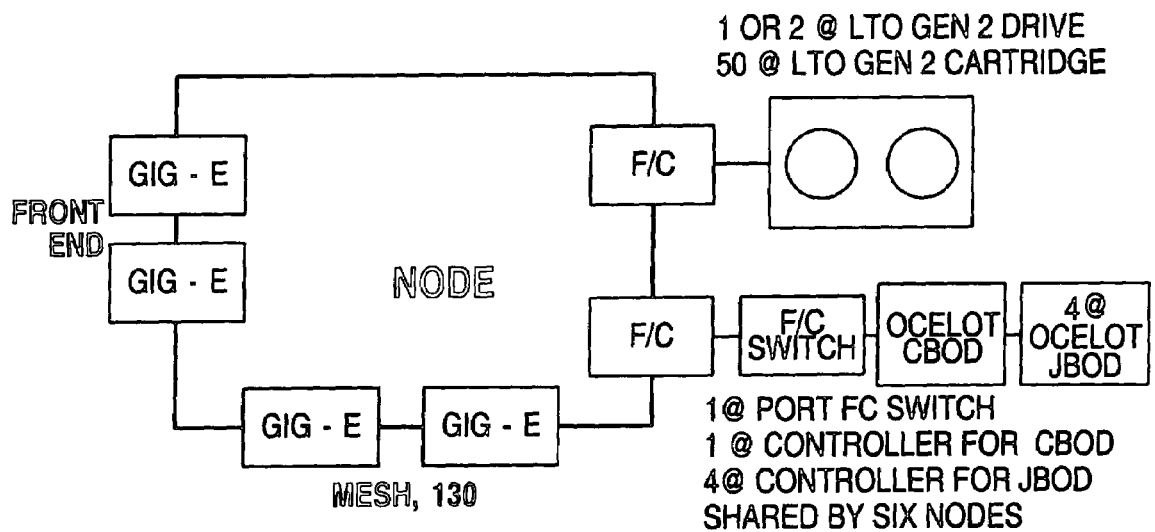
FIG. 11 is a diagram of a basic node with external disk of the data storage system of the present invention.

Referring to FIG. 11, another multiple node example implementation of the present invention is shown.

Figure 12:
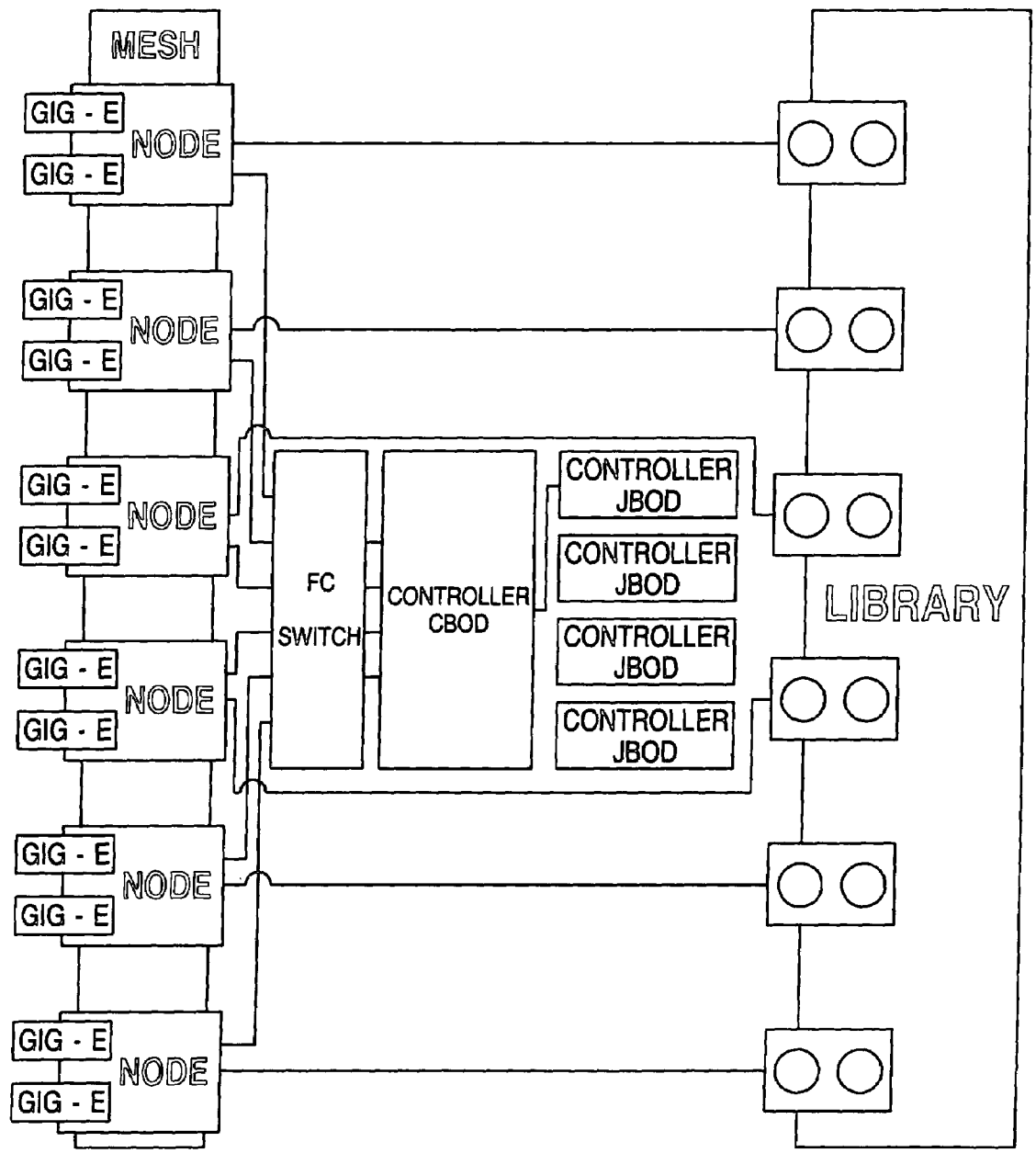
FIG. 12 is a diagram of a six node system with external disk of the data storage system of the present invention.

Referring to FIG. 12, yet another multiple node example implementation of the present invention is shown.

In general, the present invention may implement reusable services and components. For example, common platform services including CP initialization, run level and scheduling, having CP initialization, run level and scheduling architecture, startup/shutdown/restart of CP, high availability (HA), and application services, distributed scheduling on startup, distributed time-based startup of services, and definition of run levels, startup/shutdown scheme.

The common platform services may further include Administration Infrastructure having CP Command API architecture, design CP Command API, implement CP Command API, SNMP, include high availability service, HA service on Linux, providing CP APIs, cluster management, membership services, resource start/stop/monitoring, configuration management service, CP APIs for configuration rollback, semantic validation of conjured data, activation of saved configurations, and cluster wide configuration.

The common platform services may further include logging service/REM having cluster wide logging, event notifications through e-mail and SNMP, and system wide audit trail, file system service having CP APIs for file operations, file system operations, and directory operation, location service having lookup and notification service and registration and naming mechanisms. The common platform services may further include security service having authentication, authorization, security domain administration, and provide secured channel protocols such as SSH and HTTPS.

The common platform services may further include a message passing service having node to node efficient messaging, data path management having device discovery and zero copy memory management, and cluster wide physical device topology management, and software distribution having base OS and associated third party package management, separated download, installation and activation, and version management.

The object store services generally comprise an administration interface which may provide mechanisms for GUI and CLI interfaces, create a common framework for a virtual library system and other applications, interface with other subsystems for configuration and information display, and enforce command level security. The object store services may further comprise an object store that generally manages disk and tape storage, provides managed multiple media types, creates multiple copies, deletes copies per policy, moves data between nodes, controls tape libraries, manages disk and tape media, and performs media reclamation ("garbage collection").

The object store services may further comprise a policy engine that is generally separated from the virtual library system object store and that provides rules repository for data management, is consulted by object store, may file meta data to enforce rules, and provides relative time based controls. The object store services may further comprise a scheduler that performs scheduled functions, is a generic mechanism that is independent of specific tasks that are provided by other subsystems. The meta data database may, in one example, be tested to 10,000,000 rows, provide mirrored storage, automatic backup processes, manual backup and restore processes.

The present invention generally comprises a file server (FS) subsystem that provides a modified virtual file server (VF)S, a meta data server, hash calculation (e.g., using a hash calculation operator), duplicate data collection and file control interface. The present invention generally further comprises an object store that provides an OS control interface, a space management DB, object management DB, policy engines, replica I/O, object store encryption/compression, and disk and tape I/O. Yet further, a policy subsystem may provide policy control interfacing and a rules engine. A scheduler may include a job control interface and a job scheduler. The present invention generally further comprises an administration interface, a security subsystem, and audit subsystem, a third party indexer/application interface, and archive system hardware and software.

Figure 13:
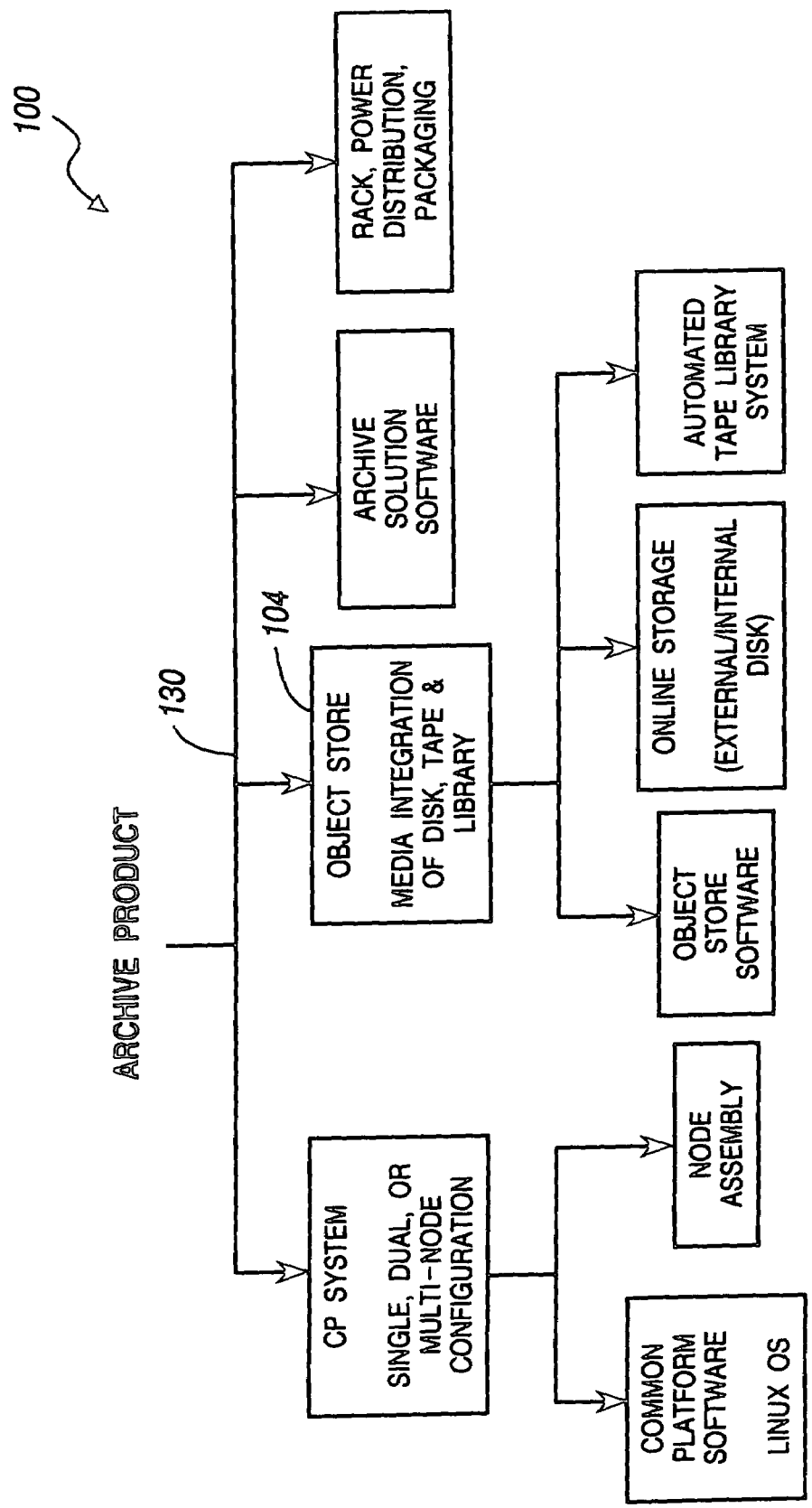
FIG. 13 is another diagram of the data storage system of the present invention.
Figure 14:
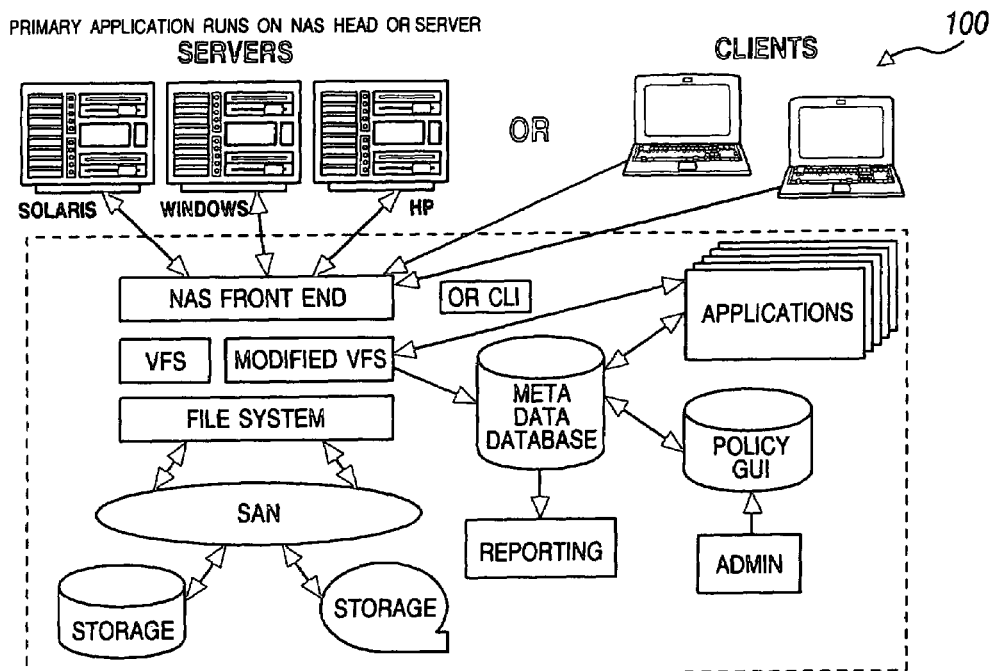
FIG. 14 is another diagram of the data storage system of the present invention.
Figure 15:
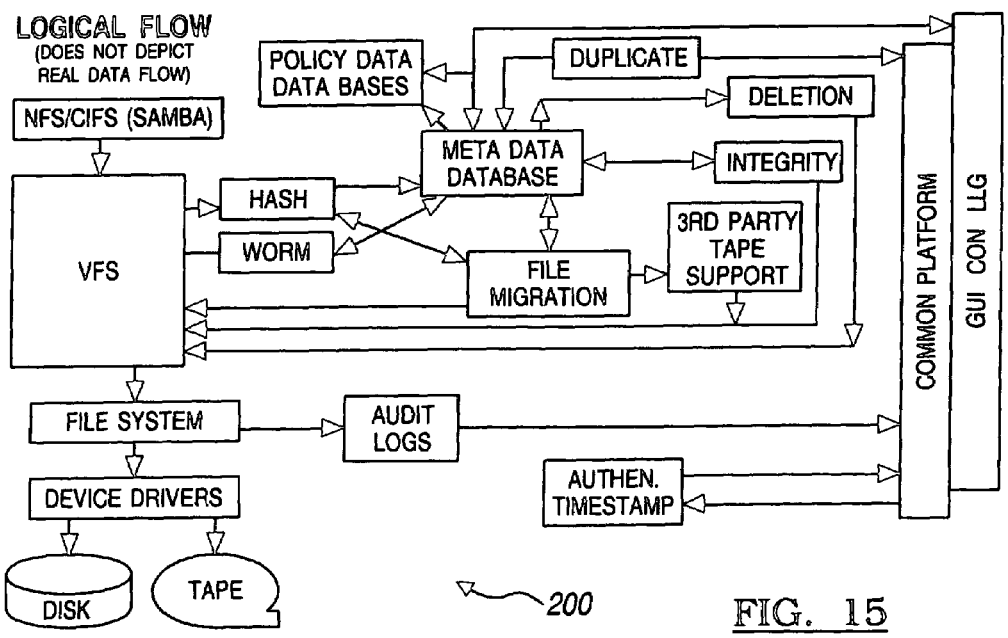
FIG. 15 is a diagram of logical flow of the data storage system of the present invention.

Referring to FIGS. 13-15, diagrams of alternative examples of the data storage system 100 of the present invention are shown. The present invention generally comprises the file meta data subsystem 102 that captures file level meta data, is, in one example, file based and, in another example, customer supplied, classifies files according to class rules, assigns unique ids (GUUID/serial number), stores file meta data in local FS, stores file data in object store, provides a file system API data interface, where NFS/CIFS can be placed in front of this API, and calculates/stores hash, optionally using timestamp.

The administration interface 120 may include archive specific commands, extended policy commands, and command level security checks. The object store subsystem 104 generally includes optimizations for small objects and grouping, mirrored write, remote storage, automatic movement to new media, policy based control on write-ability, encryption and compression, non-ACSLS based library control, and data security erase (expungement).

The policy engine subsystem 106 may be implemented separately from the object store subsystem 104 and may add additional rules such as integrity checking (hash based), read-only/write-ability/erase-ability control, and duplicate data treatment (leave duplicates, collapse duplicates), controls for policy modifications, absolute time based controls. The scheduler subsystem 108 may include "fuzzy" timing.

The present invention generally comprises a product that will meet the desires for compliant storage and data management. The solution may be a combination of hardware and software that will leverage a common platform and extend the Linux file system to provide S-WORM capabilities, policy based storage management, encryption and compression and ILM which align with the market desires.

The present invention generally provides unique tape support, and compression and encryption to deliver a system that meets the marketing desires. The present invention generally supports a broad base of features for most vertical markets with "compliance" desires and data management to tape. The present invention generally provides robustness of feature sets to the product line to increase ILM capabilities and address specific vertical market desires. The present invention generally provides an evolutionary approach to satisfy compliance desires and may create a clear path for the customer to work within their current data storage and protection processes to meet their compliance desires. The present invention generally leverages current initiatives to deliver a complete solution that meets the customs data migration, protection, and retrieval desires as well as pricing desires.

The present invention generally provides storage solutions that vary depending on business desires and regulatory risk, access desires, and customer compliance solution sophistication. The present invention may fulfill desires that are not being addressed currently. The present invention generally provides data storage to store-copy and catalog, data integrity to verify on create, copy and rebuild, verify on demand, and verify on schedule, data retention control to set expiration policies, expire data, expunge data, and authoritative time source.

The present invention generally further provides audit for customer defined audit information, for store of audit information, and for report audit information on demand, data protection for third party backup and restore and integrity verification on restore, data migration volume to volume, disk to disk, disk to tape, etc. as initiated by customer, policy or system, and data consolidation, duplicate data detection that may be customer enabled per customer defined policy, data encryption that may be customer enabled, conforms to U.S. federal regulations, and is replaceable with alternative algorithm.

The present invention generally further provides data compression that may be customer enabled, data serialization having serial numbering for each file and that may be user definable, digital shredding that may be customer enabled and that conforms to US federal regulations, meta data implemented as file system meta data, compliance regulated meta data, and user specified meta data, search on content and meta data, and proprietary API for third party applications and objectification.

Referring to FIGS. 14 and 15, customers may be able to use the system 100 as a NAS appliance or as a repository for other servers. The customer may be able to use the GUI to select the policies for each directory or use the subsystem as a file server (e.g., a virtual file server) without compliant storage. In one example, a two node subsystem filer with storage from 600 GB to 24 TB may be employed. Applications and document mangers will generally communicate directly with the appliance using standard network protocols (e.g., NFS and CIFS) without requiring any special APIs. In another example, two multiple nodes and expandable storage may be implemented via the common platform program and APIs may be deployed.

Figure 16:
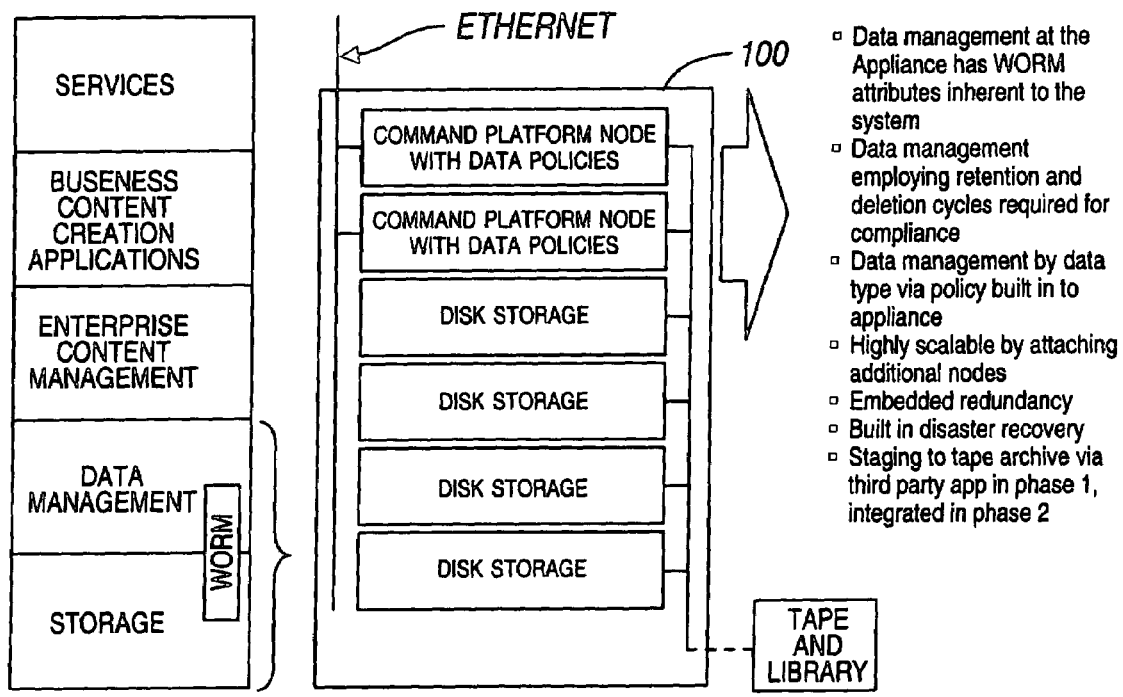
FIG. 16 is a diagram of a secure data management appliance of the data storage system of the present invention.

Referring to FIG. 16, the secure data management appliance 100 of the present invention generally includes an Ethernet electrical couple of common platform nodes with data policies, disk storage, and tape and a library. The present invention generally provides data management at the appliance 100 that has WORM attributes inherent to the system, data management employing retention and deletion cycles as used for compliance, data management by data type via policy built in to the appliance 100, that is highly scalable by attaching additional nodes, has embedded redundancy, built in disaster recovery, and staging to tape archive via third party applications, in one example, and is integrated in another example.

The compliant storage subsystem and data manager of the present invention generally implement software modules to perform the scheduled tasks or functions initiated by policy and data class. The scheduled tasks or functions are generally the following functions and are graphically described below in connection with FIGS. 18-40. Each module is generally designed to support a desire or multiple desires as described below. When referring to support of a desire or regulation, the details are generally created as part of the overall design.

The VFS module corresponds to the modifications to a conventional virtual file system (including a virtual file server). The VFS module is where all inline modifications, appends, or information generated are generally performed, where a synchronous hash is created as well as other synchronous events and serialization. The replication is generally responsible for moving, replicating, migrating, checking for duplicate files, rebuilding, and may initiate tape application and may have library sharing capabilities. Replication of data at the directory level asynchronously will take place to create, in one example, 1 to 100 instances of the data as well as more advanced functions.

The deletion module is generally responsible for data retention, audits, digital shredding, and supports higher functions. The deletion module will generally work in conjunction with the configuration GUI. The integrity module is generally responsible for verifying the integrity of the data at any point in time after the data was originally stored. The integrity module also will generally perform the functions of verifying integrity after restores, restores of a RAID group, migrated data, copied data, and work with the file migration module. All integrity verification will generally be done at the file level.

The file migration module is generally responsible for the migration of data from one subsystem and will generally support legacy series libraries by third party software running in the application space. Additionally, the virtual library system will generally be used for tape management an error handling and will generally run on the same server. Remote migration of files or directories will generally take place node to node in one example implementation, and may not have remote peripheral support. Secure WORM will generally be customer orderable and supported. In another example, the file migration module may have a high degree of integration, eliminating the use of the third party application by further integrating with the virtual library system roadmap. The virtual library system may be transparent to the customer.

The audit module is generally responsible at a system level to collect logs, and replicate logs about system activity. An authoritative time source will generally be added to the audit module that will rely on an external source where the customer allows, and use an addition server where the customer wishes to be self contained. Time synchronization with the external source will generally occur and logs of the time changes will generally be kept. The audit module is primarily complete and a reuse from the common platform.

The data base module may be a relational database that will contain meta data and information about configurations, retention, migration, number of copies, and will eventually be a searchable source for the user. Additional fields for customer use may be defined and accessed via the GUI. All policies and actions may be stored in the data base module for interaction with other modules.

The configuration GUI module will generally be the user interface to define the variable activity that each directory or file will have associated with it. Selections and information will include but is not limited to, file retention period, copies, migration, shredding, compression, audit viewing, serialization, number of copies, and certificate viewing. The configuration GUI module will generally set the policies on data and record data classes in the data base.

The hardware components of the compliant storage of the present invention may include a low end solution, new integrations of a mid range solution and the upper end solution using appropriate data storage hardware. In one example, the compliance product will employ a standard 19" rack with dual power. The server will be initially a Supermicro 2 U appliance with the common platform services loaded. The entry level appliance will not have external disk storage but will have an internal PCI to RAID to ATA drives. A server with 12 disk drives may be included. The larger unit may have a PCI to RAID to FCAL card and will not use the D series controllers. This approach may reduce cost, as well as improve the way the common platform provides an HA component when compared to conventional approaches. In another example, the use of the D series controller may be implemented dependant on the success of the PCI to RAID to FCAL.

Integration, power packaging and cooling as well as agency testing may be performed. Reliability and serviceability may be recalculated based on these features. This hardware solution will generally provide a physical tamperproof enclosure to ensure storage cannot be removed without proper security. Key interfaces may be Ethernet and FCAL (back end to disk). Client and server access will not take place across multiple protocol stacks, in one example, but will support CIFS, SMB and a proprietary API.

Features of the present invention may include SWORM disk, encryption NFS, CIFS, and SMB interface, compression, data classes, data storage, Data integrity migration integrated with compatible products, data retention control, duplicate detection, audit, user defined meta data, data protection, search, data serialization, digital shredding, basic migration to other series, tape support through third party, compliance with retention management, improved data security, increased usable capacity, open platform—file system, tighter integration, better performance when compared to conventional approaches, better tape management, integrated ILM, integrated data protection, both remote mirror and backup, improved retrieval capabilities, and SEC 17a-X compliance. The development platform may leverage existing Linux tools included in the common platform distribution.

The present invention generally provides features and performance that are superior to conventional approaches for cost, data management, feature coverage, performance, scalability, audit capability, external and integrated backup capability, replication, serialization, encryption, compression, ILM (policy-based disk and tape), retention management, expunge management, system performance for very large (e.g., 100 k or more files, and 800 files/s and 800 mB/s) implementations, and scalability of total storage (e.g., 0.6-64 TB) within a cabinet/library.

The present invention generally provides an archive storage solution (e.g., the system 100, hereinafter referred to as "SYSTEM") of "GA" quality that will provide interoperability with a reasonable number of systems and applications external to the SYSTEM. The desires below are organized into logical sections of related functionality. The customer may be able to logically group data with the same business desires. Storage desires can then be mapped to business desires to drive storage management actions (e.g., type of storage device, how frequently to back up the data, when to migrate data from one storage device type to another, how many copies of data to maintain, etc.). The customer may have the ability to define up to 5,000 unique classes of data. The customer may have the ability to define a SYSTEM default data class. Data may be associated with more than one class.

The customer may be able to define the data class naming semantic. The customer may have the ability to maintain (i.e., add, change, delete) data class definitions during normal SYSTEM operation. For new, modified or deleted data class definitions, all existing data in the SYSTEM will generally immediately map to the new or modified classes. If a data class is deleted, the SYSTEM will generally assign the SYSTEM default class to the data that no longer is associated with a class. Data association with classes will generally be done at the file level. Data association with classes will additionally be at the object level. Class definition may include access attributes, type of storage, retention type, number of copies and storage type, location, type—protected, performance, archive, read only indicator, and expungement. Classes may be directory based.

The storage system may manage data automatically, according to predetermined policy. Policy driven storage generally eliminates the chance of human error and may greatly reduce total cost of operation. Policies may apply to retention, deletion, migration and audit. The SYSTEM will generally use policies to direct its storage and data management functions. The customer will generally have the ability to establish a unique policy for each class of data. The SYSTEM will generally provide an easy-to-use interface for the customer to define these policies. The customer will generally have the ability to maintain (i.e., add, change, delete) policies during normal SYSTEM operation. For new, modified or deleted policies, the customer will generally have the ability to specify whether the change will take effect immediately or at some future date specified by the customer.

The SYSTEM will generally continuously manage the storage, retention and protection of the policies. The SYSTEM will generally have the Customer to explicitly select policy elements. Defaults will generally not be provided. The SYSTEM will continuously maintain its compliance with established policies. Compliance will include, for example, deleting copies of data that are no longer used by policy. The customer will generally have the ability to define a policy precedence hierarchy (i.e., which policy or policies take precedence when a policy conflict exists). The SYSTEM will generally not allow a manual data management action initiated by a SYSTEM administrator or any other user to cause a policy to be violated. The SYSTEM will generally provide the desirable executors, or links to third-party executors, which will carry out the actions specified by the policies. The SYSTEM will generally additionally provide an external interface for third-party applications to establish policies. All policy maintenance actions will generally be recorded in the audit log.

The customer is generally able to prohibit unauthorized access to SYSTEM functions. Generally users only, client identity is generally restricted. The customer will generally have the ability to establish access controls for a reasonable number of personae. These controls will govern access to SYSTEM functions (e.g., policy definition, manual backup initiation) and SYSTEM data (e.g., audit logs, SYSTEM service data). The customer will generally have the ability to restrict maintenance of the access controls to one or more personae. The SYSTEM will restrict external access to functions except as authorized by the customer-defined access controls.

The data storage desires generally establish the basic storage desires of the SYSTEM users—how and where to store data, what device and media types to use, how many copies of data to make, etc. For example, asynchronous replication release and synchronous replication may be provided. For each class of data the customer will generally have the ability to establish a unique policy that specifies the storage device and/or media type to be used by the SYSTEM to store the data. For each class of data the customer will have the ability to establish a unique policy that specifies the geographic location or geographic separation of data being stored by the SYSTEM. For each class of data the customer will have the ability to establish a unique policy that specifies how many copies (e.g., 1-100) of the data should be created at the time of initial data storage.

Customers will generally have the ability to specify how the SYSTEM provides "write completion" status when multiple copies are being created and stored. The options generally are:

a. "Write complete" is provided after 'n' copies of the data are successfully written to the target media. The customer will have the ability to define 'n' as, for example, 0-100.

b. "Write complete" is provided after 'n' copies of the data are successfully written and integrity verified. The customer will have the ability to define 'n' as, for example, 0-100.

The SYSTEM will generally automatically create and store data copies according to customer-defined policy without requiring customer or external application intervention or action. Data stored in the SYSTEM will generally be protected from erasure or overwriting through the standard application read/write interface. The SYSTEM will generally periodically perform a "garbage collection" to free up space that is no longer used to store data. During initial SYSTEM configuration the customer will generally specify the frequency of garbage collection execution. This specification may be implemented as a SYSTEM-wide option. The customer will generally have the ability to modify the garbage collection frequency at any time after initial SYSTEM configuration, and during normal SYSTEM operation. The modification will generally take effect immediately. The SYSTEM will initiate the movement of data in support of SYSTEM configuration changes (e.g., to support migration to a new device or media technology), as long as the SYSTEM maintains compliance with customer established policies. The SYSTEM will generally have the ability to consolidate data from one or more devices and/or media types to a new device and/or media type, and to accommodate policy changes.

The data input and output desire generally establishes how systems and applications external to the SYSTEM are to use the system for data storage. The SYSTEM may support concurrent access from "many" multiple end users and applications, and across protocol stacks. The SYSTEM will generally support input and output of data using the following file system under the assumption that files do not have to be shared.

a. NFS b. CIFS/SMB

The SYSTEM may additionally support input and output of data using the following methods:

a. HTTP 5.4.

b. Object-based API

No access to the data stored in the SYSTEM will generally be allowed other than by the input/output methods specified above.

The customer generally trusts that data stored in the archive can be accurately retrieved at any future point in time. The data integrity implementation generally addresses that desire by specifying software-based data integrity validation to help ensure data has not changed. Validating the integrity of data is not exclusively a compliance desire, but some compliance regulations do imply such a capability depending on the storage media used. Offsite copies may be administered separately or by the SYSTEM.

In one example, the SYSTEM may verify the integrity of the data immediately after it is first stored. The SYSTEM will generally be able to verify the integrity of data at any point in time after the data was first stored. The customer will generally have the ability to specify the frequency at which the SYSTEM will periodically verify the integrity of stored data. The SYSTEM will generally automatically rebuild any copy of data that is lost or corrupted. The SYSTEM may immediately verify the integrity of data that has been copied, moved, restored or rebuilt (e.g., RAID volume rebuilds, lost copy) for any reason. The source of data that is being moved will not generally be deleted until the integrity of the target data has been verified. Integrity checking will generally be done on a file basis. Integrity checking may additionally be done on an object basis. In one example, the technology used to perform integrity checking will be robust enough to permit no more than a 1 in 2 to the $80^{th}$ power chance of another file or object appearing to be identical (e.g., SHA-1, SHA-256, or any other appropriate cryptographic hashing algorithms).

When storing data in an archive the customer generally specifies how long the data is desired to be retained, and the SYSTEM generally ensures that is accomplished using data retention control. For each class of data, the customer will generally have the ability to establish a unique policy that assigns an expiration date beyond which the data is generally no longer protected from erasure or overwriting. The customer will generally have the ability to erase or overwrite data once the data expiration date has been reached. The customer will generally have the ability to specify the expiration date as:

a. Month/day/year b. Number of days from current date (i.e., date when data is first stored)

c. Permanent

The expiration date will generally be established at the time the data is first stored. The expiration date cannot generally be altered except to extend the expiration date. The customer will generally have the ability to extend expiration dates for each file or class of data. The customer may additionally have the ability to extend expiration dates for each object. The data expiration date will generally be permanently associated with the data to which it refers. The SYSTEM may use an authoritative time source against which data expiration dates are compared. Behavior will generally be: System will depend on local_time, Expiration works on local_time, local_time can be synchronized with external time source, Authoritative external time source can be Authentidate, and All system time changes will be logged.

The authoritative time source cannot generally be altered once established at SYSTEM installation. For each class of data the customer will have the ability to establish a unique policy that specifies whether data whose expiration date has been reached should be automatically deleted by the SYSTEM. Expiration dates will generally be associated with files. Expiration dates my additionally be associated with objects.

Customers generally desire an audit trail of what happens within the SYSTEM and to the data to ensure the business desires have been met. Audit logs are generally a key to compliance with many regulations. The audit desire is generally prioritized as "Flex" in one example because audit could be provided in the same implementation as other compliance desires. For each class of data the customer will generally have the ability to establish a unique policy that specifies whether the SYSTEM should maintain an audit log. For each class of data the customer will generally have the ability to establish a unique policy that specifies the type of audit information to be captured and stored. At a minimum the audit options will generally include:

a. System installation/configuration b. Authoritative time source establishment c. System maintenance activities d. Successful read access of the data (Flex)

e. Initial data storage actions f. Data movement, copy, restore, and rebuild actions g. Policy maintenance actions h. Data class definition maintenance actions i. Data integrity checks actions and results j. Successful data alterations or erasures k. SYSTEM access control maintenance l. SYSTEM security control violations m. Policy conflicts and resolutions n. Data protection actions o. Duplicate data detections and resultant actions As applicable, audit records should generally indicate source of action (e.g., policy initiated, SYSTEM initiated, SYSTEM administrator initiated, etc). The SYSTEM will generally protect audit data from alteration or erasure. The customer will have the ability to access the audit log through an "easy-to-use" interface.

Data stored in the archive is generally protected in some manner. The SYSTEM generally allows for multiple copies of data to be stored on different media types and in separate geographic locations, but the customer may choose to use a traditional data protection application instead of, or in addition to, relying on internal SYSTEM data protection mechanisms. For each class of data the customer generally will have the ability to establish a unique policy that specifies:

a. How frequently the data will be backed up b. How many backup copies will be made c. The media and/or device type on which the backup copy (ies) will be stored d. How long the backup copy(ies) will be retained e. The geographic separation between the source data and the backup copy(ies)

f. The access security controls assigned to the backup copy (ies)

The SYSTEM will generally support as backup targets all the storage devices specified in the "storage device" desires section. The SYSTEM will generally automatically execute the data protection policies established by the customer. The customer will generally have the ability to initiate a restoration of data whose primary copy has been lost. The SYSTEM will generally verify the integrity of restored data before such data is made available for normal customer access. The customer may have the ability to manually initiate a data protection operation for any single class of data or group of data classes. "Manual" is meant to mean "other than by policy," initiated by a SYSTEM administrator.

The SYSTEM may not depend on third-party applications to perform its data protection functions. The customer will generally have the ability to use a third-party data protection application to make a backup copy or copies of the data stored in the SYSTEM via NFS or CIFS. The third-party data protection application will generally not have modification in order to perform its functions. The SYSTEM will generally support any third-party data protection application determined as desirable. Within reason, the SYSTEM will generally not be modified to support additional third-party data protection applications. The SYSTEM will generally support third-party data protection applications.

Data protection actions may be recorded in the audit log, may be performed at the file level, and may additionally be performed at the object level.

The data compression desire generally provides a TCO reduction benefit for the customer. For each class of data the customer will generally have the ability to establish a unique policy that specifies whether the SYSTEM should store data in compressed form. When selecting the compression algorithm a reasonable tradeoff will generally be made between SYSTEM performance and how much the data can be compressed. The SYSTEM will generally not compress data that has been previously compressed. The SYSTEM will take advantage of storage device compression capabilities if available and it is advantageous to do so.

Customers who are concerned about the security of their data may want the data to be encrypted at rest and/or in transit. In particular, some government agencies and government contractors, and well as commercial businesses, have stringent data security regulations. HIPAA, a healthcare industry regulation that addresses patient privacy, also uses patient data that is encrypted. For each class of data the customer will generally have the ability to establish a unique policy that specifies whether the SYSTEM should store data in encrypted form. The data encryption algorithm will generally conform to U.S. federal government regulations for function and export restrictions. A U.S. federal government customer will generally have the ability to replace the default SYSTEM encryption algorithm with one of their own choosing. The SYSTEM will generally support data that was encrypted by an external system or application. System will not implement decryption. The customer will have the ability to specify the scope of data encryption:

a. Data is to be encrypted at rest and during transmission internally within the SYSTEM (including making copies of data at different physical locations).

b. Data is to be encrypted as it is being transmitted to and from the SYSTEM.

The SYSTEM may provide for encryption key management per predetermined parameters and for digital shredding.

The ability for the SYSTEM to automatically migrate data (i.e., provide data migration) from one storage device or media type to another (e.g., between two disks, to remote tape, etc.), based on policies established by the customer, is at the heart of Information Lifecycle Management. The data migration desire generally provides clear differentiation in the market place for the SYSTEM. The SYSTEM will generally support the migration of data from a "source" volume (physical or logical) to "destination" volume (physical or logical). The device and media type and geographic location of the destination volume may be different than the device and media type and geographic location of the source volume.

For each class of data the customer will generally have the ability to establish a unique policy that specifies criteria for data migration initiation and the target storage device and/or media type and geographic location. For each class of data the customer will generally have the ability to initiate data migration through an administrator interface. Data that is migrated by the SYSTEM will generally be accessible by the external client application as if the data had not been migrated. For each class of data the customer may have the ability to establish a unique policy that specifies whether migrated data that is subsequently accessed should be moved to a different storage device/media type, and if so, the intended device/media type and the new criteria for subsequent migration (as described below). Data migration actions will generally be recorded in the audit log. Data migration will generally be done at the file level. Data migration may additionally be done at the object level.

The duplicate data detection desire generally provides a TCO benefit for the customer. The SYSTEM will generally have the ability to detect when data that is about to be stored is an exact copy of data already stored in the SYSTEM. This generally cannot be done until data is stored. For each class of data the customer will have the ability to establish a unique policy that specifies the action to be taken for duplicate data. The available actions will generally be:

a. Keep all copies (each uniquely identified), b. Keep only the original data and automatically delete the new, duplicate data, or c. Replace the original data with the new, duplicate data.

The detection of duplicate data will generally be recorded in the audit log. The action taken for duplicate records will generally be recorded in the audit log. Duplicate detection will generally be done on a file basis. Duplicate detection may additionally be done on an object basis. The technology used to perform duplicate detection will generally be robust enough to permit no more than a 1 in 2 to the 80th power chance of another file or object appearing to be identical. For each class of data the customer will have the ability to establish a unique policy that specifies whether the SYSTEM will generally conduct a bit-by-bit comparison of two files or objects that appear to be identical to ascertain whether they are, in fact, identical.

The client support desire generally establishes the client operating system platforms and client applications the SYSTEM will support. "Clients" are systems or applications that are external to the SYSTEM and are using the SYSTEM for an archive store. The SYSTEM will generally support any client platforms determined as desirable. Within reason, the SYSTEM will generally not implement modification to support additional client platforms. The SYSTEM may use NFS or CIFS interface and interact with any system that supports those protocols.

The SYSTEM will generally support e-mail file archiving and document management systems including PACS applications using DICOM specifications.

Similar to the desire for data encryption, some customers with special data security desires may want to ensure data that is deleted from the SYSTEM cannot be subsequently recovered by any means. Certain U.S. federal government regulations mandate an expungement capability. For each class of data the customer will have the ability to establish a unique policy that specifies whether data being erased is to be digitally expunged ("shredded"). The digital expungement will generally conform to U.S. federal government regulations. Data automatically deleted by the SYSTEM to maintain policy conformance will generally be subject to policy based expungement desires. For each class of data the customer will generally have the ability to establish a unique policy that specifies whether data being deleted from the SYSTEM should cause all copies of that data that may have been created (e.g., by a data protection application) to be deleted as well. Expunge for tape generally uses encryption or is applied to entire tape.

The data serial number desire, while not exclusively in support of compliance, typically is associated with the type of stringent record and process controls associated with regulatory compliance. For each class of data the customer will generally have the ability to establish a unique policy that specifies whether the SYSTEM should generate a serial number for every file stored. Additionally, for each class of data the customer will generally have the ability to establish a unique policy that specifies whether the SYSTEM should generate a serial number for every object stored. The customer will generally be able to define a serial number semantic to be used throughout the SYSTEM. Additionally, for each class of data the customer will generally have the ability to define a unique serial number semantic. For each class of data the customer will generally have the ability to define the starting serial number. Serial numbers will generally be generated sequentially in increasing order. The serial number will generally be permanently associated with the data to which it refers. Serial numbers will generally be unique within each class of data across the entire SYSTEM or complex of SYSTEMS.

Customers generally have a desire to quickly retrieve data from an archive as the business desires dictate. The ability to quickly locate the data (i.e., conduct a search), regardless of where in the archive SYSTEM the data is stored (e.g., disk, tape) is fundamental to the desire. The customer will generally have the ability to index and search for any content (e.g., text only, contextual search, metadata search, etc.) stored in the SYSTEM. The indexer engine may be externally or internally integrated. The search engine may be externally or internally integrated. The customer will generally have the ability to specify whether encrypted data is searchable. The SYSTEM will generally be able to exchange encryption keys with the application that stored the encrypted data in the SYSTEM, in order for the search mechanism to function.

Meta data may be the key to mapping business and application relevance to data. Meta data can generally be created by an application in a standard fashion (e.g., DICOM specification for medical images), or it may be customer-specific. Capturing and storing meta data is generally important to understanding the data itself. Meta data implementations may very well be a strong differentiator for an entity that implements the SYSTEM. For each class of data the customer will generally be able to define the meta data elements the SYSTEM should capture and store. Meta data will generally be permanently associated with the data to which it refers. In addition to metadata elements that are naturally available to the SYSTEM (e.g., from the file system—creation date, last access date, etc.), the SYSTEM may accept metadata as part of the application data input stream. Extended meta data may be defined at class/policy definition time.

The meta data protection desire generally specifies the storage devices the SYSTEM should support. The SYSTEM will generally support the following storage devices:

a. SCSI attached file libraries b. Libraries controlled through ACSLS, including WORM tape c. Disk storage internal to the SYSTEM's servers d. Any disk storage supported through a RAID controller The SYSTEM will generally be designed to support either internal disk storage (i.e., internal to the SYSTEM's servers) or external disk storage (i.e., Fibre Channel or SCSI attached), or a combination of both.

The performance and scalability desire is generally implemented in response to predetermined performance metrics. A baseline may be established that exceeds conventional approaches. The SYSTEM may scale from several TB to one PB. The SYSTEM may scale from several TB to 100 PB. SYSTEM performance will generally not be negatively affected by capacity increases.

The reliability, availability and serviceability (RAS) desire is generally implemented to meet or exceed predetermined reliability metrics. A baseline is generally established that favorably compares to conventional approaches. System upgrades (e.g., code changes) will generally be performed without disrupting normal SYSTEM operation. The SYSTEM may be fully redundant with no single points of failure.

The compliance desires generally address regulatory compliance. The SYSTEM will generally not allow data to be overwritten, deleted or otherwise altered by any person, application or other means (including, but not limited to, SYSTEM administrators and service personnel) until after the data expiration date has been reached. The expiration date assigned to data cannot generally be altered except to extend the expiration date. The SYSTEM will generally store, with the data, an authentic time stamp indicating when the data is first stored. The SYSTEM will generally afford the same data retention characteristics to the time stamp as it does the data to which the time stamp refers.

Time stamps will generally be implemented on a file basis. Time stamps will additionally be implemented on an object level basis. The SYSTEM will generally support the storage-related regulations as determined desirable, with reasonable effort and at reasonable cost. In other words, the design of the SYSTEM may be flexible enough to accommodate future storage-related regulatory mandates. The SYSTEM will generally satisfy the storage-related regulations of SEC Rule 17a-4, including all its official interpretations. The SYSTEM will generally satisfy the storage-related HIPAA regulations. The SYSTEM will generally satisfy the storage-related 21-CFR Part 11 (FDA) regulations. The SYSTEM will generally satisfy the storage-related DOD 5015.2 regulations.

The miscellaneous desires may provide that unless otherwise specified no feature/function will implement the modification of third-party applications or systems. The SYSTEM will generally have a web-based administration interface that may be completely web based or CLI. Wherever possible the SYSTEM components will be mountable in an industry standard rack. An example of an obvious exception is a floor-standing tape library. The SYSTEM will generally provide support for international languages and semantics (e.g., date format). The SYSTEM will generally support the use of license keys to manage the provisioning of SYSTEM options.

As described in detail below in connection with FIGS. 17-41, a comprehensive architectural overview of the virtual library system 100, using a number of different architectural views to depict different aspects of the system is generally presented to capture and convey the significant architectural decisions which have been made on the system. FIGS. 17-41 and accompanying text provide a detailed, technical description of the internal design of the virtual library system 100. An architectural representation that provides the Use-Case, Logical, Process, Deployment, Implementation and Data views of the virtual library system 100 is shown. Each of the respective views provides a picture of a particular aspect of the virtual library system 100:

Use Case View: This view provides a description of the external behavior of the system. The functions described in the use case view are those that a customer would see when using the virtual library system.

Logical View: The logical view shows the key internal elements of the virtual library system. This includes the subsystems, and some level of detail of the internal components of each subsystem.

Process View: The process view shows the streams of execution which are running when the virtual library system system is active. Some threads run continuously when the system is active, while others start and stop in response to specific events. The terms "process" and "thread" are used generically. Multiple techniques, including Linux processes, Linux Kernel threads, and Java threads may all be used in different circumstances.

Deployment View: The deployment view show how the processes or threads defined in the Process View are placed on the processors that make up the virtual library system, and relevant client systems.

Data View: The data view shows the data model for the database that are present in a virtual library system.

Figure 17:
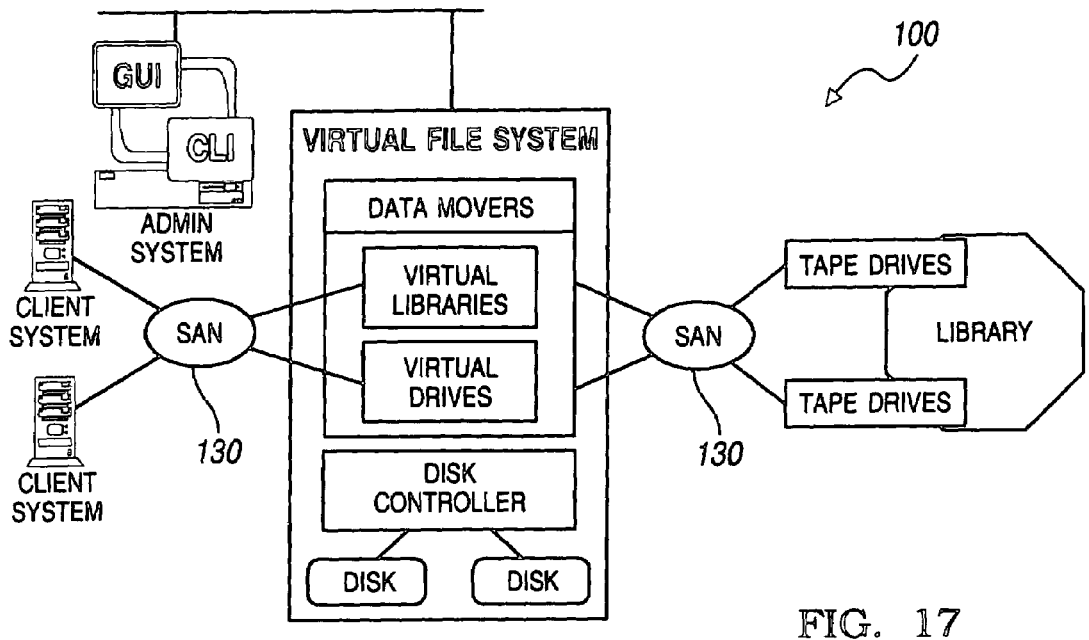
FIG. 17 is another diagram of the data storage system of the present invention.

Referring to FIG. 17, an overview of the system 100 of the present invention which generally provides a basic open systems product is shown. The core functions of the present invention are Virtual Library Emulation, Virtual Tape Drive Emulation, Movement of Virtual Tape Data between disk and tape storage, and Administrative interfaces. The present invention may provide Virtual Library Emulation by emulating legacy and "true virtual" tape libraries. All of the valid physical configurations of legacy libraries may be supported. A variety of configurations for the true virtual libraries will be defined, in one example, ranging from 100 to 10,000 cells. Library control may be implemented via SCSI Media Changer protocol over Fibre Channel connections. Pass-thru will generally not be supported, nor will CAPs be supported.

Virtual Tape Drive emulation may be provided by emulating 9×40 fibre channel and "true virtual" drives. All varieties of 9×40 drives may be emulated. Capacities for the 9×40 drives may match the real drives. The capacity of the true virtual drive may be 100 GB. Compression is not supported on virtual drives. One example implementation may support up to 256 virtual devices per front end port and may support both disk and tape for back end storage. Back end disk storage will be provided with tape drive arrays and a respective controller, as well as future. 9×40 drives (all varieties) will supported for back end tape storage. Legacy libraries will be supported. Back end library control will be via an external ACSLS server. Administrative interfaces will be provided via a CLI (command line interface) and browser based GUI (graphical user interface).

Virtual library system 100 may provide a two-node configuration that provides higher performance by distributing load across the nodes. Automatic load balancing across the two nodes will be performed. Failover of control functions and data paths between the two nodes will be provided. Failover of virtual devices may not be provided.

The Virtual library system 100 generally comprises the administration system 120, the client system 122, and client system tape drives interconnected (e.g., electrically coupled) via the SAN (e.g., mesh) 130.

Figure 18:
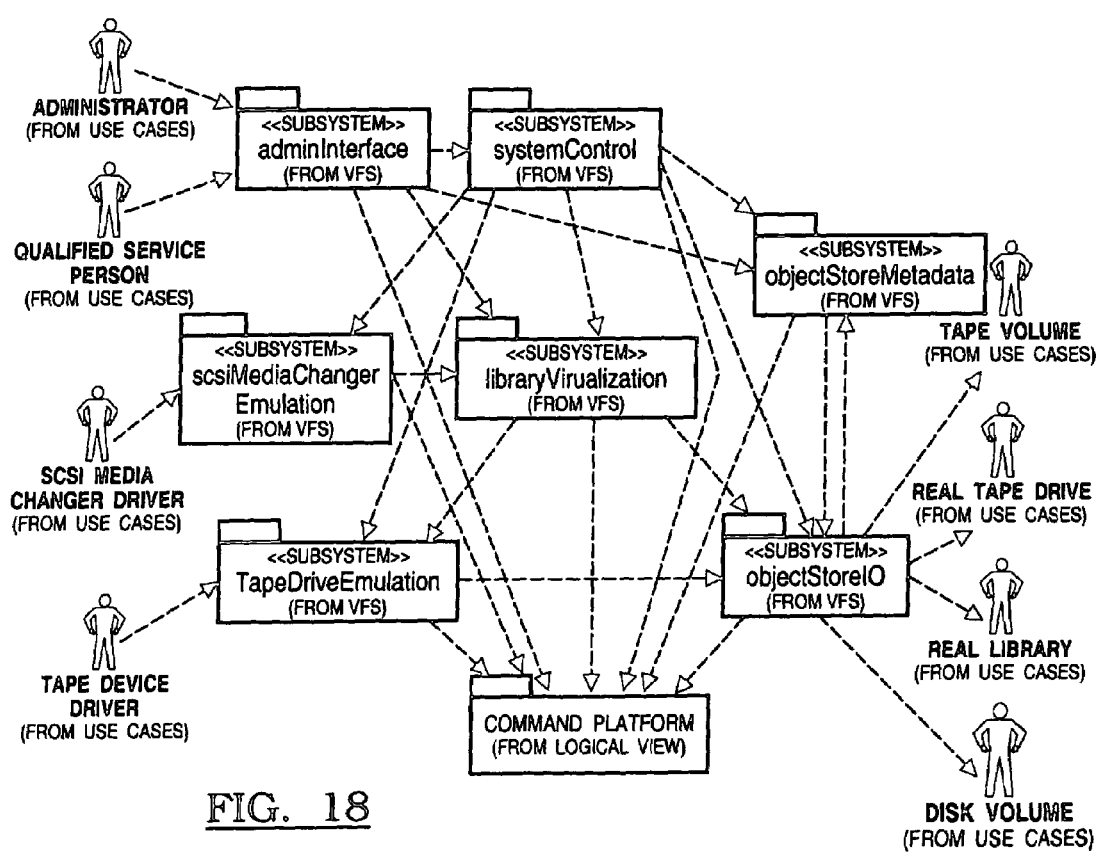
FIG. 18 is a diagram of a logical view of the data storage system of the present invention.

Referring to FIG. 18, a subsystems 200 logical view diagram of the virtual library system 100 is shown. The administrative interface provides the functions available to the administrator. Both a Graphical User Interface (GUI) and a Command Line Interface (CLI) are provided. All human interaction with virtual library system 100 is performed via the administration interface (e.g., the interface 120).

The system control subsystem controls the virtual library system during startup and shutdown operations. The library virtualization subsystem maintains the information about the virtual libraries, virtual drives, and virtual tape volumes. This information is maintained in a persistent database. The SCSI media changer emulation subsystem provides the virtual SCSI media changer devices. The tape drive emulation subsystem provides the virtual tape drives. The object store metadata subsystem maintains information about the physical storage used by virtual library system to store customer data (VTVs). The object store IO subsystem provides routines for reading and writing stored objects. Each of these subsystems is described in detail below.

Several common design patterns are used throughout the virtual library system 100. A command pattern is generally used when a number of different actions are to be performed, but the code performing the actions is indifferent about the details. An abstract superclass is defined for performing an arbitrary command. Subclasses are created for the specific commands that are to be performed. The code that performs the commands works with both the super class and the subclasses. The results returned by the command may also be abstracted.

In the command pattern, an abstract superclass, Command, is defined. Typically, this has only one method, "execute", which is called with a list of parameters. This method typically returns a Result super class. The result super class has methods that create the appropriate output from the Result objects contents. In the virtual library system 100, the Results class may define methods to send the actual result to standard out, or convert the results into a CP message. A number of different subclasses are defined for the Command class. One class will be created for each distinct class to be performed. Multiple subclasses of the Results class may also be created. Often, however, one Results subclass will suffice for several different Command subclasses.

Each Command subclass execute method is programmed to perform the proper actions, and to place any outputs into a Results class or subclass object. Adding additional commands is simply a matter of adding Command subclasses. The caller of the Command subclasses acquires a list of input parameters from an external source. In the virtual library system, this source may be a parser, an XML document, or a CP message. The Command subclasses are named so that the caller extracts a key parameter from the list of parameters (such as a command name), and uses java reflection determine the proper subclass. Reflection is then used to create an object of this class, and to call its execute method. The returned Results object is used to create the desired outputs.

A composite value pattern is used extensively for the results returned by many of the system 100 inquiry functions. The composite pattern allows a hierarchy of objects to be constructed. Because many of the entities managed in the virtual library system (or virtual file system) 100 are arranged in a hierarchy, this pattern can hold any of the various items returned from the inquiry functions. A diagram of the composite value pattern is shown in Value Objects on FIG. 24.

Many subclasses of the LeafValue class are created, one for each of the various structures to be returned. The inquiry functions construct a hierarchy of Composit Value objects, with the Composit Value "leaf, and "collection" attributes filled in with other Composit Values or LeafValue subclass objects. Methods such as "toXML" and toOutputStream" can be used on the root of the hierarchy to produce an output of the entire hierarchy.

A listener pattern is used when a users has a desire that actions are performed in response to an external stimulus. The listener pattern comprises an always-running Listener process and a Handler process or thread that is spawned on demand. The Listener process is normally started when the system starts up. External processes send messages to the listener using a well-known destination. When a message is received, the Listener spawns a new Handler process or thread to perform the desired action. The VFS 100 Listener patterns typically use CP message passing as the communication mechanism. The Listener registers with the CP Location service to establish the well-known name. Senders retrieve the well-known name, and send messages to the Listener. The Listener spawns a java thread for the Handler. The Handler performs some action, and send back a result also using message passing.

The Common Platform (CP) message passing is quite flexible, and can operate across nodes and between kernel and user space. A Listener that uses message passing is used in several places in the VF system 100 to perform method calls transparently across nodes and between user and kernel space. This "extended listener" pattern starts with a set of methods or functions. These functions convert their arguments into a CP message, and send the message to a listener. The listener spawns a handler and gives it the message. The handler converts the message to a list of arguments. The handler then uses the command pattern to execute the command specified in the list of arguments. This returns a results object, which is converted into a second CP message. This message is sent back to the waiting function call. The function call converts the returned message into its outputs and returns these outputs to its caller.

Several Virtual library system subsystems encapsulate significant behavior and persistent storage of information. Inside the Controller, Value Object, Domain Object Pattern subsystem, a set of java classes called "domain objects" perform the behaviors, save themselves into an underlying database, and retrieve themselves from the database. Because using these objects directly is often complex, a set of simpler-to-use methods is provided by a controller class. The controller class provides an externally usable interface to the underlying behaviors and persistence provided inside the subsystems. There are also many situation where information about the objects inside the subsystem is desired externally. To meet this desire, a set of "value objects" are provided. These value objects provide snapshots of the corresponding domain objects. Value objects can safely be used outside the subsystem because they do not expose the behaviors provided in the domain objects.

This pattern is an example of the model, view, controller design pattern. The domain objects are the model and the value objects are the view. The controller classes are, well, the controller part of the pattern.

Underneath the domain objects there are typically an additional set of classes called the DAO classes. These "Data Access Objects" are used to interact with the underlying database.

The domain objects are typically representational. That is, rather than being the actual object, they are merely representations of the object. For example, a "node" domain object is not the actually hardware node. Rather, it just represents the hardware node in the virtual library system 100 application. The node domain object may well interact with the actual hardware node. Other examples are less concrete. A VTD domain object represents the actual VTD. The actual VTD is the set of kernel level code to provides the VTD emulation. Similarly, a VTV domain object represents the VTV, while the actual VTV is the data stored somewhere inside the system 100.

The Administrative Interface subsystem provides the mechanism for an external administrator to perform configuration actions on the virtual library system 100 as well as to receive reports about Virtual library system. Two interfaces are provided: a browser based GUI (Graphical User Interface) and a CLI (Command Line Interface. All functions can be performed with any interface, although GUI functionality may lag the CLI interface.

The CLI has a software component that is installed a client system. This software component provides the client side CLI, commands that are ran to control the virtual library system 100. The CLI uses a XML based protocol to interact with the virtual library system 100. The GUI works within a web browser. So, no additional software is used on a client machine to use the GUI. Both the GUI and the CLI have network access to the system 100.

The function of the AI subsystem is to transport the command from the client system to the system 100, invoke methods in the underlying VFS 100 to perform the requested action, and return the results.

Figure 19:
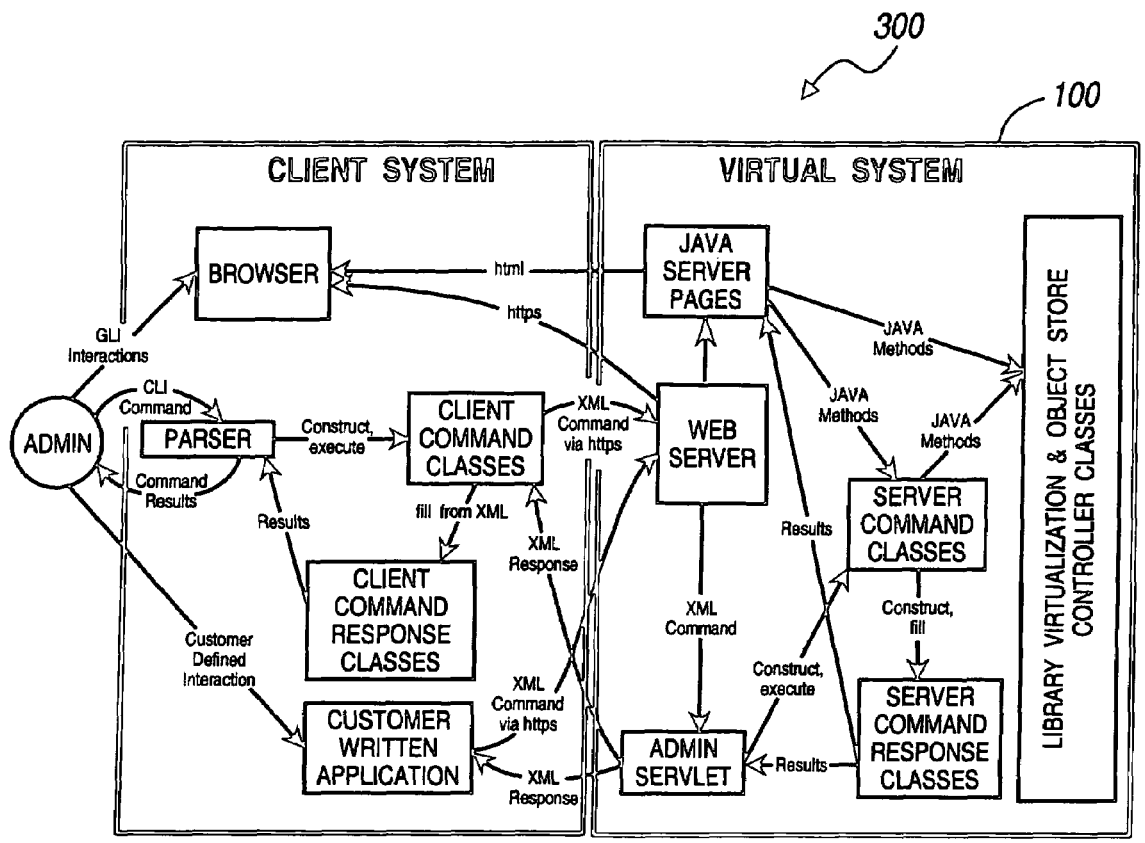
FIG. 19 is a diagram of a CLI command processing sequence of the data storage system of the present invention.

The structure of this subsystem 300 is shown in FIG. 19. Each box represents a package. A package will consist of one or more Java classes. Each package is described in detail below. The CLI Command Processing Sequence subsystem 300 provides all interactions with the virtual library system 100 occur from a location outside the system 100. Customer administrators will not "log on" the VFS 100 itself. Interactions always occur through the web server using the secure HTTPS protocol.

The CLI has a software component that is installed on the administrator server. This component consists of a parser the reads and interprets the CLI commands entered by the administrator. Syntax errors and missing parameters are detected by the parser. The command pattern is used twice in the CLI subsystem. One instance of the command class is used on the client host, while the second set is used on the virtual library system 100. The client side commands construct an XML document from the parameter list produced by the parser. This list is sent to the virtual library system web server. The web server uses a servlet to convert the XML document back to a parameter list, and uses the second instance of the design pattern to execute the command. The command subclasses use controller methods to perform the desired actions. On the way back, the results are converted to XML on the system 100 side, transmitted back to the client side, then converted back to a results object. This is then used to print any results from the command.

Security in the CLI is generally enforced using userids and passwords. An administrator generally first performs a "logon" command to start using the system. This will prompt for a userid and password. If the password is successfully validated, the system 100 may use the userid, the clients hostname, and the current time on the VFS 100 to create a "token". The token is simply an encrypted version of the concatenation of the userid, hostname, and time. The token is returned to the client side, and is cached on the client machine. The hostname and token are passed on all subsequent CLI commands. The token is decrypted and validated. The validation will fail it the token is too old (i.e., its timed out), or if the host name does not match. If the validation fails, the users is prompted for a password for the userid in the token. If the validation succeeds, or fails, but then the correct password is supplied, the token is updated with the current time and returned.

The browser based GUI is started by entering the url of the virtual library system 100 into the browser. This brings up the logon screen of the system 100. Once a user id and password is successfully entered, the system 100 GUI appears. From here, the administrator can perform the various interactions with the library system 100 described in the use cases. The virtual library system 100 web server uses a series of JSPs (java server pages) to dynamically create the desired html documents provide the proper appearance to the administrator. These JSPs consist of a combination of html text with embedded java method invocations to dynamically construct the full html page. The java method invocations call a set of JSP support classes. These classes use the controller classes exposed by the library virtualization and object store subsystems and the server command classes to interact with the system 100.

The VFS 100 uscrids are case insensitive, passwords are case sensitive. Commands are generally provided to allow passwords to be changed on the system 100. Two fixed uscrids will be provided "admin" and "QSP. The library system 100 will support additional users as well command and object based security to limit the commands that can be done by each user and the objects that each user can manipulate.

If the GUI or CLI encounters a timeout while interacting with the with the web server, the command is retried. The system 100 may ensure that the same command is not performed twice if the first command is in fact in progress. The web server is controlled by the system 100 failover process, so a hardware or software failure should produce only a short outage. The virtual library system 100 also provides a way to ensure that the XML documents are send in their entirety, if this is not intrinsically by the HTTPS protocol.

It is also possible to run the system 100 CLI directly on the system 100 without the web server being running. This is done by using a direct connection (i.e., method invocations) between the two instances of the command pattern.

Because all data is passed between the administrator host and the system 100 is passed with HTTPS protocol, it is automatically encrypted, and no further encryption is desired.

In one example implementation, the total system 100 size may be limited to two nodes. In another example, some customers may want multiple systems. Multiple systems will be handled in both the GUI and CLI, although only one system can be administered at a time. In the GUI, the specific system is specified by the hostname or IP address entered for the URL of the system 100. In the CLI, a hostname or IP address can be specified on the logon command. A default hostname may be cached on the administration host to avoid specifying this parameter if it is not desired.

A system control subsystem provides several different functions that are all related to the control of the system as a whole. These functions include startup and shutdown, crash recovery, failover, and responding to CP configuration changes.

The Startup/Shutdown package initializes or terminates the other, Virtual library system subsystems. The startup function is encapsulated in a command line command. This is provided to the Common Platform startup process. When the system is started, and the Common Platform services are started, the Virtual library system startup command will be invoked. This command will start each individual system 100 subsystem.

Shutdown is accomplished via the virtual library system 100 CLI or GUI. The shutdown command in turn shuts down each of the system 100 subsystems. The system 100 CLI or GUI also serves as the external interface to the Common Platform software, and the shutdown process will also notify the CP services to shutdown. The hardware may also be powered off after all software services have been stopped.

The virtual library system 100 has several states of operation:

Offline: None of the system software is running, and the system is powered off.

Diagnostic: The hardware is powered up, but none of the Common Platform or Virtual library system processes are running. Low level Common Platform diagnostics are available in this mode.

Maintenance: The Common Platform and Virtual library system services are running, but the virtual library systems automatic scheduler is offline and all virtual devices are offline. Virtual library system administrative activities can be performed, but the virtual devices cannot be used by attached hosts.

Online: Some or all of the system software is running. Running has two sub-states:

Normal: All software is running, and all virtual and real devices are online

Degraded: All software is supposed to be running, and all devices are supposed to be online, but problems (hardware or software) are preventing some functions from operating properly.

Diagnostic: All software is running, but all devices are offline and all automatic processes are suspended.

A system setting determines which state of operation is entered when the system is powered up. Normally this will be set to online, but a lower level can be set to allow diagnostics or maintenance to be performed without starting the complete system. GUI and CLI commands are provided to bring the system from maintenance to online, or to take the system down from online or maintenance state to a lower state. Note that when the system is in diagnostic mode, the only access is via direct logon. The web server is disabled in this mode, so remote CLI commands and the GUI are not available.

The virtual library system 100 includes Startup/Shutdown Modules. The startup modules define several different classes. There are two super classes, NodeBootstrap and ComponentBootstrap. Subclasses of NodeBootstrap are defined for control nodes, backup control nodes, and data nodes. A configuration file is used to record the nodes that are present in the system. The proper subclass is ran on each of the nodes in the system to startup the proper components on that node.

Subclasses of the ComponentBootstrap are created for each subsystem, and for shared components such as the database. The components to be ran on each node are also recorded in the configuration file. The node bootstrap methods call the proper set of ComponentBootstrap subclasses to start the components Shutdown is handles by the same classes. Shutdown waits for activity on the system to stop. Active processes may be given a chance to stop cleanly. This is done by sending notifications to active processes that a shutdown is pending, and waiting for these to stop. This affects the background data copy processes performed by the policy execution code. VTV mounts are also running activities, but these are not forcibly terminated during a shutdown, Further mounts are blocked, but running mounts are allowed to complete normally before shutting down the system.

The startup process also places the system 100 processes under the CP HA service. This service is provided with scripts to startup, shutdown, and check the status of each process its monitoring. The CP HA service uses the term "resource" for each specific monitored item, and has "resource groups" of resources that are generally kept together. The HA service periodically probes each resource to determine if its alive. If a failure occurs, the process is restarted, or is moved to another node if it can not be restarted. Resource groups are moved as whole. The shutdown scripts used by HA perform the same shutdown process as a normal virtual library system 100 shutdown.

After the system 100 has crashed, a recovery may be performed on the next startup. Normally when the system 100 is shutdown, the system is left in a consistent state. That is, all database contents and the contents of all the physical storage are synchronized. After a crash, it is possible for the system 100 to be left in an inconsistent state. The system may have inconsistencies between the physical storage and the database contents, and may have RTVs or VTVs still mounted. Most aspects of system 100 may automatically ensure that the system is always in a consistent state. Key of these is that all persistent data (except the actual VTV data) is held in the virtual library system database, and transactions are used ensure that multi-step operations on the database either complete successfully or fail completely. However, some virtual library system activities, in particular data writing, and RTV and VTV mounts naturally leave the system in an inconsistent state.

Similar logic is desired after the failure of a single system component. The components that will cause "crashes" if they fail are nodes, ports (HBAs), disk volumes, and RTDs (real tape drives). Each of these failures will cause subset of the ongoing activities to fail. The same recovery as is done to bring the entire system up after a crash is still used, but is applied only to the affected activities.

A basic assumption of the recovery process is that meta data stores, the virtual library system database and the disk usage bitmaps, represent the state of the system more accurately than the data on physical storage. This is because the database update is considered to be the defining point at which an action is complete. Therefore, the recovery process consists of two main steps: 1) Make the database consistent, and 2) Make the physical storage consistent with the databases and bitmaps.

The policy execution process described below keeps a list of running activities. It also keeps a list of pending activities that are ready to be run. This is described in detail under the "object store metadata" subsystem. Under normal circumstances, activities move into the pending list, are then started and move onto the running list. Once they are complete, they move to a history list. If an activity is restarted (such as a copy activity during a normal shutdown), then a resume activity is placed on the pending list to restart the process as soon as possible. Some activities, such as migrate to LAMT and reclaim, always run in two pass mode. The first pass starts other data movement activities, and the second pass verifies the operation is really complete. Such activities use a "complete" activity in the pending queue to initiate the second pass.

After a system crash, activities that desire crash recovery are the activities that are in the running list that do not have a corresponding resume or complete activity in the pending list. These activities may have crash recovery performed. This is done by inserting a resume or complete activity into the pending queue during startup. This activity is generally marked as "crash" to indicate the underlying activity should perform a crash recover when it is restarted.

Mounted VTVs detected during crash recovery may be assumed to be in a partially written state. Object store refers to VTV mounts as "primary IO", so primary IO activities will be found in the running activities list. The design of VTV writing generally ensures that all host created synchronizing events (open, close, write mark, read-to-write change, or write-to-read change) will have been captured into the database if they have been acknowledged back to the host. The library virtualization database may be corrected to place the VTV into state as if it has been closed after the last synchronizing operation, and was then dismounted. It may be desirable to write trailers into data streams that have been terminated prematurely. It may also be desirable to discard data that was written to physical storage after the last synchronizing event. It is assumed that the host will view this operation as a drive failure. In progress primary IO activities are moved to the history list, and are marked as "terminated by crash".

Unlike all other activities, the primary IO activity is performed by a process external to virtual library system. A "complete primary program" is generally provided by the virtual library system to perform the above cleanup. This program is ran when a complete/crash activity is performed for a primary IO activity. This program consists of two parts. One part is the "application specific" part. For system 100 virtual tape, this is the part that cleans up the library virtualization database. The second part is the generic object store cleanup. This part cleans up the physical storage and the object store database.

Copy operations may have been underway when the crash occurred. Copy activities include create replica and move segment activities. As for the primary write of a VTV, the copy proceeds in such a way as to ensure the database holds a consistent view of the system. This is done by periodically performing synchronizing events as the data is copied. Synchronizing events bring the database in synch with the physical storage. Data written after a synchronizing event but before a crash is lost when the crash occurs. When the copy activity restarts as a result of a resume/crash activity, it will perform its crash recovery. The crash recovery for copy operations involves cleaning up the data written to physical storage after the last synchronizing event. Once this is done, the copy process can resume from the last synchronizing event.

After a crash, RTVs may still be mounted on RTDs. If the RTV was actively being written, the data on the RTV may be inconsistent with the database records. If the RTV was in the process of being mounted or dismounted, the Virtual library system may not know the actual state of the RTV.

RTVs that are actively being written will be found by the resumed copy activity or the complete primary IO activity. This activity will correct the tail end of the data on the RTV. Copy activities will resume writing the RTV, while complete primary IO activities will close the tape and dismount it.

RTVs that were in the process of being mounted or dismounted may be handled by the object store "crashmounted", "dismounting". Normally, most RTVs will be "not mounted". Once an RTV is chosen for use, it will be marked as "mounting", and this setting will be committed to the database. Then ACSLS commands are issued to perform the mount. Once the ACSLS commands have completed successfully, and the RTV is ready for use, the state will be updated to "mounted". A similar sequence will occur as the tape is dismounted. After a crash, any RTVs that are in "mounting" or "dismounting, state may be checked to see where they really are. Depending on the timing of the crash relative to the ACSLS actions, the RTV may or may not actually be mounted. Such a tape will never be in actual use, however. If the tape is in fact mounted, it is generally dismounted (using the proper sequence of states). The state of all "mounting" and "dismounting" tapes is generally reset to "not mounted"

After a crash, disk volumes that are actively being written will generally be found by the resumed copy activity or the complete primary IO activity. This activity will correct the tail end of the data on the disk volume. Copy activities will resume writing the disk volume, while complete primary IO activities will close out the data on the disk and terminate.

In one example, the virtual library system 100 will support two node systems. It will make use of the Common Platform HA (high availability) system to provide failover of the Virtual library system control processes across the two nodes. These control processes to be managed by the failover system are:

1. The virtual library system database

2. The web server

3. The virtual library system listeners

All of these processes may be designed so they can run on either node in a two node system. However, it is acceptable for the design to ensure that all of these processes to be running on the same node. These processes will be treated as a group by the HA service. If the node where these process normally run (the "primary control node") fails, all the processes should move to the second node in the system (the "secondary control node"). This notion primary control node and secondary control node for these processes will still exist in future iterations. More nodes will be supported, but these processes will still run only on the first pair of nodes.

Placing these processes under HA control is a straightforward process. Each process may be provided with a startup, shutdown, and status check command line. These commands are used by the HA system to start, shutdown, and query the status of these processes. A resource group is constructed that tells the HA system these processes are desired to be kept together. The HA system monitors each process in the group. If a process does not respond to the status check command, a restart is attempted. If the restart fails a specified number of times, a failover is triggered. Failovers may also be manually triggered. In the case of a HA initiated or manual failover, the shutdown commands are used to gracefully terminate the still alive processes.

If a system crash occurs, the HA system (which runs on multiple nodes) will detect the crash. The HA system will restart the managed processes on the second node.

Some functions in the system 100 are not managed by the failover process. Specifically, the virtual device functions are handled directly by the system 100. A node failure uses a subset of the processing desired for the recovery after crash. Because only a single node has failed, some running activities will be unaffected. Others will have been interrupted by the node failure, and generally have the same recovery processing as for the recovery after crash situation. The only interaction with the HA system is to have the HA system start the recovery process.

In one example of the system 100, most management of physical devices will be done by the Common Platform Configuration Management (CP CM or just CM) service. The CM service will assign devices to the system 100. The CP CM service will discover devices on startup, and then assign these devices to the virtual library system or another application. The virtual library system is the only application for now, but the virtual library system does not assume it is the only application. The system 100 will find out about these devices via the CM service. On startup, the system 100 will query CM to locate all the available physical devices. The virtual library system 100 will compare the returned devices to the devices already known to the system 100. Any known devices will be brought online (assuming CM indicates these devices are online). New devices will be initialized, for any device that the system 100 performs some initialization. New devices will also be added to the system 100 database of known devices. If there are any expected devices that are not detected, Virtual library system will generate an alert.

The virtual library system may provide a program to listen for notifications of changes to the configuration. This program is called the CM Listener. The CM service will send a message to this listener any time a configuration change occurs. Configuration changes occur because of hardware or software failure, devices being varied online or offline by the Common platform system, or new devices being added and assigned to the system 100. The CM Listener will perform the same functions for the new devices as on startup. When a device offline or failure is detected, the CM Listener will notify the other virtual library system components about the failure. This includes VTDs, VACes, RTDs, and disk volumes. These components then locate any affected activities, and perform the crash recovery as described above. The only difference between this crash recovery and the crash recovery for the entire system is that only the affected activities are modified.

The library virtualization subsystem retains the knowledge about the virtual objects present in the system 100. These objects include VACS class (virtual library), VTD class (virtual tape drive), VTV class (virtual tape volume), and related statistics. The LVS subsystem maintains information about the allowed types of VACSs, VTDs, and VTVs that can be created, and the characteristics of each type. LVS enforces any limitations dictates by the type, such as the number of cells in a VACS or the compatibility between VTV types and VTD types. A variety of VACS, VTD, and VTV types are supported for one example implementation.

All changes to VACSs, VTDs, and VTVs are done with the LVS subsystem. This is true whether the change is made by an administrator of by a virtual control interface such as SCSI media changer. The LVS subsystem may interact with the tape drive emulation subsystem to manipulate the underlying VTD, and with the object store meta data subsystem to manipulate the underlying stored object for a VTV. Information about VACs is kept just in the LVS subsystem.

The library virtualization subsystem (LVS) uses the controller/value objects/domain objects pattern. The persistent information about the LVS objects is stored in the library virtualization database. Domain objects and DAO objects are defined and used within the subsystem.

An LVSController class, and a series of value object classes, are exported by this subsystem. The LVSController is used by the administrator interface subsystem.

The library virtualization subsystem also provides an interface for use by the SCSI media change emulation subsystem. This is the SCSICMController class. This class uses the same value object classes as the LVSController.

The Media Changer Emulation subsystem performs the function of emulating SCSI Media changer devices. It sets behind the Common Platform data path (CP DP or simply DP) service to receive SCSI (over Fibre Channel) requests for SCSI media changer (aka medium changer) devices. Requests are handled by interacting with the library virtualization subsystem to produce the proper response. This subsystem is mostly java code executing in user space. A small C kernel level module is used in the SCSI media changer emulator package to provide the device level interface.

The SCSI media changer emulation subsystem uses the "extended listener" pattern described previously. The module that is called by the DP service is the SCSIMediaChangerEmulator. This is the caller in the pattern. Messages are sent to the SCSIMediaChangerListener, which spawns SCSIMediaChangerHandler threads. These then use the command pattern to perform the requested command. A command subclass is defined for each SCSI media changer command. These subclasses use the SCSIMCController provide by LVS to perform the requested action.

Figure 20:
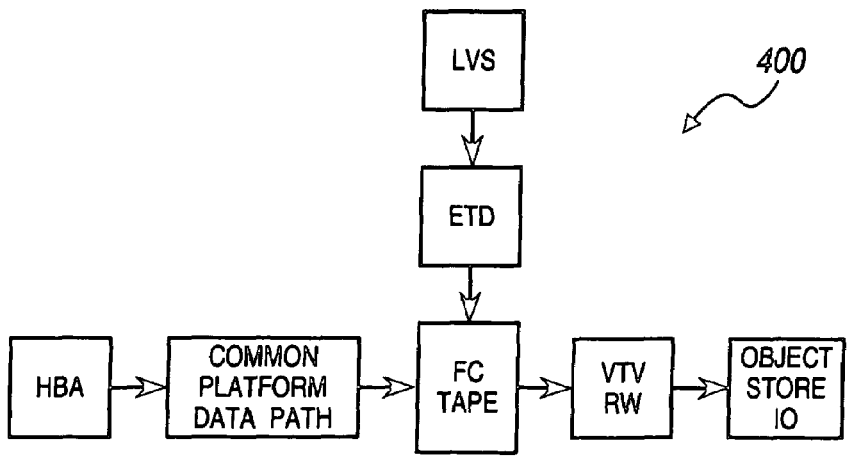
FIG. 20 is a diagram of tape drive emulation of the data storage system of the present invention.

Referring to FIG. 20, a diagram illustration a Tape Drive Emulation Subsystem 400 is shown. The tape drive emulation subsystem 400 provides the mechanisms for emulating tape drive devices. The tape drive emulation subsystem consists of both C and Java code. Most of the C code in this subsystem takes the form of kernel loadable modules. These modules perform the data transfer operations. A few Java classes are provided as interfaces to be used by library virtualization to control the operation of this subsystem.

The Emulated Tape Drive (ETD) package provides a class used to control the operation of the underlying kernel modules. This class provides the methods to start, stop, and perform inquiries into the devices. These Classes also interact with the control interfaces of the Common platform data path.

The FC tape is an implementation of Common platform "mapped_if" interface. It is a kernel loadable module which is linked to LUNs that are defined to be tape drive LUNs. Its responsible for receiving tape drive command CDBs and associated data buffers, then using the generic VTV RW interfaces to store or retrieve the data. Device related SCSI commands will be handled directly by the tape drive emulator code, while data transfer commands will result in calls to VTV RW.

The VTV RW (VV Reader Writer) package implements interfaces for a generic tape drive. This package provides C functions that are used by tape drive emulator to store the data. This package interfaces with object store IO routines to write data to and read data from back end storage. This package creates the proper format in the data stored in the object store so that it looks like a virtual tape.

Figure 21:
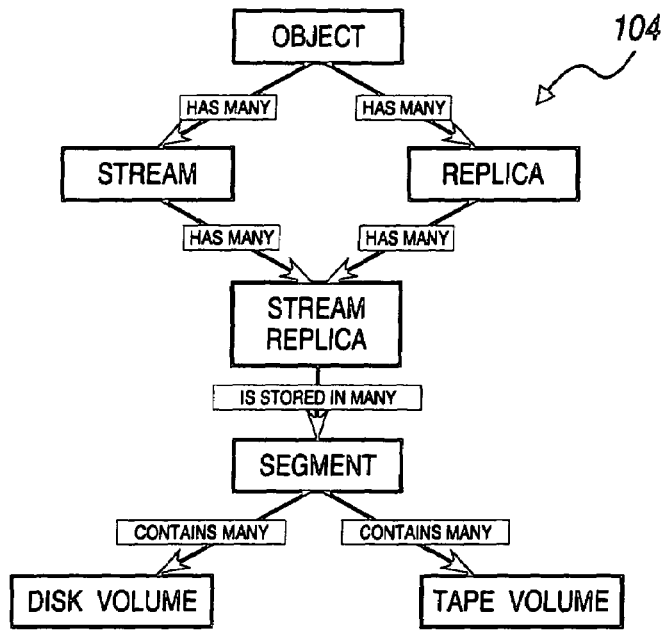
FIG. 21 is a diagram of stored object structure of the present invention.

Referring to FIG. 21, a diagram illustrating the Object Store 104 stored object subsystem is shown. The object store subsystem 104 provides for the physical storage of arbitrary objects. Within the library system 100, the object store subsystem 104 is used to store the VTVs. The object store 104 comprises two subsystems: Object Store Meta data and Object Store IO. The Object Store Meta data subsystem retains all information about the stored objects, and performs the management of the stored objects. Object Store IO provides IO interfaces to read and write stored objects.

The object store 104 provides the ability to store objects on both disk and tape, to automatically move or copy objects between different storage media, and to delete objects according to policies.

An overview of Stored Objects:

At a high level, stored objects are similar to files. IO routines are available to create, read, write, and delete stored objects. Stored objects are persistent. Stored objects have two key differences with files. One is that stored objects are identified by a single unique object identifier. This identifier is created by the object store when the object is created, and may be used for all subsequent access. The second difference is that stored objects may comprise multiple streams. Each stream can be read and written separately.

The object store can make multiple replicas of an object. This can be done by explicit commands to the object store, or by storage management policies. While the individual streams of an object can be directly manipulated using the exported object store IO subsystem APIs, the replicas cannot. That is, the object IO routines provide the ability to perform read and write operations on a specific stream, but do not provide any way to perform IO on a specific replica. For IO purposes, the object store presents all the replicas as a single copy of the object.

Each combination era stream and a replica makes a stream replica. All of the stream replicas for the same replica constitute a complete copy of the object. All of the stream replicas for the same stream comprise alternate copies of the stream.

A stream replica may be too large to fit in the available space on any single disk or tape volume. To accommodate this, stream replicas are stored in segments. Each segment is a contiguous stream of bytes on a disk or tape volume. Segments do not have a fixed size, and are as large as possible.

The object store 104 maintains a set of storage pools. Storage pools contain disk or tape storage. Replicas of objects are directed to specific storage pools. A storage pool contains one or more disk volumes or tape volumes. Any specific storage pool can contain only disk or tape volumes.

The object store 104 manages the real devices where the storage is located. These devices include disk, tape drives, and tape cartridges.

The object IO subsystem performs the IO operations on objects. It supports using disk or tape for physical storage. This subsystem also spans across nodes to allow IO operations from one node to access storage on another node. It consists of three major packages, Object IO (the actual IO routines), Object Copier (makes copies of objects, driven by policy engine), and the Kernel DB IF (keeps object store meta-data database in sync with actual data).

Object Copiers are a set of programs that are responsible for coping objects from one location to another. The name is a bit misleading, since a segment mover is also provided that can move one individual segment of an object. Object movers are started by the scheduler in the object store metadata subsystem. Each program in the object copier package has both C and Java components. The C components perform the actual data movement, and are implemented as a kernel loadable module. The java components provide the external interface that is used by the scheduler.

A Kernel DB Interface may be implemented. As objects are read and written by the Object IO package routines, it is desirable to use and update the metadata about the objects in the object store metadata subsystem. The kernel level IO routines can not access the database directly. The kernel DB interface package provides the mechanism for performing these DB accesses and updates. This package uses the "extended listener" pattern to access controller methods in object store metadata subsystem. This package uses the generalized "extended listener" pattern provided in the infrastructure package to interface with the object store metadata subsystems OSDBIFController.

The object IO package provides routines to read and write object stores. Most of these are highly optimized C functions that perform the actual IO. These routines are a kernel loadable module that is used by the VTV reader writer and the object store mover. These routines provide the ability to store objects on both disk and tape storage. In addition to the core routines for reading and writing the data for the object store, a set of java classes provide access to the meta data about the object stores.

These routines provide the ability to open, close, read, and write individual streams within the object.

Figure 22:
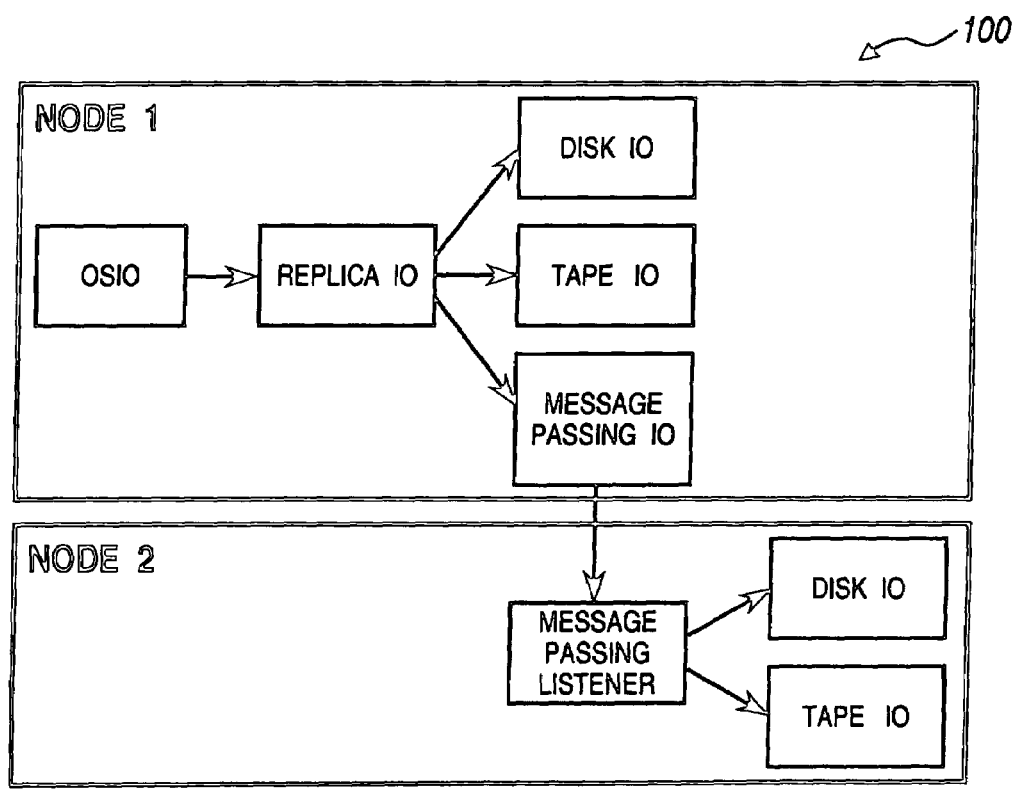
FIG. 22 is a diagram of object IO modules of the present invention.

Referring to FIG. 22, a diagram illustrating object IO package modules is shown. The OSIO module provides the routines used for primary (i.e., external from the object stores point of view) IO the objects. It reveals the streams that make up the object, but does not reveal the replicas or specific locations where the data is stored.

Replica IO defines the IO routines that support the OS IO module. These routines expose the existence of the various replicas. These routines are also used by the object copier programs to manipulate the individual replicas.

A disk IO is generally implemented. The library system 100 uses block disk IO to store data on disk devices. Virtual library system divides each disk volume into "chunks" (e.g., segments, portions, units, etc.), for lack of a better term. Bitmaps are used to keep track of the status of each chunk on a disk volume. A bitmap is maintained on for each disk volume. At any point in time, a disk volume is only accessed from a single node, so the bitmap is managed by a KLM (kernel loadable module) on that node. This provide fast access to the bitmap without database or inter-node communications. In the event of a node failure, its node pair partner will take over the use of the node. Updates to the bitmap are done in a write through mode where updates are first made to the on-disk data before returning the results of the request.

When a disk volume is first discovered by the virtual library system (via the CP CM service) it is generally formatted. Formatting is the process of dividing the volume into chunks, creating headers for each chunk, and creating the bitmaps. The bitmap for each volume are kept at the beginning of the volume. Two separate copies of the bitmaps are kept on the disk volumes for redundancy. The formatting process will create and initialize the bitmaps, and divide the remaining storage into chunks, writing a header at the beginning of each chunk.

Any chunk can be in one of three states: free, allocated, or in-use. Free chunks are those that contain no user data. In-use chunks are filled or partially filled with valid data. Allocated chunks have been allocated to an ongoing write operation and may or may not be filled with actual data. As a write process (either a VTV mount or a copy activity) desires space, chunks are allocated. Allocations will allocate a group of contiguous chunks. As synchronizing operations occur, the space is converted from allocated to in use, and the bitmap is updated accordingly.

The chunk headers contain identifying information about the data in the chunk. This is the information generally used to determine which object, stream, and replica the chunk belongs to, as well as the position of the chunk in the stream replica. This information is used to reconstruct the object metadata from the physical storage media if the object metadata is unavailable.

Tape IO is performed using block tape IO commands. Data is written to tapes in blocks, with the block size determined by a global setting for the system. Each block contains a header as for the disk chunks. Each segment on a tape is a series of contiguous blocks. The first and last block contain segment headers and trailers that allow their identification as headers and trailers.

All information about the data on a tape is contained in the object store metadata database. No formatting of on-tape bitmaps are used like are used for disk.

Tape volumes may contain unusable data if data on the tape becomes invalid while valid data follows the invalid data. When an excessive fraction of the tape is unusable, the tape is "fragmented". The threshold is determined by a system setting. The reclaim process is performed to reorganize tape data to recover unusable space.

The object store subsystem may include Message Passing IO. When performing IO, the object store IO subsystem may desire to move data between nodes. This is accomplished with the message passing IO package. This package is used by the replica IO package to send data from one node to another. The transmission may be done synchronously, in one example. The transmission may be done via remote asynchronous replication, in another example.

When message passing IO is to be used, a message passing listener is generally started on the receiving node. This is started in response to a space allocation request if the load balancing algorithm decides it is better to split the data flow across nodes. The message passing IO on the first node used CP message passing to send the data to the second node. The listener on the second node receives the data and uses disk IO or tape IO to store the data on a physical volume.

The object store subsystem may include an Object Store Meta data Subsystem. The object store meta data subsystem manages the information about the stored objects. It perform two key functions. One is the maintenance of the persistent recta-data about the stored object. The second is to execute the actions desired to enforce the storage management policies.

The library virtualization subsystem retains the knowledge about the entities used to manage stored objects present in the Virtual library system. There are a large number of objects involved. They generally fall into several categories:

1. Stored objects—Includes the stored objects, streams, replicas, and segments

2. Physical storage—Includes real tape drives (RTDs), real tape volumes (RTVs), tape libraries, and disk volumes.

Also includes information about the utilization (contents) of RTVs and disk volumes.

3. Storage management policies—Includes the storage pools (groups of RTVs and disk volumes) and the policies that dictate how the pools are used.

4. Activities and queues—As the storage management policies are executed, activities are created. The activities perform the background tasks desired to enforce the storage management policies. These activities are kept in various queues as they progress from creation to execution to being a historical record.

5. Storage utilization—Includes information about the usage of storage volumes, nodes, and ports. This includes both the static information about the data on the storage volumes, as well as the dynamic information of the usage of nodes, ports, and volumes while IO activities are underway.

All changes to these objects are done with the object store meta data subsystem. This is true whether the change is made by an administrator of by a programmatic interface. The object store meta data subsystem may interact with the to manipulate the underlying storage for the stored object for a VTV.

The object store meta data subsystem (OSMS) uses the controller/value objects/domain objects pattern. The persistent information about the OSMS objects is stored in the object store database. Domain objects and DAO objects are defined and used within the subsystem.

A OSSController class, and a series of value object classes, are exported by this subsystem. The OSSController is used by the administration interface subsystem.

The object store meta data subsystem also provides an interface for use by the object store IO subsystem. This is the OSDBIFController class. This class uses the same value object classes as the OSSController.

The object store metadata subsystem also has two active processes which run all the time. These are the scheduler and the activity monitor. The scheduler manages the queues of activities and starts activities as appropriate.

The execution of storage management policies falls into two categories: management of VTV (object) replicas, and management of physical storage. Management of object replicas is handled by creating scheduled activities for each time a replica is to be made or deleted. Management of physical storage is handled by evaluating the state of the storage every time storage is allocated or released. If thresholds on storage use are exceeded, storage management processes are ran to adjust the state of the storage. These include performing reclamation of tapes and freeing disk storage. Physical storage management also performs the steps to eject RTVs (real tape volumes) at the scheduled times.

The virtual library system defines "primary I/O" as the I/O performed between the attached hosts and the virtual library system. Primary I/O is the initial trigger for policy execution. When primary I/O is started by opening an object for primary I/O (i.e., mounting a VTV), the policy for the object is used to determine where to send the data written to the virtual library system, and where to read data from. Secondary I/O occurs when background virtual library system processes perform I/O to copy objects (VTVs) from one location to another. Opening an object for primary I/O may also cause secondary I/O if the object is generally recalled from disk to tape before satisfying primary reads.

Internally, the virtual library system will perform "secondary I/O. Secondary I/O is performed to create extra copies of data, and to perform the internal storage management processes. Secondary is distinguished from primary I/O because it does not trigger a re-application of the policy processing.

Lists of activities are maintained by the virtual library system. When one of these activities is performed, a background process is executed to perform the secondary I/O. When primary I/O occurs, new activities are created and added to these lists. These activities are typically scheduled to occur at a specific time. The times are dictated by the storage management policy and the time the primary I/O starts, that is, then the object is opened for primary I/O. As the scheduled time arrives, the scheduled activities are started.

Four lists of activities are maintained in the system: scheduled activities, pending activities, running activities, and historical activities. Scheduled activities are those that will occur at some pre-determined time in the future. Pending activities are those that should be running now, but are blocked waiting for one or more resources. Running activities are those that are in progress. Historical activities are those that have completed.

CLI commands and GUI screens are provided to view each of these lists. Commands are also provided to suspend or terminate a running, pending or scheduled activity, and to force a scheduled activity to move to pending status prematurely.

Virtual library system Storage Management Policies are generally implemented. Virtual library system policies control the creation of replicas for stored objects and how physical storage is used. There are two types of policies, Storage Management Policies and Storage Pool Policies. The Storage Management Policies apply to stored objects, and control where the replicas are placed during both primary and secondary I/O. All replicas created by secondary FO are created by automatic, background processes. The timing of these processes is also controlled by the storage management policy.

Storage Management Policies specify the destinations for data writes using storage pools. Storage pools are groups of storage volumes. A storage pool can contain tape volumes or disk volumes, but not both. Storage volumes in a pool are all considered equivalent. When write I/O is to be performed, a pool will be determined by examining the applicable storage management policy, then a volume in the pool will be selected.

Storage pools have storage pool policies. Storage pool policies control the behavior of the storage pool. As storage is consumed or freed in a storage pool, the storage pool policy may cause additional secondary I/O operations to be performed.

Storage policies are described in more detail below.

Enforcement of Storage Management Policies is generally provided. Storage Management Policies are enforced when objects are opened for I/O and when the object is closed, When the object is opened for primary I/O (i.e., via the OSIO routines), the objects storage management policy determines if the data is generally recalled from tape to disk. If so, the storage management policy determines what pool is to be used for the recall. When data is written, the storage management policy determines what pool to use to store the data.

When the object is closed after being open for primary I/O, the storage management policy is again examined. At this time, the follow-on activities are scheduled. These include the activities desired to create the additional replicas specified in the policy and to enforce the expiration times specified in the policy. All these events are scheduled based on the time the object was opened.

When the object is opened for secondary I/O, the policy is again considered. In this case, the only action generally used is to determine what pool to use for the destination of the copy.

Storage Pool Policies are generally provided. Policies also control the behavior of storage pools. Each storage pool has a name and an associated list of volumes. All pools have a "minimum free space" parameter. Volumes with less than this amount of unused space cannot be selected for writing.

Disk Pool Policies are generally provided. Disk pools may have a pair of additional parameters. These parameters are HAMT (high automatic migration threshold) and LAMT (low automatic migration threshold). When the used space in a disk pool exceeds, HAMT, a "migrate LAMT" activity is performed. This activity will reduce space utilization below LAMT.

Tape Pool Policies are generally provided. Tape pools have a number of additional parameters. Two of the tape pool parameters are stacking limit and maximum RTDs. The stacking limit determines how many different objects can be placed on the same RTV. The maximum RTDs parameter determines the upper limit for the number of RTDs that this pool can use at once.

Tape pools have a set of parameters for managing reclamation. Reclamation is performed when a tape has an excessive amount of unusable space. The sequential nature of tapes means that valid data on a tape prevents the reuse of tape capacity if invalid data appears before the valid data on the tape. Reclamation is generally performed to make this unusable space available. The reclamation parameters are:

Tape pools also have a set of parameters for dealing with ejection. A tape pool can be designated as ejectable. This can be done based on a schedule, or can be done with CLI, GUI, or programmatic commands. When the scheduled time arrives, or the CLI or GUI command is performed, all RTVs in the pool that contain data are moved to a "pending eject" state. CLI and GUI commands allow an administrator to physically eject tapes that are in "pending eject" status.

RTVs can also be, ejected indirectly by ejecting objects. When an object is ejected, the replicas contained on RTVs in ejectable pools move to a "pending consolidation" status. Parameters described below control when the actual consolidation process is performed. Consolidation reorganizes on-tape replicas so that a set of RTVs containing only ejected objects is created. Once consolidation is complete, the RTVs move to a "pending consolidation" status.

For the system 100 virtual tape product, ejecting an object is done by ejecting a VTV. This can be done by the CLI or GUI, but would typically be done using the virtual library control interface.

Enforcing Storage Pool Policies is generally provided. Storage pool policies are enforced when physical storage space is allocated or freed. When an allocation is made, the storage management policy of the object being read or written is consulted to determine the proper pool. A volume is generally selected from the pool. Only volumes with available space greater than "minimum free space" are candidates. The path of the data flow through the system may also be considered. Once a volume and a data flow has been selected, the allocation can proceed. The allocations effects on the storage pool are considered. The allocation may cause a disk pool to exceed its HAMT limit. If this occurs, an "migrate to LAMT" activity is started. For a tape pool, the allocation may cause the number of free RTVs to fall below the "minimum free RTVs, limit. If this happens, a "reclaim" process is started.

Freeing storage may also affect storage pools. When disk space is freed, the space utilization of the pool may drop below LAMT. If this occurs, any running or pending "migrate to LAMT" process can be completed. Freeing tape storage may cause a section of a tape volume to become unusable. When this happens, the tape volume is generally evaluated to determine if it has exceeded the "fragmentation percent" limit. If the tape becomes fragmented, the pool is generally checked to see if the total fragmented RTVs exceed maximum fragmented RTVs". If so, a "reclaim" activity is generally started right away. If not, a "reclaim" activity is generally scheduled to occur after the "maximum reclaim delay" time limit.

Virtual library system Activity Processing is generally provided. The various background activities desirable to enforce the virtual library system policies are managed by the scheduler. The scheduler is an active component of the Object store subsystem. Virtual library system activities represent the future, current, and past work done automatically by the system 100.

Activity Queues are generally maintained. Several lists of activities are maintained:

1. Future activity queue—a time ordered list of the activities that are scheduled to occur at a specific time in the future.

2. Pending queue—a prioritized list of the activities that are ready to run and that are waiting to be started.

3. Running list—a list of all the activities currently running

4. History list—the historical record of activities that have been completed.

When an activity is first created, it is placed on the future activity queue or the pending queue. A new activity is placed on the future activity queue if it is to occur at a specific time, or onto the pending queue if it is to be started right away. The scheduler is responsible for moving activities from the future activity queue to the pending queue when the scheduled time occurs. The scheduler is also responsible for moving activities from the pending queue to the running list.

A number of Activity Types are generally provided. Currently, there 14 identified types of activities:

1. Primary I/O—Performed when an object is opened for primary I/O.

2. Resume—used to resume an activity that has been stopped while still in progress. This is used with create replica and move segment activities.

3. Complete—used to finish up activities that are generally ran once to start other activities and a second time to finish up. Applies to migrate to LAMT, reclaim, consolidate, and drain.

4. Create Replica—Performed to create a new replica for an object.

5. Delete Replica—Performed to delete a specific replica of an object.

6. Move segment—used to relocate a specific segment from a replica. Used by the migrate to LAMT, reclaim, consolidate, and drain activities.

7. Migrate to LAMT Performed to reduce the utilization of a disk pool.

8. Reclaim—Performed to recover unusable tape storage by reorganizing tape data.

9. Consolidate—Performed to group objects onto RTVs for ejection

10. Schedule eject—Performed to move RTVs in ejectable pools with schedules to "pending eject" state.

11. Diagnose tape—Run diagnostic processes for a specific tape drive and a specific RTV.

12. Diagnose disk—Run diagnostic processes for a specific disk volume.

13. Repair object—When an object is being read, and a recoverable error is detected, an "audit & repair" activity is queued to examine the object in the background and to make corrections or move the data to more reliable media.

14. Drain—All data is moved off of one or more RTVs or off of one or more disk volumes.

15. Dump database—Copy database entries to export files

16. Purge database—Permanently remove database entries.

17. Dump Replica—Copy replicas to tape, does not create a replica in the DB. Intended for export for diagnostic purposes.

The first activity, primary I/O is created when an object is opened from primary FO, Primary I/O activities are placed directly into the pending queue. Resume and complete are internal virtual library system activities. The create replica activity can be stopped while its running. When this is done, a resume activity is inserted into the pending queue to resume the create replica activity. The migrate to LAMT, reclaim, consolidates and drain activities all cause create replica and delete replica activities to be performed. So, the migrate, reclaim, consolidate, and drain activities are generally started once to being the processing. These processes run, schedule the follow on activities, then stop. They insert a complete activity into the pending queue to rerun themselves once all the scheduled activities have completed.

Create replica and delete replica activities are created during the course of policy enforcement. These activities are created by primary I/O activities. These activities may be placed into the future queue or directly into the pending queue.

Move segment activities are created during the course of policy enforcement. These activities are created by Migrate to LAMT, Reclaim, Consolidate, and Drain activities. These activities may be placed into the future queue or directly into the pending queue.

Migrate to LAMT, reclaim, and consolidate are also created during policy enforcement. These activities are placed directly into the pending queue as the result of an action that causes these activities to generally be performed.

Schedule eject activities are placed on the future queue as a result of creating or editing an ejectable tape storage pool, or by the Schedule Eject activity itself.

Diagnose tape, diagnose disk, and repair object are created as the result of a problem detected during FO. These activities are placed directly onto the pending queue.

Drain activities are created as the result of an external command to drain a volume, or by the Reclaim activity. These are placed directly onto the pending queue. Drains that are externally initiated are typically done in preparation for taking the volume offline for servicing.

Dump and purge activities for the database remove historical data for either virtual device statistics, other activities, or both. A date range is specified. The dump activity will export the data from the database to an export file. The purge activity deletes the data.

Dump replica is similar to copy replica. Data for a stored object is copied to tape volumes from a specific tape pool. A replica for the stored object is not created. This is intended for diagnostic purposes. The tapes containing the replica are expected to be exported and returned to the vendor for diagnosis.

Figure 23:
FIG. 23 is a diagram an example of data flow of the data storage system of the present invention.

Referring to FIG. 23, physical resources used in Data Flows for an Activity are illustrated. The primary I/O and create replica activities perform actual I/O. As a result, they consume system resources. These resources involve nodes, ports, disk volumes, and RTDs. Any primary I/O or create replica activity may perform I/O to and from a variety of disk volumes or RTDs during the course of its execution. The term "data flow" refers to a single flow of data from a specific source to a specific destination.

Create replica activities read data from a source replica and create a destination replica. At any point in time, data is being read from one volume through a specific port. The data flows from the port through a node. The data may be sent across the mesh to a different node, or may remain on the same node.

The data then moves from the node to an output port. From here, the data is written to a second volume.

This flow can be thought of as two half of the whole data flow. Each half can involve either a disk volume or a tape volume. Each half is referred to as a "data flow end".

A complete create replica activity performs a series of data flows as it copies the source replica to a destination. Because the segments that make up the source and the destination may be of different sizes, multiple data flows may involve the same data flow end. In the following example a source replica is copied to a destination replica. The source replica has two segments, and the destination replica uses three segments.

| Data Flow | Source Volume | Destination Volume | Data Moved |
| --- | --- | --- | --- |
| 1 | Disk volume A | Volser 123456 | 20 GB |
| 2 | Disk volume A | Volser 123457 | 10 GB |
| 3 | Disk volume B | Volser 123457 | 10 GB |
| 4 | Disk volume B | Volser 123458 | 20 GB |

The example above involves four data flows, two source data flow ends, and two destination data flow ends. In reality, each data flow end may be on different nodes. Each time a segment is opened, dosed, or allocated, the system determines the optimal place for the I/O for the segment.

The data flows for a primary I/O are simper. That is because the "source" end of the data flow uses only a port. The data is being written or read by an external process, so there is no source volume. Primary data flows can run in either direction, unlike create replica activities which only run in one direction.

Management of activities in the lists is generally provided. The schedulers job is to move activities from the future to the pending queue, and from the pending queue to the running list. When an activity moves to the running list, the schedule may actually start the process that performs the activity.

The scheduler is a process that runs inside the virtual library system 100. When started, it first examines the future activities queue. Any activities are scheduled to start now (or in the past) are moved to the pending activity queue. The pending activities queue is then examined. All activities that can be run will be started. The only activities that cannot start immediately are create replica or primary I/O activities that are limited by the number of RTDs. The scheduler may also be started explicitly.

Activities on the future and pending activities list may have predecessors that are other activities. For example, a delete activity may have a predecessor on a previous copy activity completing. Activities with dependencies may not run until the predecessors have completed.

The pending activities list is a prioritized list of activities that are generally performed as soon as resources allow. The primary I/O and create replica activities are heavyweight, and consume significant system resources. Specifically, these activities consume storage space and bandwidth. All other activities are lightweight and do not consume space and consume minimal bandwidth on the system. Lightweight activities are priority 1 (highest priority) and always start as soon as they enter the pending activities list. The priorities for other activities are:

1. Move segment activities started by "migrate to LAMT"

2. Create replica activities started by primary I/O activities (i.e., recalls)

3. Primary FO activities

4. Create replica activities started by policies

5. Move segment activities started by consolidate

6. Move segment activities started by reclaim or drain

Pending activities of the same priority are ordered by age, with the oldest activity having the highest priority. For this purpose, "age" means the time the activity has been on the pending queue.

Once activities complete, they are moved to the historical activities list. This list keeps a history of the prior activities of the system. It is expected that this list will be periodically purged to conserve space. The purging process may also allow exporting of the data before purging so the data can be retained long term in a reporting system.

Monitoring of running activities is generally provided. While activities are on the running activities list, they are consuming system resources. Primary I/O and create replica activities are expected to be making progress at all times. These activities are actively monitored for progress. The "activity monitor" process runs continuously and provides this monitoring. This continuously running process normally sleeps most of the time. Every few minutes, it wakes up, and checks running processes for progress. As storage is committed by these activities, an average throughput is calculated. Based on this estimated throughput and the storage allocated to the activity that is not committed, an expected time for the next commit can be determined. If the activity does not commit or free the allocated storage within the expected time (allowing for variations in throughput), events are logged. If this condition persists, the activity will be forcibly terminated, and high priority events logged.

Suspending, Resuming, and Restarting Activities is generally provided. The create replica and move segment activities can run for a long time, up to many hours. In the event that the system or some of its components may be shutdown, it may be desirable to interrupt these long-running processes. This interruption can take one of two forms: a restart or a suspend/resume.

Sometimes a running activity simply is generally restarted. Restarting the process may allow the process to complete its work up to a consistency point. When the activity resumes running, it knows to resume from the point where it left off, rather than starting over.

In some cases, the scheduler may be taken offline before restarting a process. This allows for a quick shutdown, and also automatically restarts these create replica activities when the system restarts.

In other cases, a create replica or move segment activity should not be immediately restarted. In th/s case, the same restart process is followed, but the resume is flagged as "suspend". This prevents the scheduler from starting the activity. An explicit "resume" command is generally used to remove the suspend flag and allow the scheduler to start the activity.

Load balancing is generally provided. The virtual library system 100 has several critical resources that may be evenly loaded to ensure optimal performance. The virtual library system may track the current usage of the following items:

1. Nodes

2. Ports

3. Disk drives

4. Tape drives

As each primary I/O or create replica activity is started, it creates a load across a set of these resources. The exact load will be determined by the actual activity. The data flow and data flow end records for each primary I/O and create replica reflect the load created by the process. When a data flow end is created (by openSegment or allocateSegment), the use counts of the node, port, and device (if applicable) are incremented. When a data flow end is completed (by closeSegment), the use count of the node, port, and device are decremented. The incrementing and decrementing of use counts for nodes considers whether or not the data flow is split across multiple nodes. The "use counts" may be replaced by estimated loads based on actually I/O rates of the activity. Load balancing may also consider disk and tape volume utilization.

The system 100 generally comprises Infrastructure Components. The Infrastructure Package is a set of small packages that provide utility functions for the rest of virtual library system 100. These components are too small to be considered true subsystems, but do provide functions used throughout the system.

The ACSAPI package provides a java callable API to the ACS toolkit. This is used to control real libraries via ACSAPI.

The config file reader package defines routines to read the Virtual library system configuration file. The external configuration file is used only for situations where the desired data can not be kept in the database. Startup processing is the main purpose of the configuration file.

The DBIF package defines a generalized version of the "extended listener pattern". This package provides a way for kernel level code to make calls to user level controller methods. It is used between tape drive emulation subsystem and library virtualization subsystem and between object store IO and object store meta data.

The Entity Objects package is used by the GUI to find information about the various virtual library system entities displayed on the screen. The classes defined here give the GUI a way to find about the virtual library system objects without hard-coding the specific class and attribute names into the GUI. The information here is contained in database tables in the System part of the database.

The Global Settings package provides a way to store persistent settings that can be used anywhere in the system. These are commonly used by the virtual library system as defaults. This package uses the controller/value/domain pattern, with persistent information held in the System part of the database.

The Kernel Control package defines a generalized version of the "extended listener pattern". This package provides a way for user level code to make calls to kernel level methods. It is used between the library virtualization subsystem and the tape drive emulation subsystem.

The install package defines routines to deal with software installation, update, and backout.

The logging package presents a java callable interface to the CP logging service. This is used throughout the virtual library system.

The message package defines routine to work with generic message handling routines. Uses message bundles to allow internationalization.

The persistence package implements the ComponentBootstrap subclass to start up and shutdown the Virtual library system database. It also defines a Transaction class used in performing atomic transactions with the database.

The script package provides routines to execute an external script The security package provides methods to authenticate users and to create and update tokens.

The tracing package presents interfaces to the CP tracing service. This package is used throughout the virtual library system.

Value objects defines the base classes used by all packages and subsystems that use the controller/value/domain pattern. All value objects classes in the system derive from LeafValue class.

Figure 24:
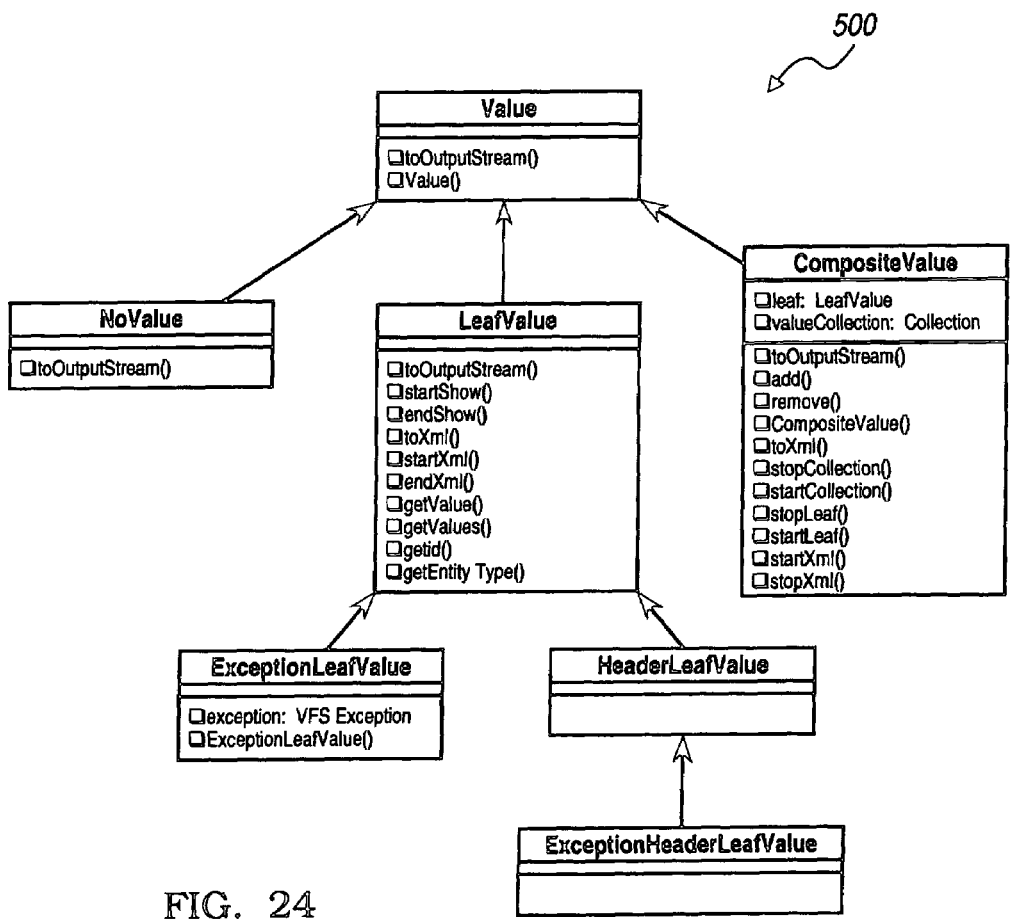
FIG. 24 is a diagram of composite value classes structure of the data storage system of the present invention.

Referring to FIG. 24, a diagram of the composite value classes 500 defined herein are shown.

The volser range package defines routines to decompose volser ranges into lists of volsers. It enforces the various rules about how volser rangers are defined.

The web server package implements the ComponentBootstrap subclass to start up and shutdown the virtual library system web server.

The common platform defines a number of services used by storage applications. A few of the key services and the interaction with the virtual library system are described here.

Logging is the process of capturing system events that may be of interest to a customer or QSP (qualified service person, a CSE or other trained person that performs maintenance in the field). All log events are captured into single location for the entire system, the CP logging service. This service provides interfaces to designate certain event to be sent to the customer via e-mail or SNMP. Events can also be sent to the vendor, if connectivity is available.

Logging is a heavyweight process, because a single log is kept for the entire system. It is to be used only for high priority conditions. These are defined in detail in the "Monitor the Virtual Library System" use case. A document listing specific logged events for each subsystem is in the rose model.

Logging associates a severity level with each event. The meaning of these levels has been defined for the virtual library system 100:

| Level | Meaning | Examples (not an exhaustive list, just examples) |
| --- | --- | --- |
| EMERG | System Unavailable | All virtual front-end devices (library & tape drive) are unavailable. |
| ALERT | Immediate action | Some, but not all, virtual front-end devices are unavailable |
| CRIT | Critical condition | All front-end virtual devices are available. Recoverable errors are occurring resulting in performance degradation. Critical threshold levels (e.g., MVCs, disk) have been hit. |
| ERR | Error | All front-end virtual devices are available. Recoverable errors are occurring that are not affecting performance. |
| WARN | Warning | Warning thresholds have been hit |
| NOTICE | Normal, but significant | Security violation |
| INFO | Information | Startup/shutdown, system configuration changed via GUI or CLI. |
| DEBUG | Debug | Not used, or only used in conjunction with tracing. |

Tracing is the process of creating detailed "logs" of the actions of each piece-of-code. Common Platform provides a tracing package that can be used for this purpose. The details of the tracing are largely determined by the developer of each unit, because the primary target of the traces is second and third level support (who have access to source code). Predetermined general guidelines are generally implemented for the use of tracing.

A key difference between tracing and logging is that logged events are those events that may be of interest to a customer or QSP. Tracing, on the other hand is of interest to second and third level support. The volume of logged events is much less than traced events. The tracing mechanism is light weight to sustain the high volume of messages expected without bogging down the systems.

The CP Data Path service provides the linkage between the HBA hardware and the virtual library system. This service handles the interrupts generated on the HBA when a incoming message (FC frame, IP packet, etc.) arrives.

defines an interface, mapped_if, that the virtual library system generally implements. This interface is called whenever a message arrives. The library system processes the message as described for the tape drive emulation and SCSI media change emulation subsystems, then returns the results. The results are packaged back into the proper response message by CP data path, and are returned to the origination of the incoming message.

The CP data path service provides kernel threads as the execution context for the mapped_if implementations.

The CP data path provides control interfaces also. The control interfaces allow the virtual library system 100 to tell the CP data path which emulation to use on a specific device. They also allow the virtual library system to set the LUN masking parameters described below.

The CP Data path service provides Fibre Channel LUN masking. FC LUN masking is performed by specifying a list of host WWNs (world wide names) that are allowed to see a specific virtual devices. For the virtual library system, these virtual devices are VTDs and SCSI MC VACs. When a incoming FC frame arrives, CP data path compares the host WWN in the incoming with the masking list. Only if the host is allowed access is the mapped_if implementation called and passed the command. Commands from disallowed hosts are rejected by CP data path.

The message passing service (CP MP or MP) provides a generalized means of sending arbitrary messages from one process to another. The message passing service is similar to, but more powerful than, sockets. The CP MP service guarantees complete delivery of each message. CP MP provides both synchronous and asynchronous transmission of messages. CP MP is a high performance service that can be used for both control information and for data. The CP MP service can be used between processes on different nodes, and between processes in kernel space, user space, or both. All the node hopping, kernel-to-user, and user-to-kernel details are hidden by CP MP.

The virtual library system 100 uses this service in two ways. One is to allow kernel processes to perform actions on the persistent data. The interfaces to the persistent data are done with controller methods. The "extended listener" pattern is used to allow a set of kernel C routines to call the user java controller methods.

The other virtual library system use of message passing is for data transmission between nodes. This is used in the MpIO component in object store IO.

A process view of the system and method of the present invention may be taken. The virtual library system 100 is generally a highly distributed system with many execution contexts. In some cases, an execution context is created in the form of an operations system process. In other cases, a lightweight thread mechanism is used to provide multiple execution contexts within a single process. This is done using the java thread mechanism for user space code. This also occurs in kernel code using the kernel threads mechanism.

The virtual library system uses both long-running and short-running execution contexts. Long-running execution contexts (whether process or a thread) are those that are started when the virtual library system is started, and are terminated when the system is stopped. Short-running execution contexts are used to perform a specific action. These execution contexts are created, run for the time used to perform the action, and then terminate. The length of time between the start and termination of a short-running execution context may be very short (milliseconds or seconds) or may be quite long (hours or even days).

The more important distinction between long-running and short-running execution contexts that short-running contexts come and go while the virtual library system 100 is running. Long-running contexts, on the other hand, should only start and stop once, and are intended to run for very long periods of time. It is expected that once a virtual library system 100 is placed in service, it is generally left operating until it is taken out of service. The long-running execution contexts may therefore be designed and coded to support running for years. Some long running execution contexts are often started when the virtual library system starts, and stop when the system shuts down, but may also be stopped and started while the system is running.

Figure 25:
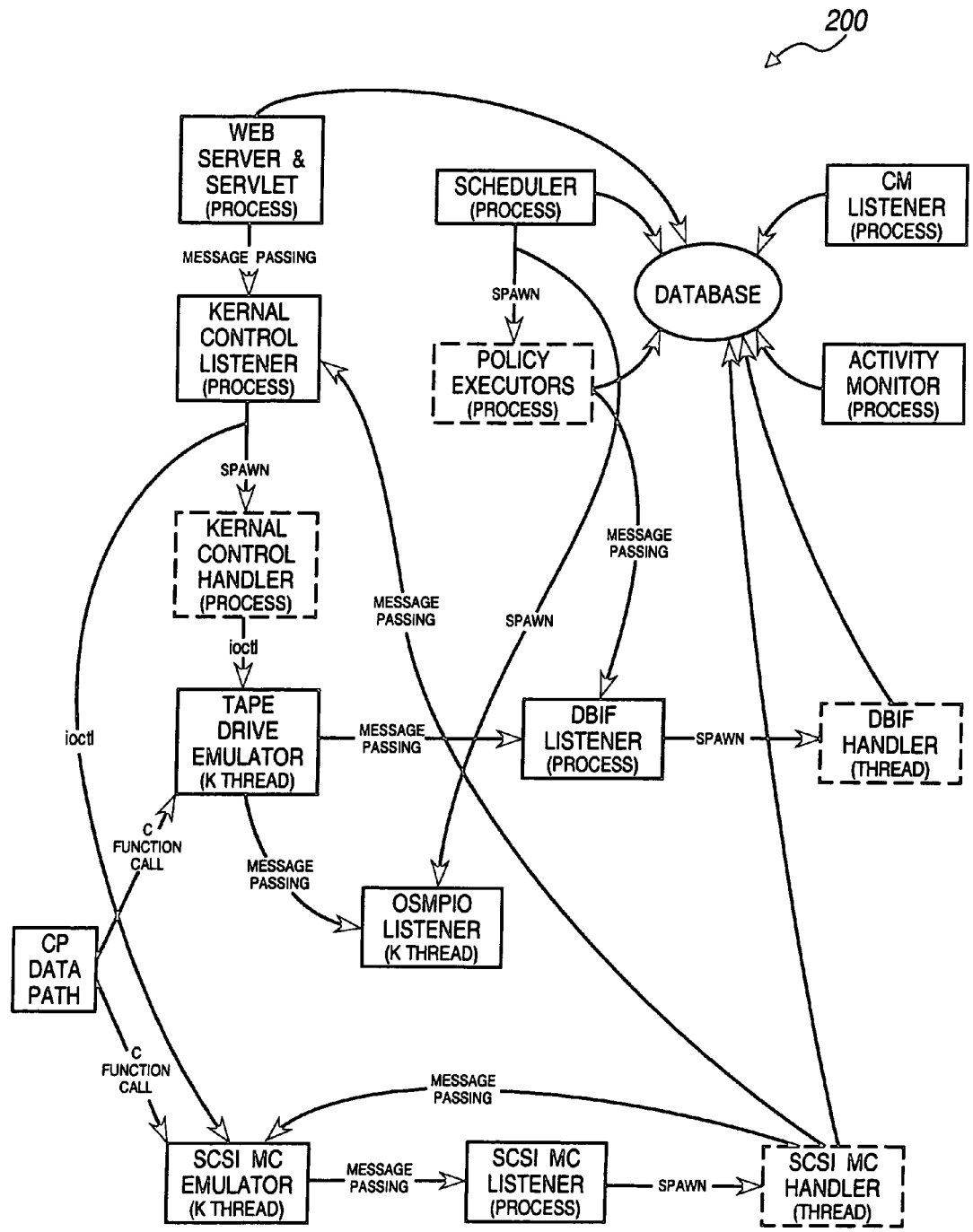
FIG. 25 is a diagram of example virtual library processes of the data storage system of the present invention.

Referring to FIG. 25, a diagram illustrating an overview of the virtual library system processes 200 is shown. Long-running processes are shown with solid lines and short-running execution contexts are shown with dashed lines.

Execution contexts labeled "K-thread" are kernel threads. The execution contexts labeled "Thread" are java threads, and all execute in one JVM. The execution contexts labeled "Process" are separate processes, and run in separate JVMs.

The execution contexts shown in FIG. 25 are not necessarily the same as the packages shown in the subsystem view. Most of these execution contexts run code from multiple packages or even multiple subsystems. The interprocess communication is always contained inside the package. The interfaces to the Stored Object and Library virtualization databases are performed with controller class methods.

FIG. 25 generally illustrates the steady state of a running the virtual library system 100. During startup, several additional process run. These processes start the long running processes shown above.

Figure 26:
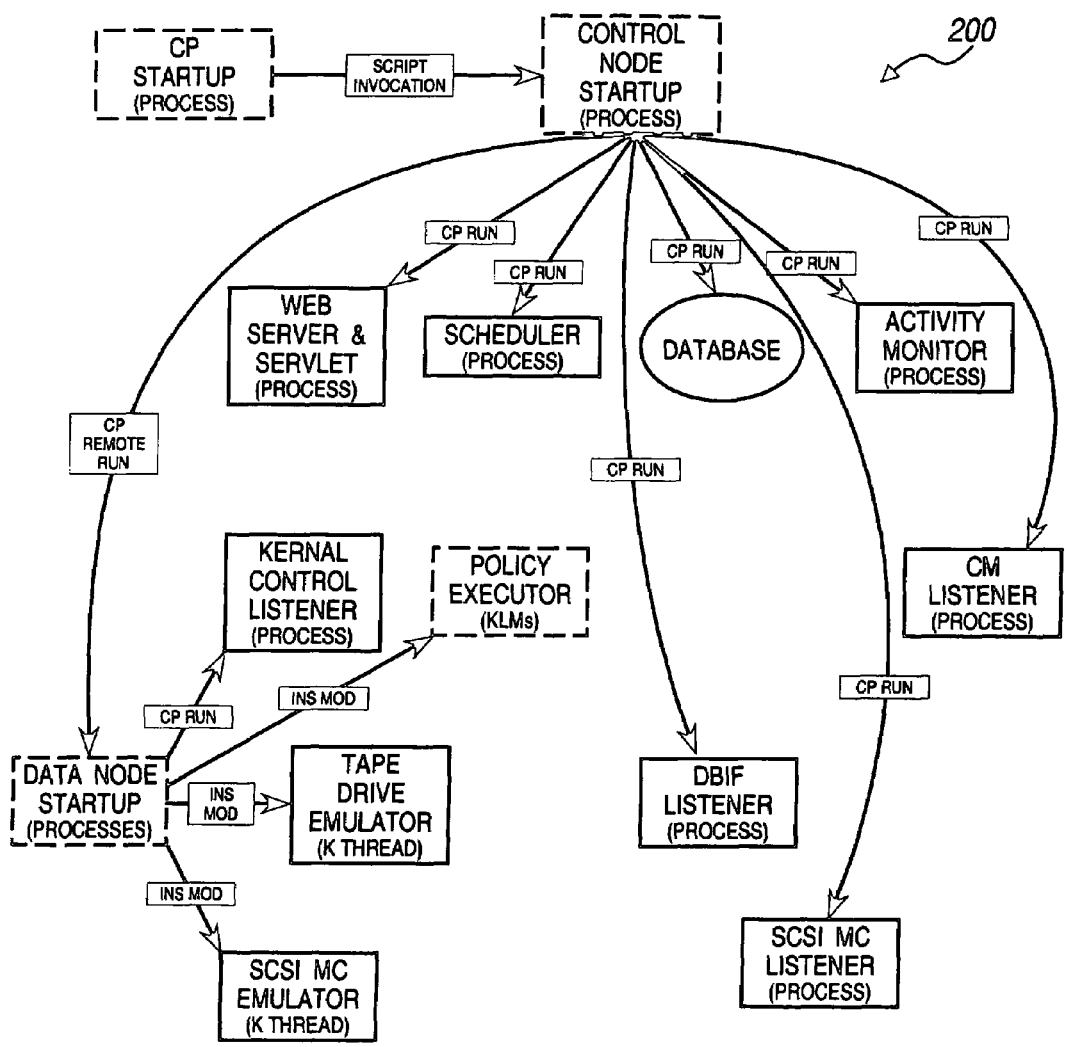
FIG. 26 is a diagram of an example start up process of the data storage system of the present invention.

Referring to FIG. 26, the virtual library system startup processes are shown.

In one example, the web server is an Apache web server. It responds to requests from a browser or the virtual library system CLI software for administrative requests. This web server is provided with a servlet to handle CLI requests and java server pages (JSPs) to handle GUI requests. These packages access the Virtual library system database via controller methods.

The web server may spawn its own short or long lived threads to perform the requests. This is transparent to the virtual library system.

The methods invoked by the web server may communicate with the tape drive emulator and SCSI media changer emulator processes. This is done with CP message passing. The message passing is hidden inside java classes used by the CLI process. The CLI processes may also "spawn" tape drive emulator and SCSI media changer handler kernel threads. This is not truly a spawning process, since the CP data path service will actually already have the kernel thread running. This process actually involves merely associating the tape drive emulator or SCSI media changer emulator code with the already-running kernel thread. Nevertheless, from the virtual library systems perspective, this action results in the creating of a new tape drive emulator or SCSI media changer emulator corresponding to a newly created virtual device.

The CM Listener process waits for notifications of changes to the configuration from the CP CM service. This process is started at system startup, and runs continuously. Most of the time, the CM listener is not performing any action. Rather, it is simply waiting on an incoming message. When a message is received, it will perform controller methods to propagate the change throughout the virtual library system 100. This may cause other actions to occur as the change takes effect.

The scheduler manages the future, pending, and running activity lists. It moves activities from the future, to the pending, then to the running activity queue. When an activity is moved from the pending to the running queue, the scheduler will start the desired policy executor to perform the action.

The scheduler is started at system startup, and is terminated during system shutdown. The scheduler may run continuously, or may start and stop, depending on the details of its internal design. There may be long periods of inactivity during the interval between when activities generally start.

The activity monitor is a continuously running process started at system startup. This process examines the progress of running activities. If the process performing the activity does not appear to be making progress, the activity monitor may terminate the process. Progress is determined by examining the updates about the volume of data moved in the data flow records of data mover processes. The activity monitor can also use Linux commands to probe the status of the process. When an activity is terminated, events will be logged. Internal events (i.e., all activities except primary I/O) will result in a resume/crash activity being scheduled for the terminated activity.

A policy executor is a short-running process that moves object data from one location to another. It is started by the scheduler, and is directed to make one or more object movements. Once the movements are complete, this process will terminate. It will record the results of the movements in the object store database using the persistence interface.

A policy executor consists of both user space and kernel space code. A java process runs in user space to provide control operations, while kernel code performs the actual data movement. The java process will be the interface to the kernel process.

There will be one policy executor for each object movement happening at any point in time. Any particular policy executor may move or copy more than one object before terminating.

There will be multiple different programs that are policy executors. There is a distinct policy executor for each type of activity listed in Activity Types, except complete and resume. The complete and resume activities are performed by the scheduler. These programs perform the various actions generally used to accomplish the activity. The primary IO activity is used only for crash recovery of a failed primary IO activity. Normally, primary IO is performed by the tape drive emulator.

The tape drive emulator will emulate legacy and "true virtual" FC tape drives. It accepts the calls from CP data path, and makes function calls to VTV reader writes to store or retrieve data. Tape drive emulator will also interact with library virtualization and object store (to send status and statistical information). These interactions are via message passing and the DBIF Listener.

There may be one tape drive emulator kernel thread running for each virtual tape drive device being provided by the virtual library system.

An OSMPIO Listener is spawned whenever a data flow crosses node boundaries. On the source node (the node with the VTD, or the source copy of the data), an execution context is provided by either the CP LUN thread (for VTDs) or by a running policy executor process (for activities). This source process will send data to a destination node using CP message passing. The OSMPIO Listener is the destination for the messages. An OSMPIO Listener is spawned by the storage allocation process in OS Metadata subsystem when the load balancing process chooses to perform inter-node I/O.

The DBIF listener is a long running process. It is started during Virtual library system system startup, and terminated during virtual library system shutdown.

Communication from the tape drive emulator and the policy executors and the DBIF listener is done using CP Message passing. Messages are sent from the tape drive emulator and the policy executors. As each message is received, DBIF listener will spawn a DBIF handler thread to process the message.

There may be only one DBIF listener thread running for the entire virtual library system. However, additional DBIF listeners may be introduced to reduce bottlenecks when they occur.

The DBIF handler is a short-running thread. It is spawned by the DBIF listener to process one database interface request. As it is spawned, the DBIF handler will be provided with the request it is to process. It interacts with library virtualization or object store subsystem classes via normal method invocations to the LVSController or the OSDBIFController. Once the request is complete, the results are sent back to the waiting tape drive emulator or policy executor via message passing. This thread then terminates.

There will be one DBIF handler thread running for each DBIF request that is being processed at any point in time.

The Kernel Control listener is a long running process. It is started during the virtual library system startup, and terminated during the virtual library system shutdown.

Communication from the library virtualization subsystem and the tape drive emulator is done using a combination CP Message passing and IO control. Messages are sent from the library virtualization subsystem to a specific node and are received by the kernel control listener. As each message is received, Kernel Control listener will spawn a Kernel Control handler thread to process the message. The handler thread will use IO control to communicate with the desired kernel module. Once the kernel functions are complete, a message will be returned to the waiting LVS method.

This module may also be used by the scheduler to drive policy executor functions. However, the CP startup functions may also be usable for this function. There will be one Kernel Control listener running on each node. This is started by the startup processes.

A SCSI Media Changer Emulator is generally provided. The virtual library system 100 provides device emulators that are made known to the Common platform data path service (see Common platform Data Path, below). Execution contexts are created externally (in Common platform data path) and are provided to the virtual library system code via function call. The virtual library system code (device emulator) runs in this context until it completes, then returns.

The device emulators in Virtual library system provide the appearance of real devices. There may be two device emulators, tape drive and SCSI media changer. These provide the appearance of a tape drive or a SCSI media changer respectively.

The SCSI media changer requests are handled by the user mode java SCSI media changer handier. The SCSI media changer emulator simply receives the requests (SCSI CDBs and associated data) from Common platform data path, and sends them to the SCSI media changer listener using Common platform message passing. The SCSI media changer then waits to receive a message (via Common platform message passing) back from the SCSI media changer handler. After receiving the response, the SCSI media changer emulator returns to Common platform data path.

There will be one SCSI media changer emulator kernel thread running for each virtual SCSI media changer device being provided by the virtual library system.

The SCSI media changer listener is a long running process. It is started during virtual library system startup, and terminated during virtual library system shutdown.

Communication between the SCSI media changer listener and the corresponding SCSI media changer emulation package is done using Common platform Message passing. Messages are sent from the SCSI media changer emulation package, which is executing in the context of a LUN thread. As each message is received, SCSI media changer listener will spawn a SCSI media changer handler thread to process the message.

There may be only one SCSI media changer listener thread running for the entire virtual library system. However, if tuning reveals this to be a bottleneck, additional SCSI media changer listeners may be introduced.

The SCSI media changer handler is a short-running thread. It is spawned by the SCSI media changer listener to process one SCSI media changer command. As it is spawned, the SCSI media changer handler will be provided with the SCSI request it is to process. It interacts with library virtualization subsystem classes via normal method invocations. Once the request is complete, the results are sent back to the waiting SCSI Media Changer Emulator via Common platform message passing. This thread then terminates.

During the course of execution, the SCSI media changer handler will use methods in the LVSController class.

These methods may access the library virtualization database using the persistence interface, and may communicate with tape drive emulation via Common platform message passing. The Common platform message passing is hidden inside java classes provided by tape drive emulation subsystem.

There will be one SCSI media changer handler thread running for each SCSI media changer command that is being processed at any point in time.

A Virtualization Database is generally provided. During virtual library system startup, this database is started, and this database is shutdown during system shutdown. This will result in at least one long-running process. Depending on the database chosen, there may he multiple long-running processes that provide the database service.

Access to the database is through the a JDBC based persistence layer. This layer provides the desired interprocess and inter-node communications.

There will be one process or set of process running for the database within the entire virtual library system.

The Common Platform Startup is a CP process that runs automatically when the system is powered up. This can also be ran by hand when the system is in diagnostic mode. This process will run at startup and then terminate. It runs only on the control node.

The Control Node Startup is the virtual library system process that starts up the system. It will start the long running processes on the Virtual library system control node. This process will also run Data Node Startup processes on each data node, including the control node. This process will run at startup and then terminate. It runs only on the control node.

The data node startup processes perform operations desirable to start processes that run on each node, and will load KLMs on each node. There will be multiple processes, one for each system package that has work that are generally done on each node.

The CP Software Services may introduce additional threads of control. For the purposes of the virtual library system, these processes are generally transparent. It is assumed that the CP Software Services will properly manage themselves. The one situation where the CP execution contexts are visible is the CP Data Path.

CP provides the data path service. This service sits between the hardware interfaces and the Virtual library system software. CP data path provides both initiator (outgoing) and target (incoming) capabilities. In the tape drive emulation and media changer subsystems, the target features are of interest.

The CP data path service consists of two relevant parts for its target capabilities. These two parts are the Fibre Channel target device ISR (interrupt service routines) and the LUN threads.

The Fibre Channel target driver ISR is not actually an execution process. This routine is hooked to the hardware interface. Each time an incoming frame appears on the hardware interface, this routine is invoked by the kernel. This routine takes the incoming control information and data from the hardware interface, and passes it to the appropriate LUN thread.

For each target device presented by the system, CP creates a kernel level LUN thread. This is a kernel thread. This is an execution context that is used inside the kernel, which is where CP data path and some parts of the virtual library system execute. These CP LUN threads provide an execution context for the Virtual library system device emulators. The interface from the LUN threads to the device emulators is a C function call.

The deployment view describes how the processes described under the process view are deployed onto the available processors when the system is running.

In a running virtual library system, there are two sets of computers involved. Both are general purpose computers. The first set are the client systems. These are the computers outside the Virtual library system. The second set of computers are those inside the Virtual library system. These are referred to as nodes or data movers, and are where most of the Virtual library system and Common platform software runs. The only piece of Virtual library system software that runs on the client system is the CLI interface.

Figure 27:
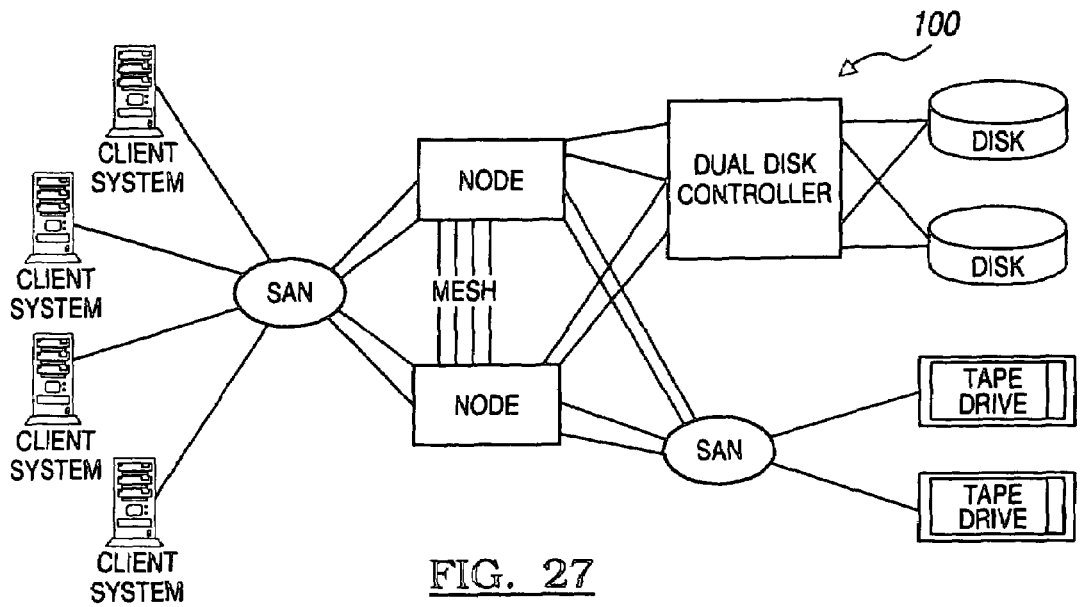
FIG. 27 is a diagram of an example of hardware architecture for a two node implementation of the data storage system of the present invention.

Referring to FIG. 27, a representative view of a two-node virtual library system 100 configuration is shown. In addition to the nodes, there are also back-end tape drives, libraries, and disk storage. The virtual library systems 100 will be expandable up to at least a total of 24 nodes.

Figure 28:
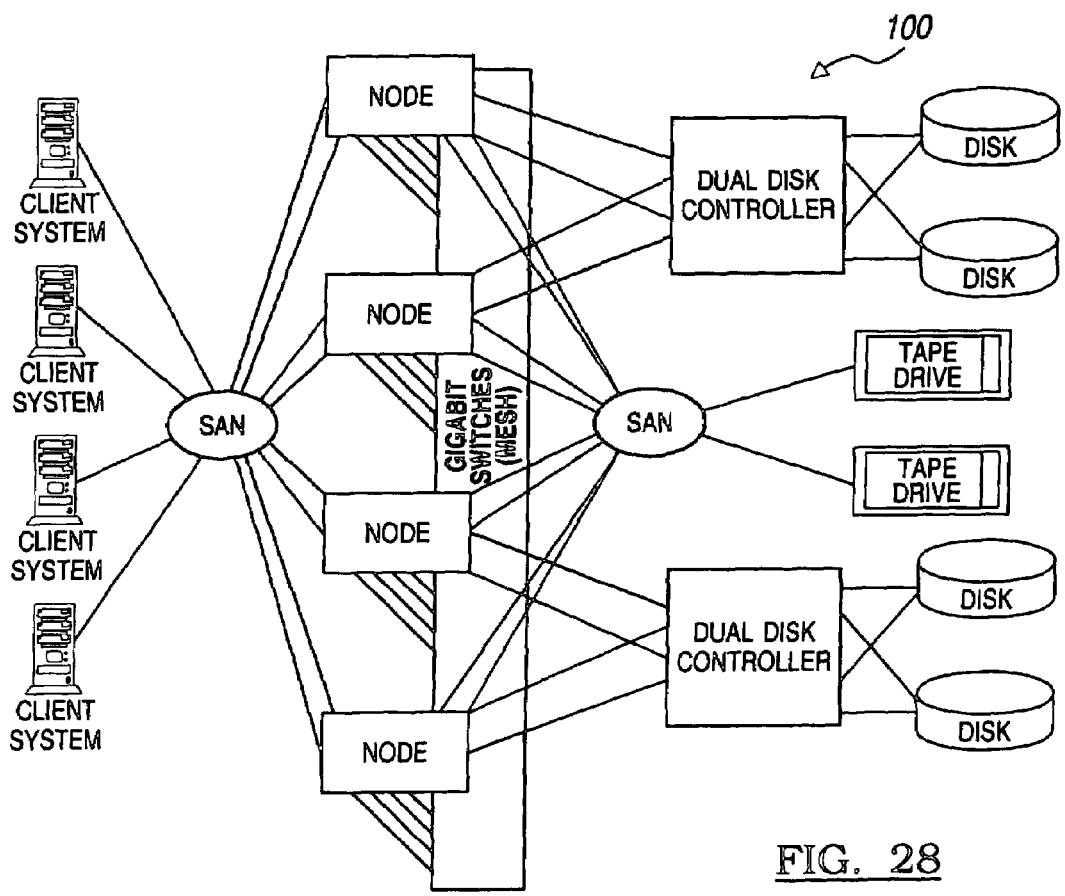
FIG. 28 is a diagram of an example of hardware architecture for a four node implementation of the data storage system of the present invention.

Referring to FIG. 28, a four node system 100 is shown. The Client systems are connected to the virtual library system, and view the virtual library system as a set of SCSI media changer tape libraries and tape drives. These connections are made with a Fibre Channel SAN. There is also a TCP/IP LAN connection between at least one client system and one virtual library system node. This is used for the control functions.

The mesh between the virtual library system nodes is a TCP/IP network. The back end tape and disk connections are Fibre Channel.

Figure 29:
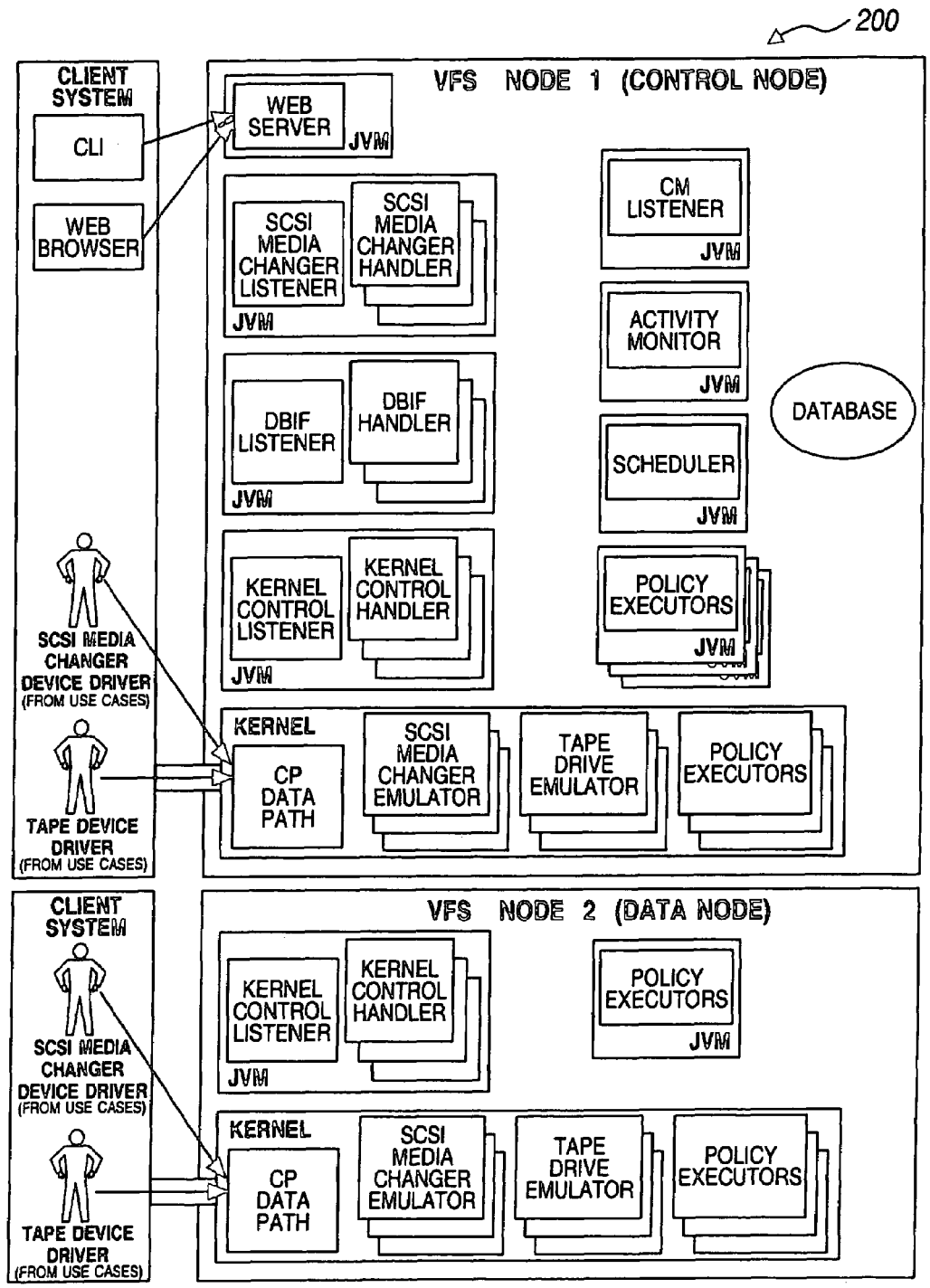
FIG. 29 is a diagram of an example of deployment of common platform processes of the data storage system of the present invention.

Referring to FIG. 29, a diagram illustrating how the process described in the Process View section are placed on the nodes and client systems is shown. FIG. 29 illustrates deployment of virtual library system processes 200 to virtual library system 100 hardware.

Of all the respective virtual library system software, only the CLI exists on the client systems. When an administrator executes a CLI command, a clientCommands process runs on the client system.

All of the remaining Virtual library system software runs on the Virtual library system nodes. The common platform provides two types of nodes, control nodes and data nodes.

Control nodes support all of the CP functionality, while data nodes support only the components related to data transfer. At least one control node is desired. Two are used to provide redundancy.

For one example of the virtual library system 100, all nodes are identical. For systems with more than two nodes, all nodes will continue to be identical. However, the virtual file system (VFS) 100 may use only the first two as control nodes, and the others will be used just as data nodes.

Most of the virtual library system processes 200, run on the control node. This is labeled "VFS Node 1" in FIG. 29. A small subset of processes, those that perform the actual data movement, will run on other nodes. If the control node fails, the HA system will move the control processes to the second node.

Figure 30:
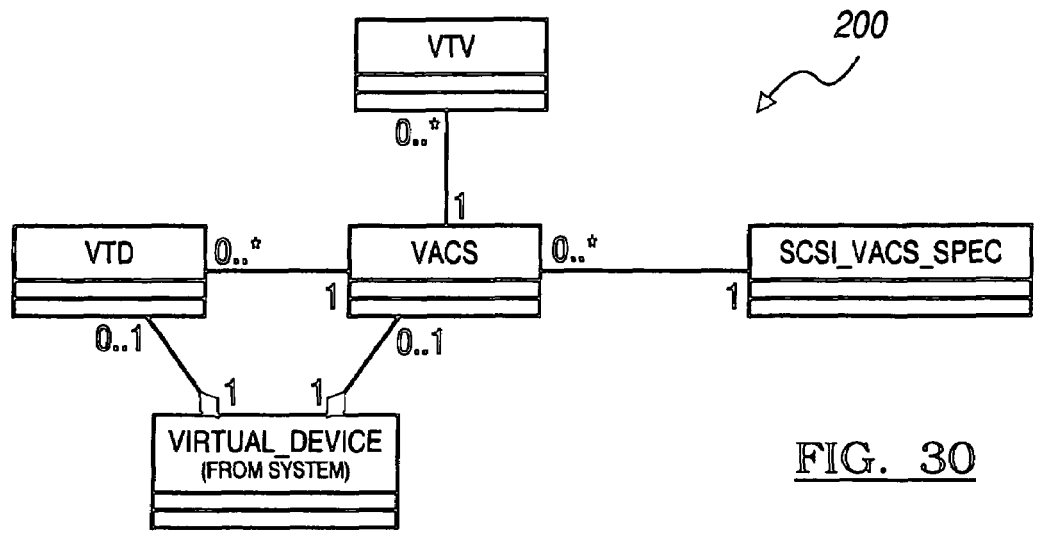
FIG. 30 is a diagram of an example of entities of the data storage system of the present invention.

Referring to FIG. 30, an overview of the key entities in the library virtualization database is shown. In particular, inter-relationships of entities for VACS, VTD, and VTV are illustrated. FIG. 30 shows the key entities involved with defining SCSI media changer type libraries. The VACS, VTV, and VTD entities are the core. A VACS has many VTDs and VTVs. A VACS is also of a specific SCSI_VACS_SPEC. The SCSI_VACS_SPEC specifies the SCSI media changer characteristics of the VACS.

Both VACSs and VTDs are implemented as a VIRTUAL_DEVICE. A virtual device is a system entity described in more detail below.

Figure 31:
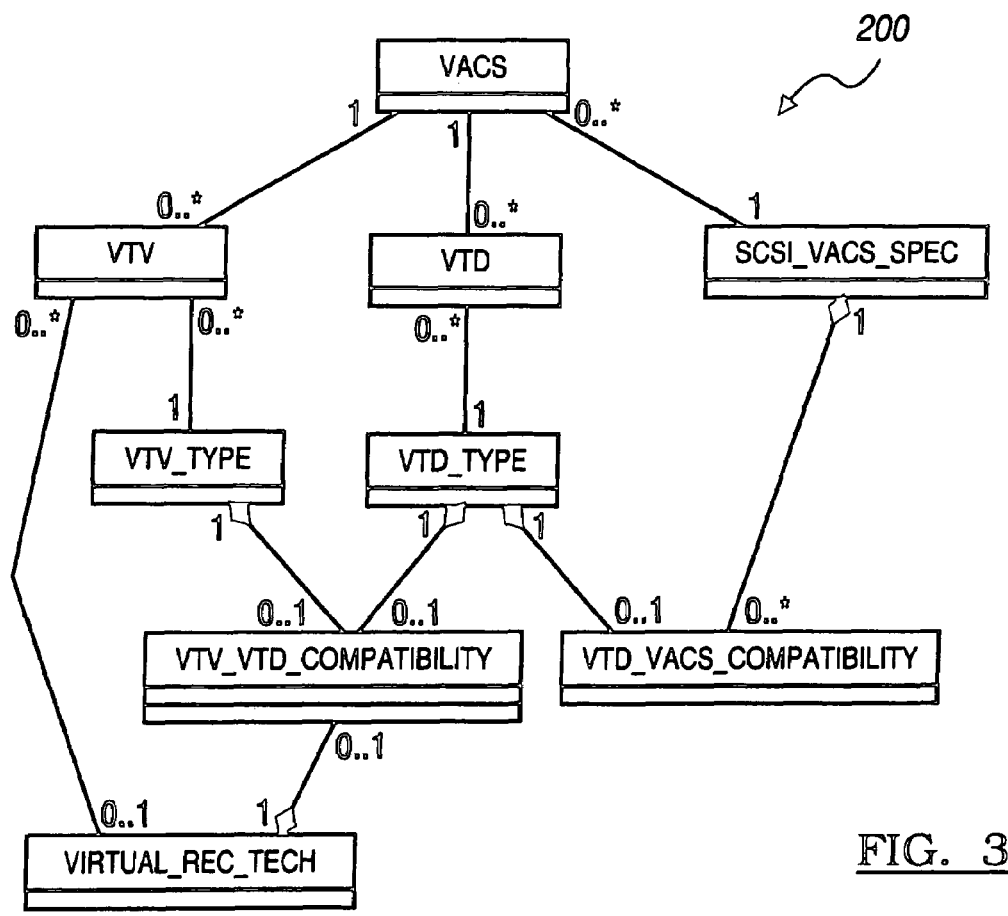
FIG. 31 is a diagram of another example of entities of the data storage system of the present invention.

Referring to FIG. 31, a diagram of entities for virtual media types is shown. FIG. 31 shows the entities that enforce virtual media type compatibilities. The VACS, VTV, VTD, and SCSI_VACS_SPEC entities are as in FIG. 30. VTV TYPE defines the allowed media types. These are equivalent to cartridge types for real cartridges. VTD_TYPE defines the allowed drive types. VIRTUAL_REC TECH defines the recording techniques. This are equivalent to recording techniques like 18-track, 36-track for real tapes. Compatibility between these three entities is defined in the three-way associations in VTV_VTD_COMPATIBILITY. This table also defines the default recording technique for a new VTV in a specific drive, and read/write capability. The first time a VTV is used, it is assigned the default recording technique for the drive/media combination. VTD_VACS_COMPATIBILITY defines the allowed drive types for a specific library type.

Figure 32:
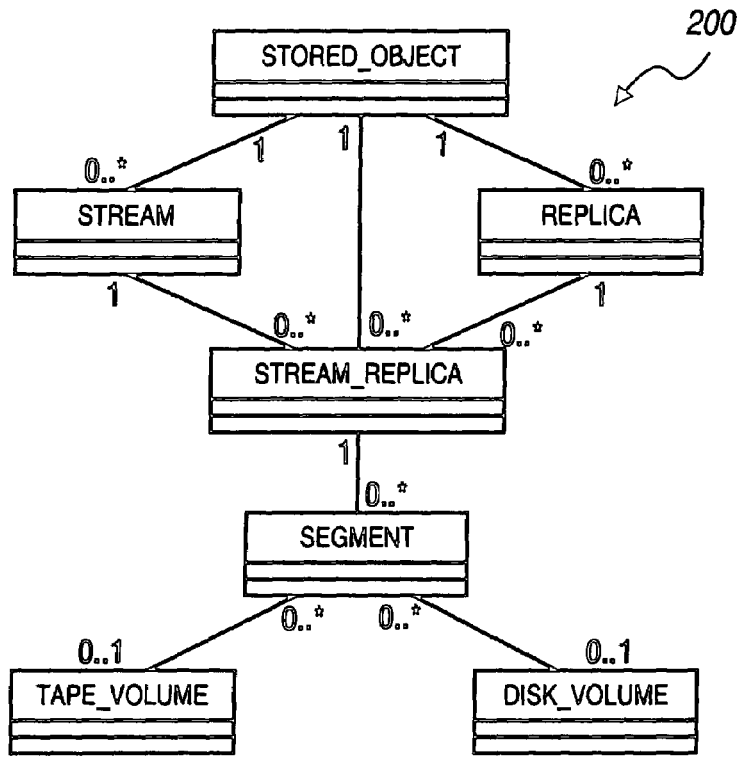
FIG. 32 is a diagram of another example of entities of the data storage system of the present invention.

Referring to FIG. 32, a diagram illustrating entities for the stored objects database is shown. The object store database contains information about the stored objects. The tables in the object store database can be divided into three groups, one for the stored objects, one for real devices, and a third group for storage pools.

The tables of FIG. 32 show the entities related to the stored objects. An object has many streams, and many replicas, as described earlier. Each combination of a stream and a replica is called a stream replica, and represents one set of stored data. Because these stream replicas may be very large, it may be desirable to break a stream replica into more than one segment for storage. Segments represent the actual chunks of data that are stored on disk or tape. Each segment will have disk location information (volume id and file name) or tape location information (volume id, start block and block count). Any particular segment will have either disk or tape information, but not both. All segments for a replica may be stored on the same type of storage, and this restriction may be relaxed.

Figure 33:
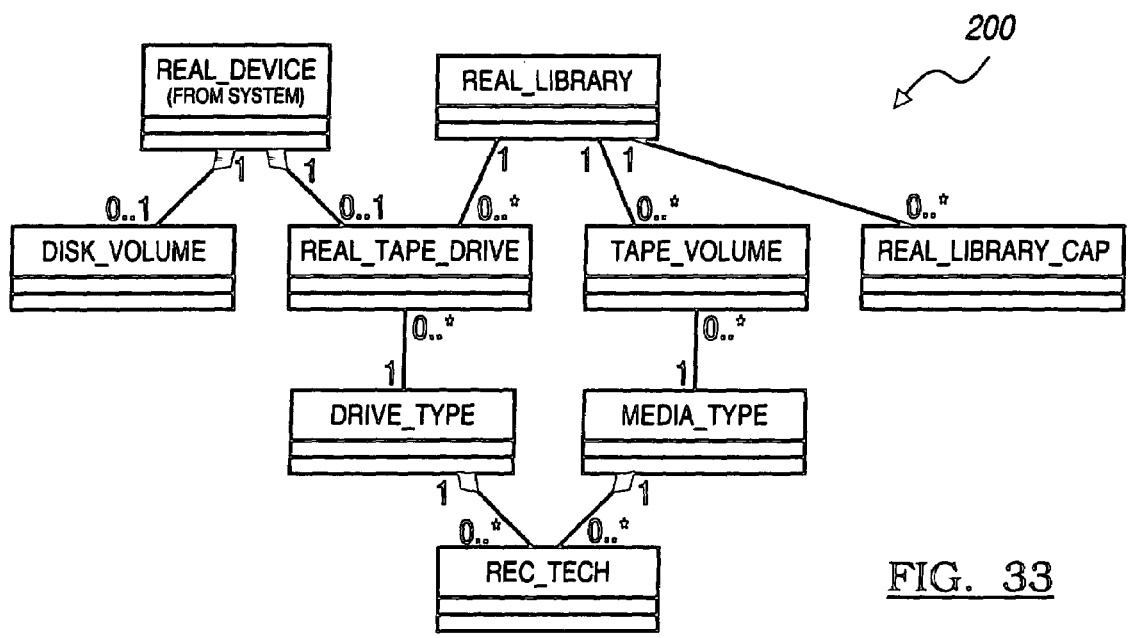
FIG. 33 is a diagram of another example of entities of the data storage system of the present invention.

Referring to FIG. 33, a diagram illustrating entities for real devices is shown. FIG. 33 shows the tables for real devices. Real libraries have many tape volumes, many real tape drives, and many CAPs. A "library" is composed of many ACSs, and ACSs have many LSMs. It is not necessary for the object store subsystem to track the details of the library configuration.

Media types are similar to that for virtual media, but are simpler because the real hardware enforces most of the behavior.

Compared to tape, disk volumes are simple. Disk volumes simply represent a logical volume as presented by the disk controller.

Both RTDs and disk volumes are REAL_DEVICES, as defined in the FIG. 34 System tables below.

Figure 34:
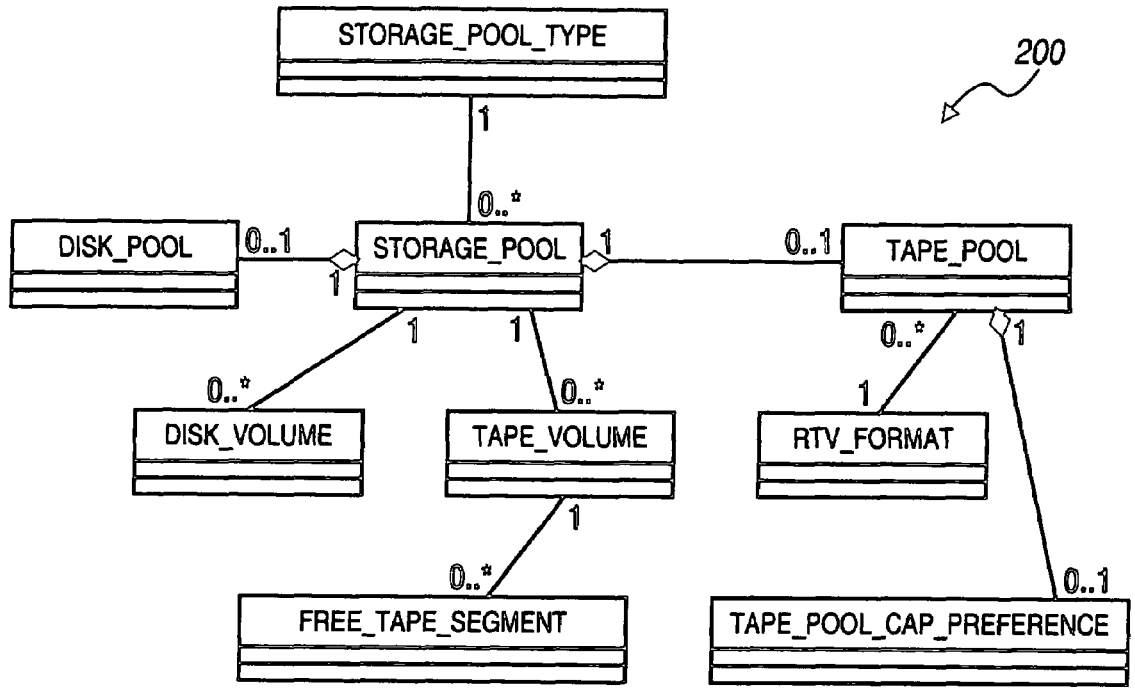
FIG. 34 is a diagram of another example of entities of the data storage system of the present invention.

Referring to FIG. 34, a diagram illustrating entities for storage pools is shown. This set of entities defines storage pools. Storage pools are either disk or tape. A storage pool has one or more disk or tape volumes. When a stored object stream is being written, the storage pool specified for the replica being written is used to choose the destination of the writes. Tape pools have a specific data format specified, and have a list of CAPs for use during ejections operations.

Figure 35:
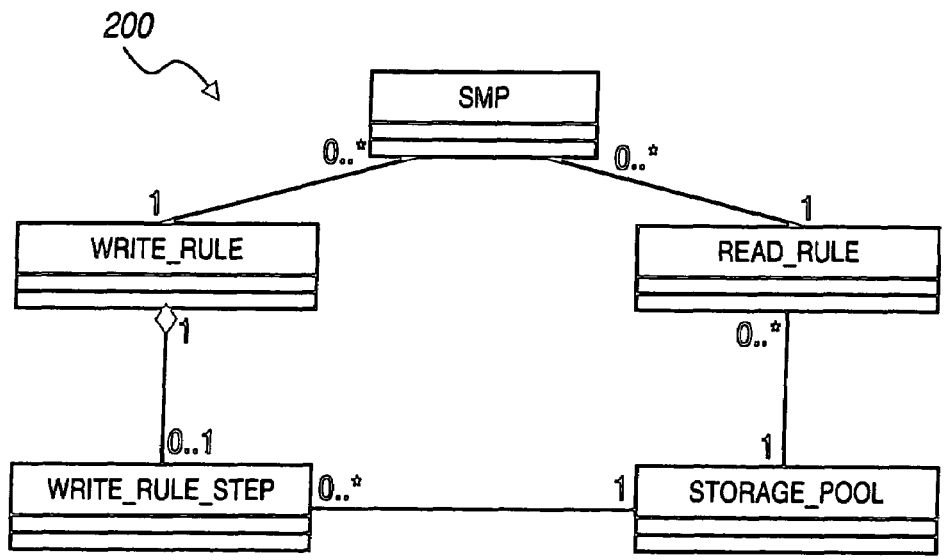
FIG. 35 is a diagram of another example of entities of the data storage system of the present invention.

Referring to FIG. 35, a diagram illustrating entities for Storage Management Policies is shown. Storage Management policies consist of two parts, write rules and read rules. Write rules have a series of write rule steps, one to create each replica. Both read rules and write rule steps refer to a storage pool.

Figure 36:
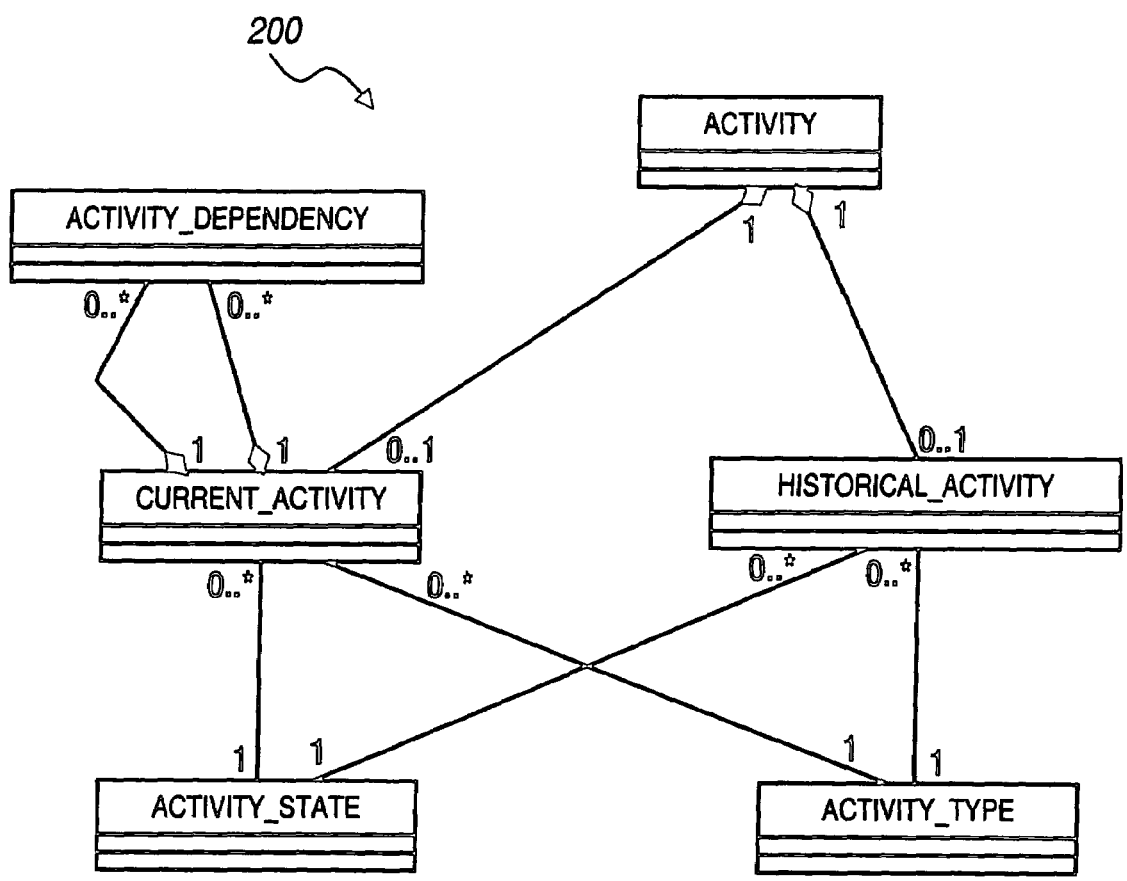
FIG. 36 is a diagram of another example of entities of the data storage system of the present invention.

Referring to FIG. 36, a diagram illustrating entities for Activities is shown. Activities are grouped into two tables, current activities and historical activities. This is done for performance reasons. All activities have a current state (future, pending, running, historical) and a type. Current activities may also have dependencies on other current activities.

Figure 37:
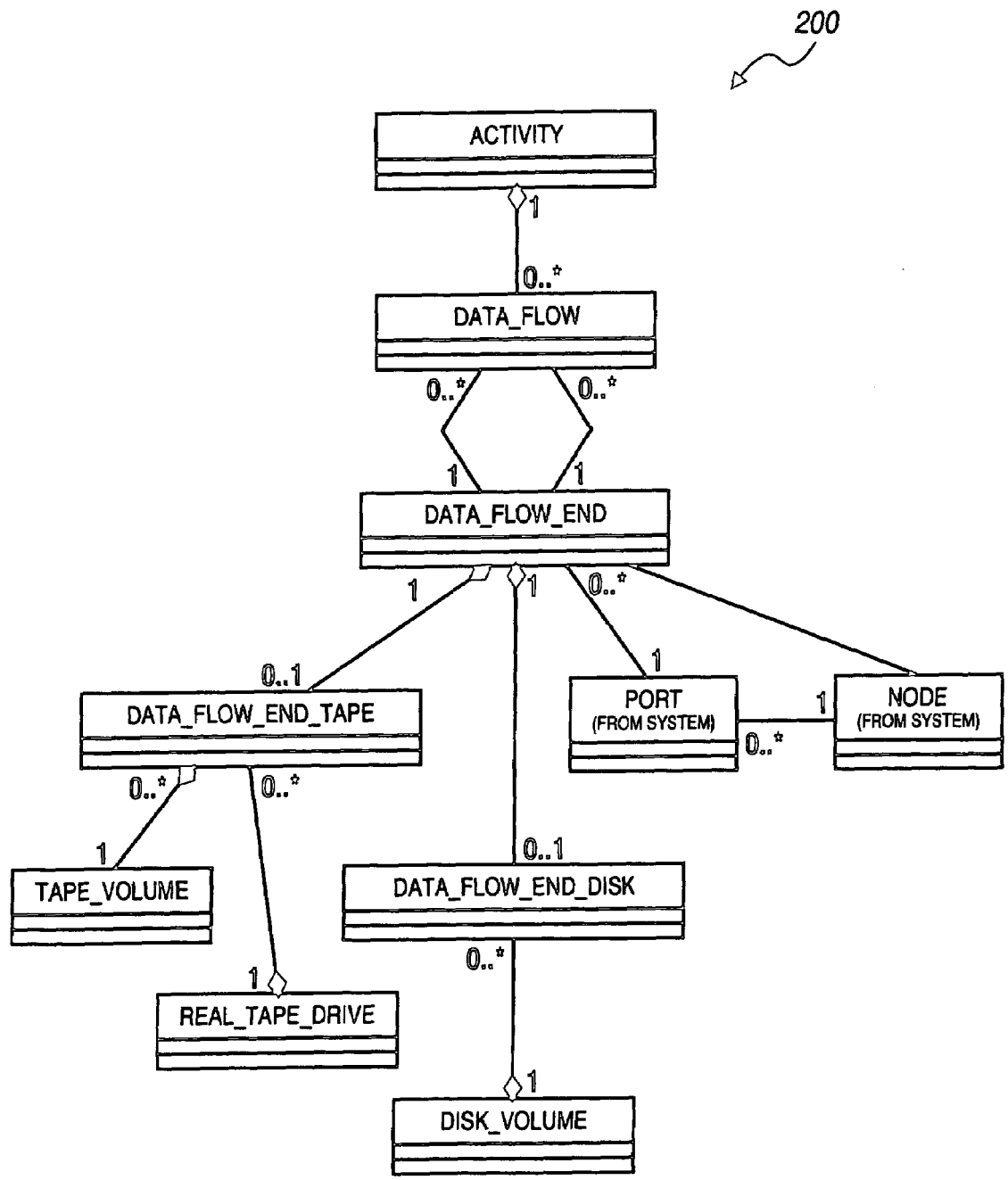
FIG. 37 is a diagram of another example of entities of the data storage system of the present invention.

Referring to FIG. 37, a diagram illustrating Entities for System Utilization is shown. FIG. 37 shows the entities involved in data flows. Data flows form the basis for tracking both system load and the data movements of activities. Activities have a series of data flows. Each data flow has a source end and a destination end. Data flow ends will always affect nodes and ports. They may affect either disk or tape, if the data flow goes to or from disk or tape. Because tape volumes and disk volumes have relationships to segments, and the segments are updated as IO progresses, the data flow ends track the progress of an activity while its running. These entities allow tracking of the utilization of node, ports, disk volumes, and RTDs as the system runs. The system schema holds information about the entire system. Some miscellaneous entities that apply across all subsystems are also here.

Figure 38:
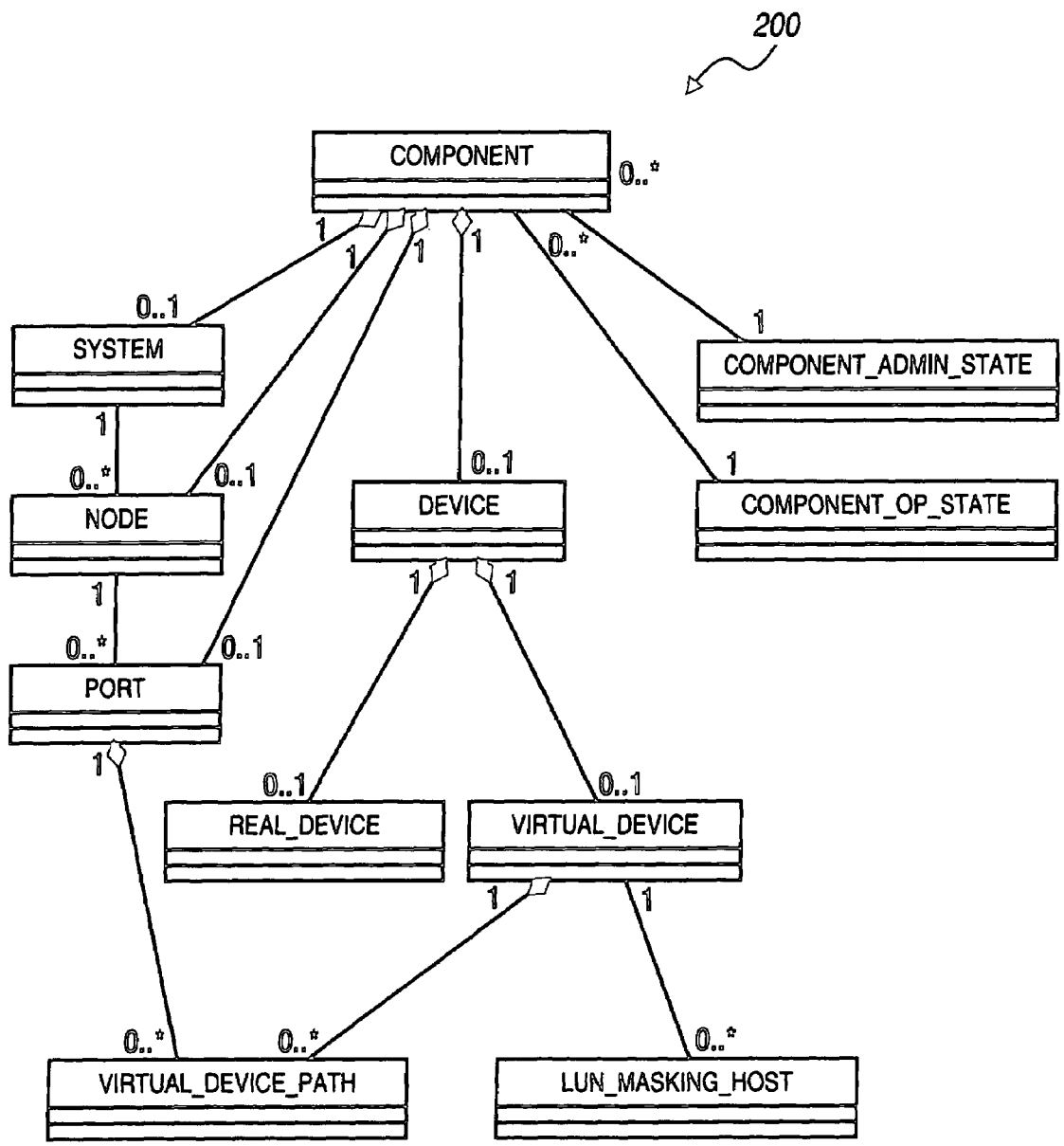
FIG. 38 is a diagram of another example of entities of the data storage system of the present invention.

Referring to FIG. 38, a diagram illustrating Entities for Components is shown. The tables of FIG. 38 define components. Components are a generic concept that covers a number of the entities in the system. Components include the system as a whole, nodes, ports, devices. Devices may be virtual or real devices. Real devices in the virtual library system 100 include disk volumes and RTDs. Virtual devices include VTDs and VACSs. All of these are components, and so have the associated administrative state and operational state. Virtual devices may have CP LUN masking applied. The virtual device path identified the port and LUN associated with the virtual device.

Figure 39:
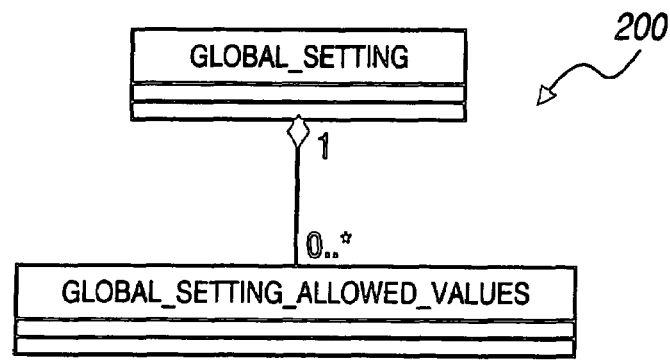
FIG. 39 is a diagram of another example of entities of the data storage system of the present invention.

Referring to FIG. 39, a diagram illustrating Entities for Global Settings is shown. Global settings are values that are retained and used across the entire system. These are commonly used as default settings. Each global setting has a list of allowed values.

Figure 40:
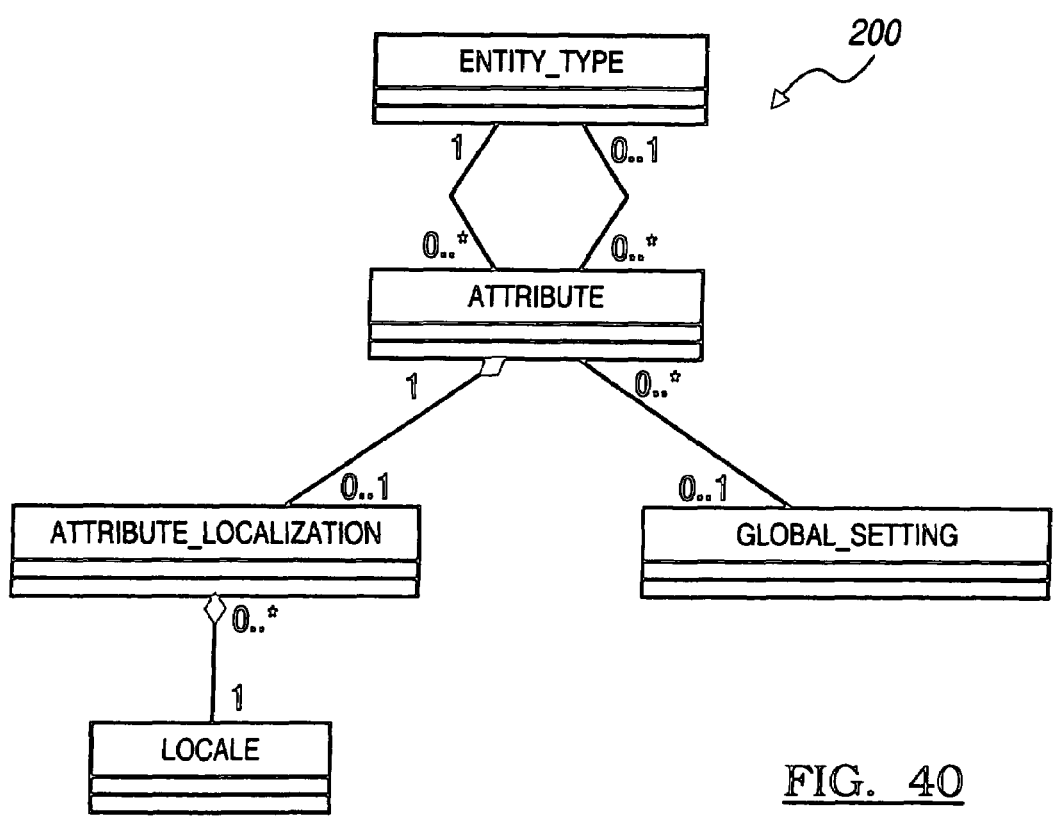
FIG. 40 is a diagram of another example of entities of the data storage system of the present invention.

Referring to FIG. 40, a diagram illustrating Entities for Entities is shown. These tables allow the schema of the virtual library system entities and the attributes to be exposed for the GUI. An entity is any of the many objects managed by Virtual library system, including VTDS, RTDs, storage management policies, and activities. The attribute table defines the attributes of each entity. An attribute many in fact be another entity. Some attributes refer to a global setting for a default. Since entities and attributes are displayed in the GUI, localized strings are provided for attribute names and help info.

There may be no performance or size limitations for the virtual library system 100 and the respective processes 200.

Figure 41:
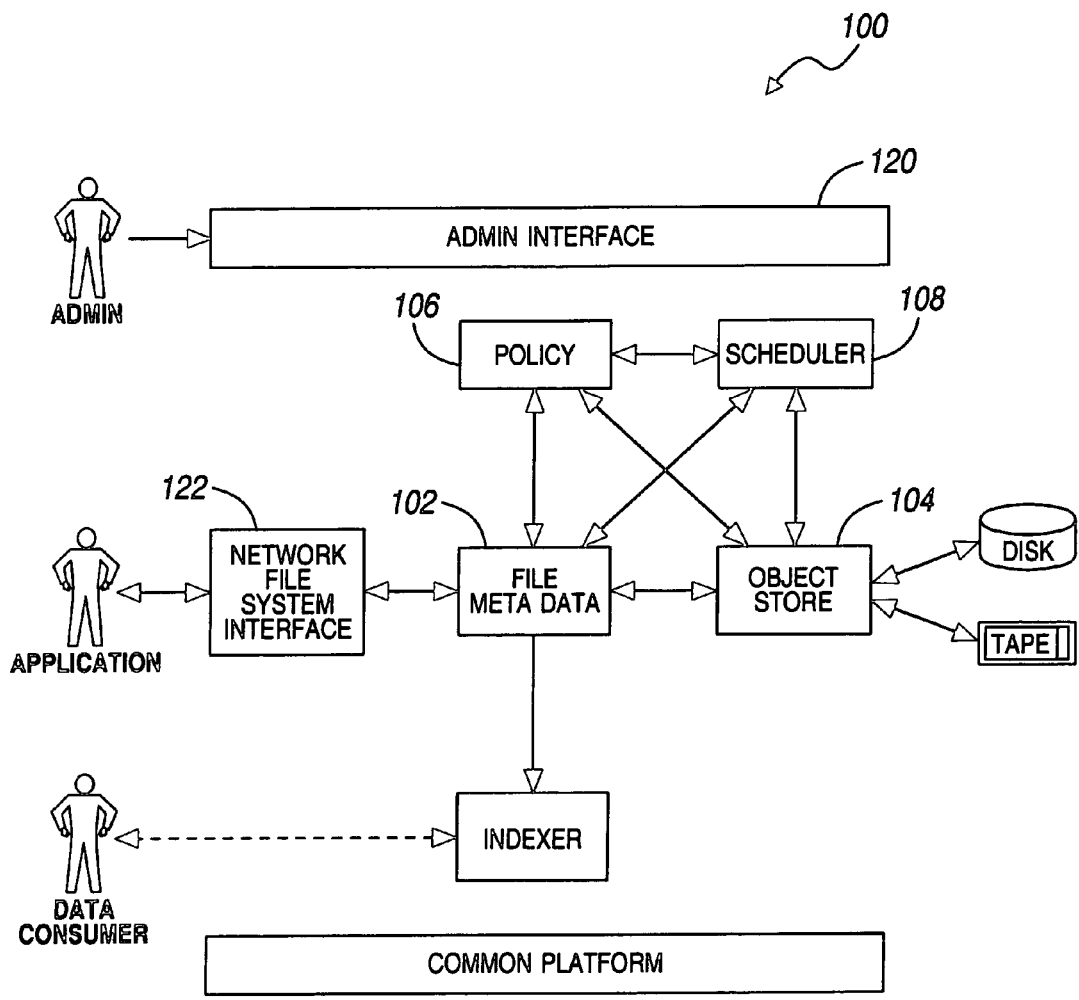
FIG. 41 is another diagram of the data storage system of the present invention.

To summarize, referring to FIG. 41, an architecture overview of the virtual file system 100 (which generally implements the processes 200) is shown. The administrative interface (or administrator) 120 includes the CLI and GUI. The I/F 120 generally provides command level security, enforces command level security roles, and archive specific commands.

The file meta data 102 generally stores meta data about files, including local file system location (for meta data), object id (for data), hash, and presented file system information. The subsystem 102 further categorizes data into classes and maps classes to policies. The file meta data subsystem 102 may create from scratch: file meta data, hashing, classes, duplicate detection and handling, external time source, and serialization.

The object store 104 generally places data onto physical storage, manages free space, and uses the policy subsystem 106 to guide its respective actions. The object store 104 may provide mirrored writes to disk, optimization for billions of small objects, data security erase, i.e., expungement for obsolete data, and direct support for SCSI media change libraries The policy subsystem 106 retains rules governing storage management that may include rules for duplicate detection and handling, integrity checking, and read-only status.

The scheduler 108 generally manages background activities, and may operate using absolute time based scheduling, and an external time source.

The network file system interface 122 generally presents file system from the file meta data subsystem 102 via the network to external servers.

The indexer generally creates searchable, content based indices, and may be externally accessible via NFS and CIFS.

As is readily apparent from the foregoing description, then, the present invention generally provides an improved system and method for archive storage.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for object-based archival data storage, the system comprising:
    an administration interface subsystem having a graphical user interface (GUI) and a command line interface (CLI), the administration interface subsystem allowing an administrator to interface with:
        a policy subsystem that provides system rules for at least one of hash based integrity checking, read-only/write-ability/erase-ability control, and duplicate data treatment corresponding to files and file objects;
        an object-based storage subsystem connected to respective data storage devices, the object-based storage subsystem including a meta data subsystem for maintaining information about the data storage devices used by a virtual library system to store data, and the object-based storage subsystem further including an Input-Output (IO) subsystem for providing routines for reading and writing stored objects;
        the meta data subsystem further being configured to store meta data about files, the meta data subsystem further categorizing data into classes and mapping the classed data into policies, the meta data subsystem transmitting the policies to the policy subsystem, and the policy subsystem generating system rules in response to the policies received from the meta data subsystem; and
        an audit subsystem that captures and stores audit information about at least one class of data, wherein the audit subsystem captures and stores the audit information in response to a policy received from the administration interface subsystem;
    at least one file presentation interface that interfaces a client platform to a Virtual File System (VFS) of the meta data subsystem; and
    a scalable interconnect to couple the object-based storage subsystem, the administration interface subsystem, the meta data subsystem, the policy subsystem, and the at least one file presentation interface.

2. The system according to claim 1 further comprising an indexer that creates searchable, content based indices, and is externally accessible via the file presentation interface.

3. The system according to claim 1 wherein the policy subsystem further comprises a policy control interface that interfaces with the administration interface subsystem to collect class and policy definitions, maintain and process class and policy definitions, extract data management rules, and maintain the hierarchy of functions to be performed.

4. The system according to claim 1 wherein the duplicate data treatment includes at least one of keeping all original and duplicated data copies, keeping only original data and deleting duplicate data, and replacing original data with new duplicate data, and detection of duplicate data is recorded in an audit log.

5. The system according to claim 1 wherein the policy subsystem further provides controls for policy modifications, and absolute time based controls.

6. The system according to claim 1 wherein the object-based storage subsystem stores data onto physical storage and manages free space in response to the policy subsystem rules.

7. The system according to claim 1 further comprising a security subsystem coupled to the administration interface subsystem, and that creates roles for each user, and assigns credentials, creates resources and resource groups and assigns role based enforcement criterion, maintains pluggable security modules for validation, interfaces with a key management system for symmetric key management, and provides rules for client authentication for physical resources including disks and tapes.

8. The system according to claim 1 wherein the object-based storage subsystem provides at least one of mirrored writes to disk, optimization for small objects, data security erase via expungement of obsolete data, and direct support for media change libraries.

9. A method of object-based archival data storage, the method comprising:
    interfacing an administration interface subsystem having graphical user interface (GUI) and a command line interface (CLI) with:
        a policy subsystem that provides system rules for at least one of hash based integrity checking, read-only/write-ability/erase-ability control, and duplicate data treatment corresponding to files and file objects;

an object-based storage subsystem connected to respective data storage devices, the object-based storage subsystem including a meta-data subsystem for maintaining information about the data storage devices used by a virtual library system to store data, and the object-based storage subsystem further including an Input-Output (IO) subsystem for providing routines for reading and writing stored objects;

the meta data subsystem further being configured to store meta data about files, the meta data subsystem further categorizing data into classes and mapping the classed data into policies, the meta data subsystem transmitting the policies to the policy subsystem, and the policy subsystem generating system rules in response to the policies received from the meta data subsystem; and an audit subsystem that captures and stores audit information about at least one class of data, wherein the audit subsystem captures and stores the audit information in response to a policy received from the administration interface subsystem;

at least one file presentation interface that interfaces a client platform to a Virtual File System (VFS) of the meta data subsystem; and a scalable interconnect to couple the object-based storage subsystem, the administration interface subsystem, the meta data subsystem, the policy subsystem, and the at least one file presentation interface.

10. The method according to claim 9 wherein the duplicate data treatment includes at least one of keeping all original and duplicated data copies, keeping only original data and deleting duplicate data, and replacing original data with new duplicate data, and detection of duplicate data is recorded in an audit log.

11. The method according to claim 9 wherein the policy subsystem further provides controls for policy modifications, and absolute time based controls.

12. The method according to claim 9 wherein the object-based storage subsystem stores data onto physical storage and manages free space in response to the policy subsystem rules, and provides at least one of mirrored writes to disk, optimization for small objects, data security erase via expungement of obsolete data, and direct support for media change libraries.

13. The method according to claim 9 further comprising coupling an indexer to the file presentation interface, wherein the indexer creates searchable, content based indices, and is externally accessible via the file presentation interface.

14. The method according to claim 13 wherein the policy subsystem further comprises a policy control interface that interfaces with the administration interface subsystem to collect class and policy definitions, maintain and process class and policy definitions, extract data management rules, and maintain the hierarchy of functions to be performed.

15. The method according to claim 9 further comprising a security subsystem coupled to the administration interface subsystem, and that creates roles for each user, and assigns credentials, creates resources and resource groups and assigns role based enforcement criterion, maintains pluggable security modules for validation, interfaces with a key management system for symmetric key management, and provides rules for client authentication for physical resources including disks and tapes.

* * * * *

UNITED STATES PATENT AND TRADEMARK OFFICE
CERTIFICATE OF CORRECTION

PATENT NO. : 7,627,617 B2 Page 1 of 1
APPLICATION NO. : 11/055523
DATED : December 1, 2009
INVENTOR(S) : Kavuri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this

Twenty-first Day of December, 2010

David J. Kappos
*Director of the United States Patent and Trademark Office*